(12) United States Patent
Fox et al.

(10) Patent No.: US 7,930,293 B2
(45) Date of Patent: Apr. 19, 2011

(54) RUN-TIME ARCHITECTURE FOR ENTERPRISE INTEGRATION WITH TRANSFORMATION GENERATION

(75) Inventors: Joshua Fox, Emek Haela (IL); Ziv Z. Hellman, Jerusalem (IL); Marcel Zvi Schreiber, Jerusalem (IL); Tom Y. Yuval, Jerusalem (IL); Eliezer Israel, Jerusalem (IL); Guy Yitzhaki, Jerusalem (IL); Rannen Meir, Jerusalem (IL)

(73) Assignee: International Business Machines Corporation, Armonk, NY (US)

( * ) Notice: Subject to any disclaimer, the term of this patent is extended or adjusted under 35 U.S.C. 154(b) by 1503 days.

(21) Appl. No.: 11/029,966

(22) Filed: Jan. 4, 2005

(65) Prior Publication Data

US 2005/0149484 A1     Jul. 7, 2005

Related U.S. Application Data

(60) Division of application No. 10/104,785, filed on Mar. 22, 2002, now Pat. No. 7,146,399, which is a continuation-in-part of application No. 10/053,045, filed on Jan. 15, 2002, now abandoned, which is a continuation-in-part of application No. 09/904,457, filed on Jul. 6, 2001, now Pat. No. 7,093,200, which is a continuation-in-part of application No. 09/866,101, filed on May 25, 2001, now Pat. No. 7,099,885.

(51) Int. Cl.
*G06F 7/00* (2006.01)
*G06F 17/30* (2006.01)

(52) U.S. Cl. .................................... 707/713

(58) Field of Classification Search .................. None
See application file for complete search history.

(56) References Cited

U.S. PATENT DOCUMENTS

| 5,295,242 A | 3/1994 | Mashruwala et al. |
| 5,499,371 A | 3/1996 | Henninger et al. |
| 5,627,979 A | 5/1997 | Chang et al. |
| 5,710,917 A | 1/1998 | Musa et al. |
| 5,734,887 A | 3/1998 | Kingberg et al. |
| 5,768,580 A | 6/1998 | Wical |
| 5,838,965 A | 11/1998 | Kavanagh et al. |
| 5,857,197 A | 1/1999 | Mullins |

(Continued)

FOREIGN PATENT DOCUMENTS

GB     2399665 A     9/2004

(Continued)

OTHER PUBLICATIONS

Irani, Romin, "Enabling Web SErvices with BEA WebLogic" Sep. 26, 2001, pp. 1-4. http://www.webservicesarchitect.com/content/articles/irrani05.asp.

(Continued)

*Primary Examiner* — Neveen Abel Jalil
*Assistant Examiner* — Raheem Hoffler
(74) *Attorney, Agent, or Firm* — Yee & Associates, P.C.; Doug H. Lefeve

(57) ABSTRACT

An enterprise application system including a run-time transformation server, and a message broker for routing and transforming data in the form of messages between a source application and a target application, including a plug-in for preparing requests to the run-time transformation server and for processing responses from the run-time transformation server. A method is also described and claimed.

62 Claims, 52 Drawing Sheets

U.S. PATENT DOCUMENTS

| | | | |
|---|---|---|---|
| 5,873,093 | A | 2/1999 | Williamson et al. |
| 5,905,987 | A | 5/1999 | Shutt et al. |
| 5,937,409 | A | 8/1999 | Wetherbee |
| 5,970,490 | A | 10/1999 | Morgenstern |
| 5,995,756 | A | 11/1999 | Herrmann |
| 6,014,666 | A | 1/2000 | Helland et al. |
| 6,035,342 | A | 3/2000 | Bernstein et al. |
| 6,192,365 | B1 | 2/2001 | Draper et al. |
| 6,199,059 | B1 | 3/2001 | Dahan et al. |
| 6,219,654 | B1 | 4/2001 | Ruffin |
| 6,233,586 | B1 | 5/2001 | Chang et al. |
| 6,289,338 | B1 | 9/2001 | Stoffel et al. |
| 6,292,804 | B1 | 9/2001 | Ardoin et al. |
| 6,301,584 | B1 | 10/2001 | Ranger |
| 6,311,194 | B1 | 10/2001 | Sheth et al. |
| 6,327,593 | B1 | 12/2001 | Goiffen |
| 6,343,265 | B1 | 1/2002 | Glebov et al. |
| 6,374,252 | B1 | 4/2002 | Althoff et al. |
| 6,397,232 | B1 | 5/2002 | Cheng-Hung et al. |
| 6,424,973 | B1 | 7/2002 | Baclawski |
| 6,424,974 | B1 | 7/2002 | Cotner et al. |
| 6,497,943 | B1 | 12/2002 | Jimarez et al. |
| 6,498,795 | B1 | 12/2002 | Zhang et al. |
| 6,513,059 | B1 | 1/2003 | Gupta et al. |
| 6,526,416 | B1 | 2/2003 | Long |
| 6,532,471 | B1 | 3/2003 | Ku et al. |
| 6,560,595 | B1 | 5/2003 | Sanders et al. |
| 6,578,046 | B2 | 6/2003 | Chang et al. |
| 6,591,272 | B1 | 7/2003 | Williams |
| 6,633,869 | B1 | 10/2003 | Duparcmeur et al. |
| 6,633,878 | B1 | 10/2003 | Underwood |
| 6,640,231 | B1 | 10/2003 | Andersen et al. |
| 6,643,633 | B2 | 11/2003 | Chau et al. |
| 6,651,244 | B1 | 11/2003 | Smith et al. |
| 6,687,873 | B1 | 2/2004 | Ballantyne et al. |
| 6,704,744 | B1 | 3/2004 | Williamson et al. |
| 6,711,579 | B2 | 3/2004 | Balakrishnan |
| 6,711,585 | B1 | 3/2004 | Copperman et al. |
| 6,718,320 | B1 | 4/2004 | Subramanian et al. |
| 6,728,692 | B1 | 4/2004 | Martinka et al. |
| 6,732,109 | B2 * | 5/2004 | Lindberg et al. ............ 707/101 |
| 6,772,031 | B1 | 8/2004 | Strand |
| 6,778,990 | B2 | 8/2004 | Garcia et al. |
| 6,792,580 | B2 | 9/2004 | Kawakatsu |
| 6,847,974 | B2 * | 1/2005 | Wachtel ........................ 707/101 |
| 6,871,204 | B2 | 3/2005 | Krishnaprasad et al. |
| 6,892,238 | B2 | 5/2005 | Lee et al. |
| 6,947,943 | B2 | 9/2005 | DeAnna et al. |
| 6,957,214 | B2 * | 10/2005 | Silberberg et al. ............... 707/4 |
| 6,978,257 | B1 | 12/2005 | Halbout et al. |
| 6,985,905 | B2 | 1/2006 | Prompt et al. |
| 6,999,956 | B2 | 2/2006 | Mullins et al. |
| 7,007,029 | B1 | 2/2006 | Chen |
| 7,024,425 | B2 | 4/2006 | Krishnaprasad et al. |
| 7,027,974 | B1 | 4/2006 | Busch et al. |
| 7,096,224 | B2 | 8/2006 | Murthy et al. |
| 7,111,297 | B1 | 9/2006 | Sankaranarayan et al. |
| 7,200,563 | B1 | 4/2007 | Hammitt et al. |
| 7,254,589 | B2 | 8/2007 | Goodwin et al. |
| 7,278,164 | B2 | 10/2007 | Raiz et al. |
| 7,302,410 | B1 | 11/2007 | Venkatraman et al. |
| 7,315,849 | B2 | 1/2008 | Bakalash et al. |
| 7,475,084 | B2 * | 1/2009 | Edelstein et al. ............ 707/101 |
| 2002/0059183 | A1 | 5/2002 | Chen |
| 2002/0059187 | A1 | 5/2002 | Delo et al. |
| 2002/0099738 | A1 | 7/2002 | Grant |
| 2002/0107844 | A1 * | 8/2002 | Cha et al. ........................... 707/3 |
| 2002/0169842 | A1 | 11/2002 | Christensen et al. |
| 2002/0194154 | A1 * | 12/2002 | Levy et al. ........................ 707/1 |
| 2003/0018616 | A1 | 1/2003 | Wilbanks et al. |
| 2003/0036917 | A1 | 2/2003 | Hite et al. |
| 2003/0050932 | A1 | 3/2003 | Pace et al. |
| 2003/0110055 | A1 * | 6/2003 | Chau ................................. 705/1 |
| 2003/0120665 | A1 * | 6/2003 | Fox et al. ...................... 707/100 |
| 2003/0163597 | A1 | 8/2003 | Hellman et al. |
| 2003/0167445 | A1 * | 9/2003 | Su et al. ........................ 715/513 |
| 2003/0172368 | A1 | 9/2003 | Alumbaugh et al. |
| 2003/0191608 | A1 * | 10/2003 | Anderson et al. ............. 702/189 |
| 2003/0233224 | A1 | 12/2003 | Marchisio et al. |
| 2004/0010491 | A1 | 1/2004 | Riedinger |
| 2004/0054690 | A1 | 3/2004 | Hillerbrand et al. |
| 2004/0117346 | A1 | 6/2004 | Stoffel et al. |
| 2004/0220893 | A1 | 11/2004 | Spivack et al. |
| 2005/0060371 | A1 | 3/2005 | Cohen et al. |
| 2005/0080656 | A1 | 4/2005 | Crow et al. |
| 2005/0138173 | A1 | 6/2005 | Ha et al. |
| 2005/0197926 | A1 | 9/2005 | Chinnappan et al. |
| 2005/0267871 | A1 | 12/2005 | Marchisio et al. |
| 2006/0218177 | A1 | 9/2006 | Chang et al. |
| 2007/0038500 | A1 | 2/2007 | Hammitt et al. |
| 2008/0140549 | A1 | 6/2008 | Eder |
| 2009/0077051 | A1 | 3/2009 | Edelstein et al. |

FOREIGN PATENT DOCUMENTS

| | | |
|---|---|---|
| JP | 2001-92827 A | 4/2001 |
| WO | WO 01/15042 A2 | 3/2001 |
| WO | WO 02/05137 A2 | 1/2002 |
| WO | WO 02/31680 A1 | 4/2002 |
| WO | WO 02/080028 A1 | 10/2002 |
| WO | WO 02/099725 A1 | 12/2002 |
| WO | WO 2005/010653 A2 | 2/2005 |
| WO | WO 2006/020343 A1 | 2/2006 |
| WO | WO 2006/071928 A2 | 7/2006 |

OTHER PUBLICATIONS

Klein et al., "The Relation between Ontologies and schema languages" Vrije Universiteit Amsterdam, http:www.cs.vu.nl/~caklein/papers/oil-xmls.pdf, Aug. 2000.

Bechhofer S K et al.: "Terminologies and terminology servers for information environments". Software Technology and Engineering Practice, 1997. Proceedings., Eighth IEEE International Workshop on Yincorporating Computer Aided Software Engineering. London, UK Jul. 14-18, 1997, Los Alamitos, CA USA, IEEE Comput. Soc, US, Jul. 14, 1997, pp. 484-497.

Czejdo, B et al. "Automatic Generation of Ontology Based Annotations in XML and Thrier use in Retrieval Systems", Proceedings of the First International Conference on Web Information Systems Engineering, 2000, vol. 1, pp. 296-300.

Deloule, F et al. "Ontologies and Knowledge Representation", Intelligent Systems for the 21st century, IEEE International Conference on Tools with Artificial Intelligence, 2003, pp. 77-82.

Dimitrov et al: "XML Standards for Ontology Exchange", Proceedings of Ontolex: Ontoogies and Lexical Knowledge Bases, Sep. 8, 2000, pp. 1-68.

Farquhar A et al.: "The Ontolingua Server: a tool for collaborative ontology construction", International Journal of Human- Computer Studies Academic Press UK, vol. 46, No. 6, 1997, pp. 707-727.

Fernandes, Abilio. Snobase, May 2004, 18 pages.

Fikes R et al.: "Distributed repositories of highy expressive reusable ontologies" IEEE Intelligent Systems IEEE USA, vo. 14, No. 2, 1999, pp. 73-79.

Green, Peter. Applying Ontologies to Business and Systems Modeling Techniques and Perspectives: Lessons Learned Journal of Database Management, 15 (2), 105-117, Apr.-Jun. 2004 downloaded from the web: http://www.accessmylibrary.com/coms2/summary_0286-20574539_ITM (1 of 3)Jun. 25, 2009 1:36:42 PM.

Greenhill S et al.: "Noetica: a tool for semantic data modeling", Information Processing and Management, Elsevier, Barking, GB, vol. 34., No. 6, Nov. 1998, pp. 739-760.

Hu Bo et al, "Ontology-based Medical Image Annotation with Description Logics", proceedings, 15th IEEE International Conference on Tools with Artificial Intelligence, 2003, pp. 77-82.

Liu Jin et al, A Methodology for Acquisition of Software Component Attribute Ontology, The Fourth International Conference on Computer and Information Technology, 2004, p. 1058-1064.

McGuiness, Deborah L. et al., DAML+OIL: An Ontology Language for the Semantic Web, IEEE Intelligent Systems, 2002, pp. 72-80.

Mena E et al.: "Observer: an approach for query processing in global information systems based on interoperation across pre- existing ontologies", Cooperative Information Systems, 1996. Proceedings., First IFCIS International Conference in Brussels, Belgium Jun. 19-21, 1996, Los Alamitos, CA, USA, IEEE Comput. Soc P, Jun. 19, 1996, pp. 14-25.

Rosemann, Michael and Green, Peter. Developing a meta model for the Bunge-Wand-Weber Ontological Constructs, Information Systems 27 (2002) 75-91.

Ruiz, Fransisco et al., "A Proposal of a Software Measurement Ontology", Department of Computer Science University of Castilla- La Mancha, Dec. 3, 2008. http://www.frcu.utn.edu.ar/deptos/depto_3/32JAIIO/asse/asse_02.pdf.

SQL definition on Wikipedia download from http://en.wikipedia.org/wiki/SQL on Jun. 26, 2009.

Van Wegan, Bert and De Hoog, Robert, "Measuring the economic value of information systems", Journal of Information Technology (1996) 11, 247-260.

Wang, Yanmei et al. Ontology-based Web Knowledge Management, ICICS-PCM 2003, pp. 1859-1863.

* cited by examiner

RUN-TIME ARCHITECTURE FOR ENTERPRISE INTEGRATION WITH TRANSFORMATION GENERATION

CROSS REFERENCES TO RELATED APPLICATIONS

This application is a divisional application of U.S. patent application Ser. No. 10/104,785, filed Mar. 22, 2002 now U.S. Pat. No. 7,146,399, which is a continuation-in-part of assignee's application U.S. Ser. No. 10/053,045, filed on Jan. 15, 2002 now abandoned, entitled "Method and System for Deriving a Transformation by Referring Schema to a Central Model," which is a continuation-in-part of assignee's application U.S. Ser. No. 09/904,457 filed on Jul. 6, 2001 now U.S. Pat. No. 7,093,200, entitled "Instance Browser for Ontology," which is a continuation-in-part of assignee's application U.S. Ser. No. 09/866,101 filed on May 25, 2001 now U.S. Pat. No. 7,099,885, entitled "Method and System for Collaborative Ontology Modeling."

FIELD OF THE INVENTION

The present invention relates to data schema, and in particular to deriving transformations for transforming data from one schema to another.

BACKGROUND OF THE INVENTION

Ontology is a philosophy of what exists. In computer science ontology is used to model entities of the real world and the relations between them, so as to create common dictionaries for their discussion. Basic concepts of ontology include (i) classes of instances/things, and (ii) relations between the classes, as described hereinbelow. Ontology provides a vocabulary for talking about things that exist.

Instances/Things

There are many kinds of "things" in the world. There are physical things like a car, person, boat, screw and transistor. There are other kinds of things which are not physically connected items or not even physical at all, but may nevertheless be defined. A company, for example, is a largely imaginative thing the only physical manifestation of which is its appearance in a list at a registrar of companies. A company may own and employ. It has a defined beginning and end to its life.

Other things can be more abstract such as the *Homo Sapiens* species, which is a concept that does not have a beginning and end as such even if its members do.

Ontological models are used to talk about "things." An important vocabulary tool is "relations" between things. An ontology model itself does not include the "things," but introduces class and property symbols which can then be used as a vocabulary for talking about and classifying things.

Properties

Properties are specific associations of things with other things. Properties include:

Relations between things that are part of each other, for example, between a PC and its flat panel screen;

Relations between things that are related through a process such as the process of creating the things, for example, a book and its author;

Relations between things and their measures, for example, a thing and its weight.

Some properties also relate things to fundamental concepts such as natural numbers or strings of characters—for example, the value of a weight in kilograms, or the name of a person.

Properties play a dual role in ontology. On the one hand, individual things are referenced by way of properties, for example, a person by his name, or a book by its title and author. On the other hand, knowledge being shared is often a property of things, too. A thing can be specified by way of some of its properties, in order to query for the values of other of its properties.

Classes

Not all properties are relevant to all things. It is convenient to discuss the source of a property as a "class" of things, also referred to as a frame or, for end-user purposes, as a category. Often sources of several properties coincide, for example, the class Book is the source for both Author and ISBN Number properties.

There is flexibility in the granularity to which classes are defined. Cars is a class. Fiat Cars can also be a class, with a restricted value of a manufacturer property. It may be unnecessary to address this class, however, since Fiat cars may not have special properties of interest that are not common to other cars. In principle, one can define classes as granular as an individual car unit, although an objective of ontology is to define classes that have important properties.

Abstract concepts such as measures, as well as media such as a body of water which cannot maintain its identity after coming into contact with other bodies of water, may be modeled as classes with a quantity property mapping them to real numbers.

In a typical mathematical model, a basic ontology comprises:

A set C, the elements of which are called "class symbols;"
For each C∈C, a plain language definition of the class C;
A set P, the elements of which are called "property symbols;"
For each P∈F:
    a plain language definition of P;
    a class symbol called the source of P; and
    a class symbol called the target of P; and
A binary transitive reflexive anti-symmetric relation, I, called the inheritance relation on C×C.

In the ensuing discussion, the terms "class" and "class symbol" are used interchangeably, for purposes of convenience and clarity. Similarly, the terms "property" and "property symbol" are also used interchangeably.

It is apparent to those skilled in the art that if an ontology model is extended to include sets in a class, then a classical mathematical relation on C×D can be considered as a property from C to sets in D.

If $I(C_1, C_2)$ then $C_1$ is referred to as a subclass of $C_2$, and $C_2$ is referred to as a superclass of $C_1$. Also, C, is said to inherit from $C_2$.

A distinguished universal class "Being" is typically postulated to be a superclass of all classes in C.

Variations on an ontology model may include:
Restrictions of properties to unary properties, these being the most commonly used properties;
The ability to specify more about properties, such as multiplicity and invertibility.

The notion of a class symbol is conceptual, in that it describes a generic genus for an entire species such as Books, Cars, Companies and People. Specific instances of the species within the genus are referred to as "instances" of the class. Thus "Gone with the Wind" is an instance of a class for books, and "IBM" is an instance of a class for companies. Similarly, the notions of a property symbol is conceptual, in that it serves as a template for actual properties that operate on instances of classes.

Class symbols and property symbols are similar to object-oriented classes in computer programming, such as C++ classes. Classes, along with their members and field variables, defined within a header file, serve as templates for specific class instances used by a programmer. A compiler uses header files to allocate memory for, and enables a programmer to use instances of classes. Thus a header file can declare a rectangle class with members left, right, top and bottom. The declarations in the header file do not instantiate actual "rectangle objects," but serve as templates for rectangles instantiated in a program. Similarly, classes of an ontology serve as templates for instances thereof.

There is, however, a distinction between C++ classes and ontology classes. In programming, classes are templates and they are instantiated to create programming objects. In ontology, classes document common structure but the instances exist in the real world and are not created through the class.

Ontology provides a vocabulary for speaking about instances, even before the instances themselves are identified. A class Book is used to say that an instance "is a Book." A property Author allows one to create clauses "author of" about an instance. A property Siblings allows one to create statements "are siblings" about instances. Inheritance is used to say, for example, that "every Book is a PublishedWork". Thus all vocabulary appropriate to PublishedWork can be used for Book.

Once an ontology model is available to provide a vocabulary for talking about instances, the instances themselves can be fit into the vocabulary. For each class symbol, C, all instances which satisfy "is a C" are taken to be the set of instances of C, and this set is denoted B(C). Sets of instances are consistent with inheritance, so that $B(C_1) \subseteq B(C_2)$ whenever $C_1$ is a subclass of $C_2$. Property symbols with source $C_1$ and target $C_2$ correspond to properties with source $B(C_1)$ and target $B(C_2)$. It is noted that if class $C_1$ inherits from class $C_1$ then every instance of $C_1$ is also an instance of $C_1$ and it is therefore known already at the ontology stage that the vocabulary of C is applicable to $C_1$.

Ontology enables creation of a model of multiple classes and a graph of properties therebetween. When a class is defined, its properties are described using handles to related classes. These can in turn be used to look up properties of the related classes, and thus properties of properties can be accessed to any depth.

Provision is made for both classes, also referred to as "simple" classes, and "complex" classes. Generally, complex classes are built up from simpler classes using tags for symbols such as intersection, Cartesian product, set, list and bag. The "intersection" tag is followed by a list of classes or complex classes. The "Cartesian product" tag is also followed by a list of classes or complex classes. The set symbol is used for describing a class comprising subsets of a class, and is followed by a single class or complex class. The list symbol is used for describing a class comprising ordered subsets of a class; namely, finite sequences, and is followed by a single class or complex class. The bag symbol is used for describing unordered finite sequences of a class, namely, subsets that can contain repeated elements, and is followed by a single class or complex class. Thus set[C] describes the class of sets of instances of a class C, list[C] describes the class of lists of instances of class C, and bag[C] describes the class of bags of instances of class C.

In terms of formal mathematics, for a set S, set[S] is P(S), the power set of S; bag[S] is $N^S$, where N is the set of non-negative integers; and list[S] is $$\bigcup_{n=i}^{\infty} S^n.$$

There are natural mappings $$\text{list } [S] \xrightarrow{\phi} \text{bag } [S] \xrightarrow{\psi} \text{set } [S]. \tag{1}$$

Specifically, for a sequence $(s_1, s_2, \ldots, s_n) \in \text{list}[S]$, $\phi(s_1, s_2, \ldots, s_n)$ is the element f∈bag[S] that is the "frequency histogram" defined by $f(s)=\#\{1 \leq i \leq n: s_i=s\}$; and for f∈bag [S], $\psi(f) \in \text{set}[S]$ is the subset of S given by the support of f, namely, $\text{supp}(f)=\{s \in S: f(s)>0\}$. It is noted that the composite mapping φψ maps the sequence $(s_1, s_2, \ldots, s_n)$ into the set of its elements $\{s_1, s_2, \ldots, s_n\}$. For finite sets S, set[S] is also finite, and bag[S] and list[S] are countably infinite.

Provision is also made for one-to-one, or unary properties, and for one-to-many properties. The target of a one-to-one property is a simple class. Generally, the target of a one-to-many property is a complex class. For example, a one-to-many property named "children" may have a class Person as its source and a complex class set[Person] as its target, and a one-to-many property named "parents" may have a class Person as its source and a complex class Person×Person as its target.

A general reference on ontology systems is Sowa, John F., "Knowledge Representation," Brooks/Cole, Pacific Grove, Calif., 2000.

Relational database schema (RDBS) are used to define templates for organizing data into tables and fields. SQL queries are used to populate tables from existing tables, generally by using table join operations. Extensible markup language (XML) schema are used to described documents for organizing data into a hierarchy of elements and attributes. XSLT script is used to generate XML documents from existing documents, generally by importing data between tags in the existing documents. XSLT was originally developed in order to generate HTML pages from XML documents.

A general reference on relation databases and SQL is the document "Oracle 9i: SQL Reference," available on-line at http://www.oracle.com. XML, XML schema, XPath and XSLT are standards of the World-Wide Web Consortium, and are available on-line at http://www.w3.org.

Often multiple schema exist for the same source of data, and as such the data cannot readily be imported or exported from one application to another. For example, two airline companies may each run applications that process relational databases, but if the relational databases used by the two companies conform to two different schema, then neither of the companies can readily use the databases of the other company. In order for the companies to share data, it is necessary to export the databases from one schema to another.

There is thus a need for a tool that can transform data conforming to a first schema into data that conforms to a second schema.

SUMMARY OF THE INVENTION

The present invention provides a method and system for deriving transformations for transforming data from one schema to another. The present invention describes a general method and system for transforming data confirming with an input, or source data schema into an output, or target data schema. In a preferred embodiment, the present invention can be used to provide (i) an SQL query, which when applied to relational databases from a source RDBS, populates relational databases in a target RDBS; and (ii) XSLT script which, when applied to documents conforming with a source XML schema generates documents conforming with a target XML schema.

The present invention preferably uses an ontology model to determine a transformation that accomplishes a desired source to target transformation. Specifically, the present invention employs a common ontology model into which both the source data schema and target data schema can be mapped. By mapping the source and target data schema into a common ontology model, the present invention derives interrelationships among their components, and uses the interrelationships to determine a suitable transformation for transforming data conforming to the source data schema into data conforming to the target data schema.

Given a source RDBS and a target RDBS, in a preferred embodiment of the present invention an appropriate transformation of source to target databases is generated by:
(i) mapping the source and target RDBS into a common ontology model;
(ii) representing table columns of the source and target RDBS in terms of properties of the ontology model;
(iii) deriving expressions for target table columns in terms of source table columns; and
(iv) converting the expressions into one or more SQL queries.

Although the source and target RDBS are mapped into a common ontology model, the derived transformations of the present invention go directly from source RDBS to target RDBS without having to transform data via an ontological format. In distinction, prior art Universal Data Model approaches transform via a neutral model or common business objects.

The present invention applies to N relational database schema, where $N \geq 2$. Using the present invention, by mapping the RDBS into a common ontology model, data can be moved from any one of the RDBS to any other one. In distinction to prior art approaches that require on the order of $N^2$ mappings, the present invention requires at most N mappings.

For enterprise applications, SQL queries generated by the present invention are preferably deployed within an Enterprise Application Integration infrastructure. Those skilled in the art will appreciate that transformation languages other than SQL that are used by enterprise application infrastructures can be generated using the present invention. For example, IBM's ESQL language can similarly be derived for deployment on their Websphere MQ family of products.

Given a source XML schema and a target XML schema, in a preferred embodiment of the present invention an appropriate transformation of source to target XML documents is generated by:
(i) mapping the source and target XML schema into a common ontology model;
(ii) representing elements and attributes of the source and target XML schema in terms of properties of the ontology model;
(iii) deriving expressions for target XML elements and XML attributes in terms of source XML elements and XML attributes; and
(iv) converting the expressions into an XSLT script.

There is thus provided in accordance with a preferred embodiment of the present invention an enterprise application system including a run-time transformation server, and a message broker for routing and transforming data in the form of messages between a source application and a target application, including a plug-in for preparing requests to the run-time transformation server and for processing responses from the run-time transformation server.

There is further provided in accordance with a preferred embodiment of the present invention a method for transforming data within an enterprise application product, including receiving a message from a source application, the message conforming to a source data schema, generating a transformation for transforming messages conforming to the source data schema to corresponding messages conforming to a target data schema, transforming the message from the source data schema to the target data schema using the generated transformation, and sending the transformed message to a target application.

There is yet further provided in accordance with a preferred embodiment of the present invention an ontology modeler including a class builder for generating and editing classes within an ontology model, a property builder for generating and editing properties of classes within the ontology model, and a business rules builder for generating and editing business rules involving properties of classes within the ontology model.

There is additionally provided in accordance with a preferred embodiment of the present invention a method for building ontology models including generating classes within an ontology model, generating properties of classes within the ontology model, and generating business rules involving properties of classes within the ontology model.

There is moreover provided in accordance with a preferred embodiment of the present invention A schema-to-ontology mapper, including a storage for storing a schema, the schema including at least one primary data structure, the primary data structure having at least one ancillary data structure, and a map generating for generating a plurality of mappings, including a class mapper for defining a primary mapping that is a correspondence between a primary data structure of the schema and a class of an ontology model, and a property mapper for defining an ancillary relationship between an ancillary data structure of the primary data structure and at least one property of the class.

There is further provided in accordance with a preferred embodiment of the present invention a method for mapping a schema to an ontology model, including receiving a schema, the schema including at least one primary data structure, the primary data structure having at least one ancillary data structure, and generating a plurality of mappings, including defining a primary mapping that is a correspondence between a primary data structure of the schema and a class of an ontology model, and defining an ancillary relationship between a secondary data structure of the primary data structure and at least one property of the class.

There is yet further provided in accordance with a preferred embodiment of the present invention a schema transformation generator including a storage for storing a first mapping of a first schema into a central ontology model, and a second mapping of a second schema into the central ontology model, wherein the first schema includes at least one first primary data structure, the first primary data structure having at least one first ancillary data structure, wherein the second schema includes at least one second primary data structure, the second primary data structure having at least one second ancillary data structure, wherein the first mapping includes at least one first primary mapping that is a correspondence between at least one first primary data structure of the first schema and a class of the central ontology model, and at least one first relationship between at least one first ancillary data structure of a first primary data structure and at least one property of a class, and wherein the second mapping includes at least one second primary mapping that is a correspondence between at least one second primary data structure of the second schema and a class of the central ontology model, and at least one second relationship between at least one second ancillary data structure of a second primary data structure and at least one property of a class, and a transformation generator for generating a transformation from the first schema into the second schema, using the first and second primary mappings and the first and second relationships.

There is yet further provided in accordance with a preferred embodiment of the present invention a method for generating a schema transformation including storing a first mapping of a first schema into a central ontology model, and a second mapping of a second schema into the central ontology model, wherein the first schema includes at least one first primary data structure, the first primary data structure having at least one first ancillary data structure, wherein the second schema includes at least one second primary data structure, the second primary data structure having at least one second ancillary data structure, wherein the first mapping includes at least one first primary mapping that is a correspondence between at least one first primary data structure of the first schema and a class of the central ontology model, and at least one first relationship between at least one first ancillary data structure of a first primary data structure and at least one property of a class, and wherein the second mapping includes at least one second primary mapping that is a correspondence between at least one second primary data structure of the second schema and a class of the central ontology model, and at least one second relationship between at least one second ancillary data structure of a second primary data structure and at least one property of a class, and generating a transformation from the first schema into the second schema, using the first and second primary mappings and the first and second relationships.

BRIEF DESCRIPTION OF THE DRAWINGS

The present invention will be more fully understood and appreciated from the following detailed description, taken in conjunction with the drawings in which:

FIGS. 9A-9E are illustrations of a user interface for a software application that transforms data from one relational database schema to another, in accordance with a preferred embodiment of the present invention;

DETAILED DESCRIPTION OF A PREFERRED EMBODIMENT

The present invention concerns deriving transformations for transforming data conforming with one data schema to data conforming to another data schema. Preferred embodiments of the invention are described herein with respect to table-based data schema such as RDBS, and document-based data schema such as XML schema.

Figure 1:
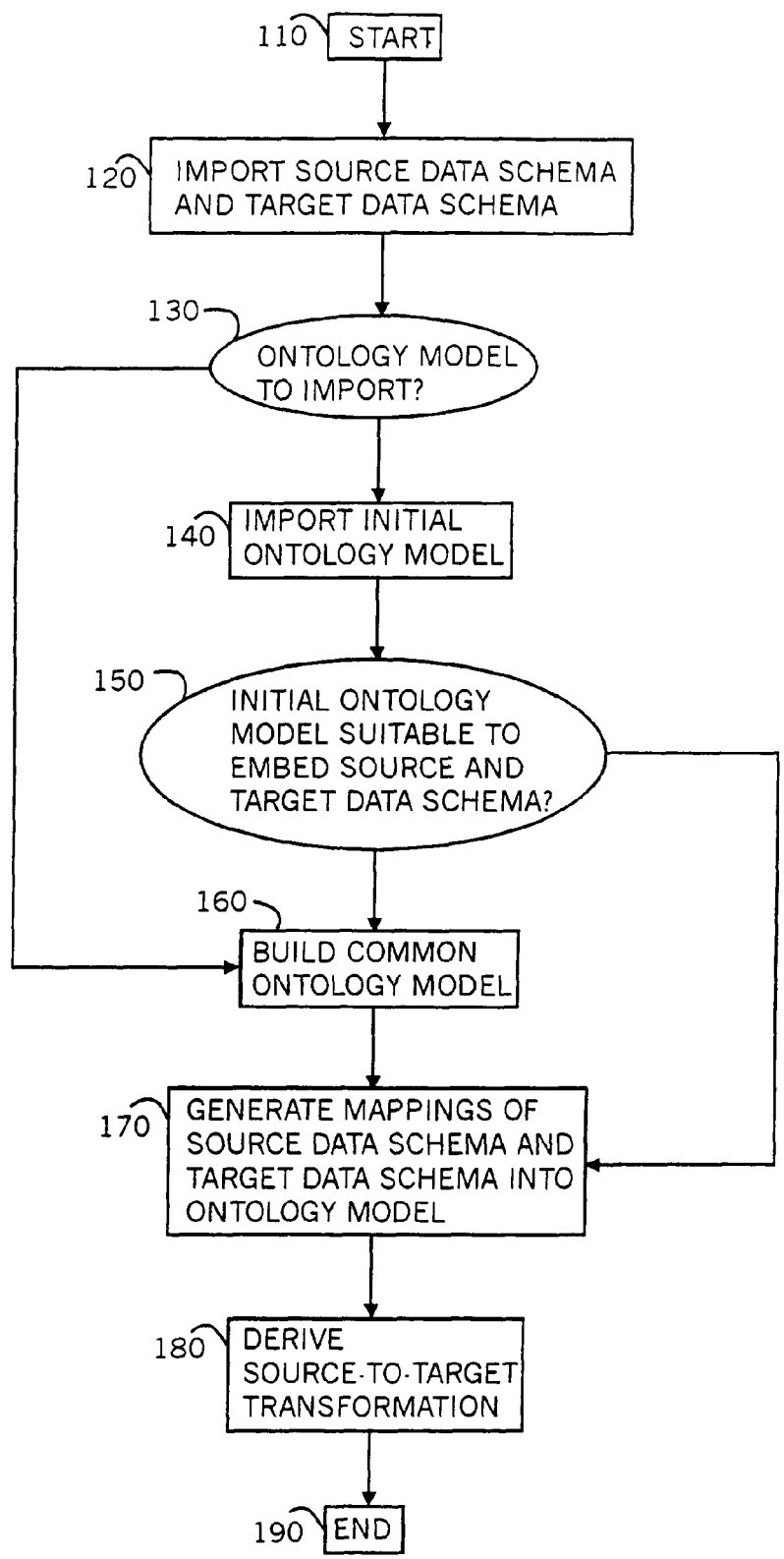
FIG. 1 is a simplified flowchart of a method for deriving transformations for transforming data from one schema to another, in accordance with a preferred embodiment of the present invention.

Reference is now made to FIG. 1, which is a simplified flowchart of a method for deriving transformations for transforming data from one schema to another, in accordance with a preferred embodiment of the present invention. The flowchart begins at step 110. At step, 120 a source data schema and a target data schema are imported. These data schema describe templates for storing data, such as templates for tables and table columns, or templates for structured documents. If necessary, the source data schema and/or the target data schema may be converted from a standard format to an internal format. For example, they may be converted from Oracle format to an internal format.

At steps 130-160 a common ontology model is obtained, into which the source data schema and the target data schema can both be embedded. At step 130 a determination is made as to whether or not an initial ontology model is to be imported. If not, logic passes directly to step 160. Otherwise, at step 140 an initial ontology model is imported. If necessary, the initial ontology model may be converted from a standard format, such as one of the formats mentioned hereinabove in the Background, to an internal format.

At step 150 a determination is made as to whether or not the initial ontology model is suitable for embedding both the source and target data schema. If so, logic passes directly to step 170. Otherwise, at step 160 a common ontology model is built. If an initial ontology model was exported, then preferably the common ontology is built by editing the initial ontology model; specifically, by adding classes and properties thereto. Otherwise, the common ontology model is built from scratch. It may be appreciated that the common ontology model may be built automatically with or without user assistance.

At step 170 the source and target data schema are mapped into the common ontology model, and mappings therefor are generated. At step 180 a transformation is derived for transforming data conforming with the source data schema into data conforming with the target data schema, based on the mappings derived at step 170. Finally, the flowchart terminates at step 190.

Figure 2:
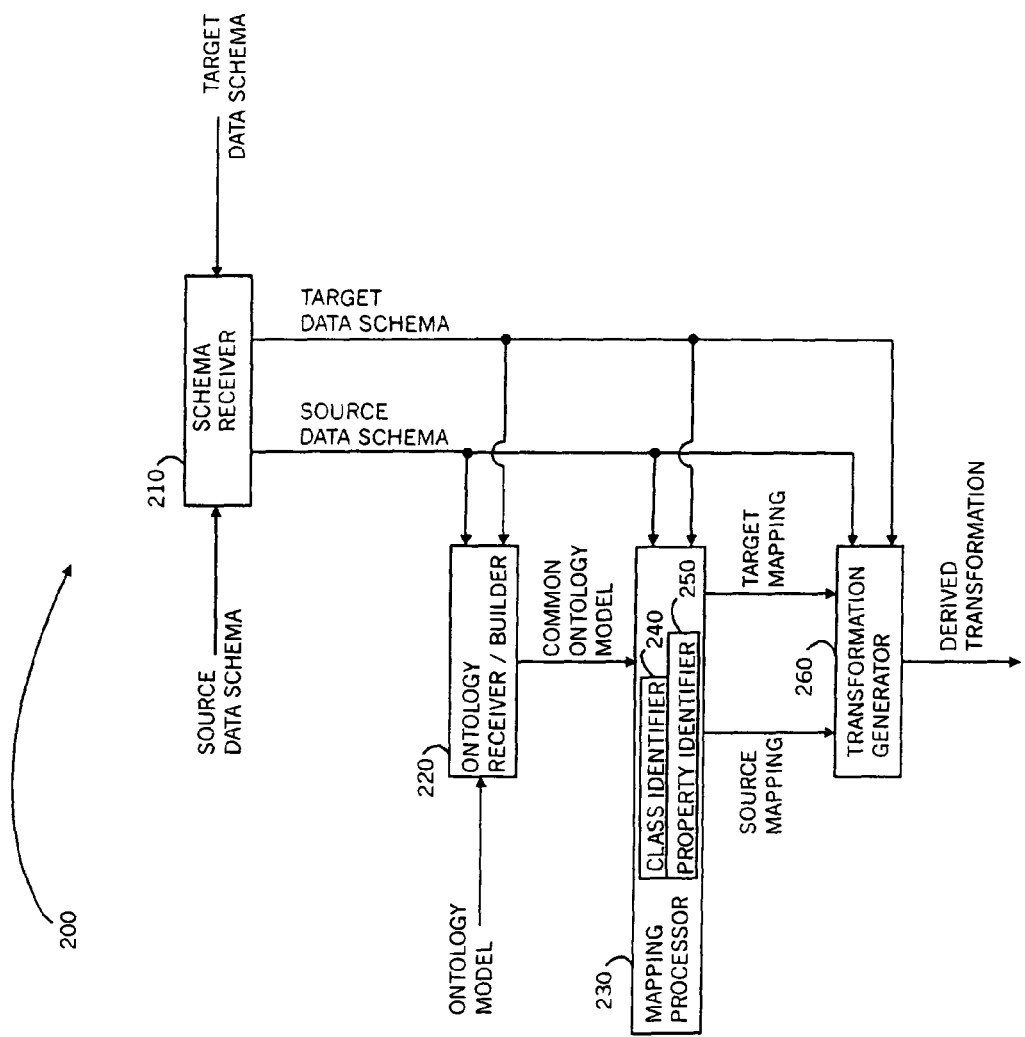
FIG. 2 is a simplified block diagram of a system for deriving transformations for transforming data from one schema to another, in accordance with a preferred embodiment of the present invention.

Reference is now made to FIG. 2, which is a simplified block diagram of a system 200 for deriving transformations for transforming data from one schema to another, in accordance with a preferred embodiment of the present invention. Shown in FIG. 2 is a schema receiver 210 for importing a source data schema and a target data schema. These data schema describe templates for storing data, such as templates for tables and table columns, and templates for structured documents. If necessary, schema receiver 210 converts the source and target data schema from an external format to an internal format.

Also shown in FIG. 2 is an ontology receiver/builder 220 for obtaining a common ontology model, into which the source data schema and the target data schema can both be embedded. The operation of ontology receiver/builder 220 is described hereinabove in steps 130-160 of FIG. 1.

The source and target data schema, and the common ontology model are used by a mapping processor 230 to generate respective source and target mappings, for mapping the source data schema into the common model and for mapping the target data schema into the common ontology model. In a preferred embodiment of the present invention, mapping processor 230 includes a class identifier 240 for identifying ontology classes with corresponding to components of the source and target data schema, and a property identifier 250 for identifying ontology properties corresponding to other components of the source and target data schema, as described in detail hereinbelow.

Preferably, the source and target mappings generated by mapping processor, and the imported source and target data schema are used by a transformation generator 260 to derive a source-to-target transformation, for transforming data conforming to the source data schema into data conforming to the target data schema.

Figure 3:
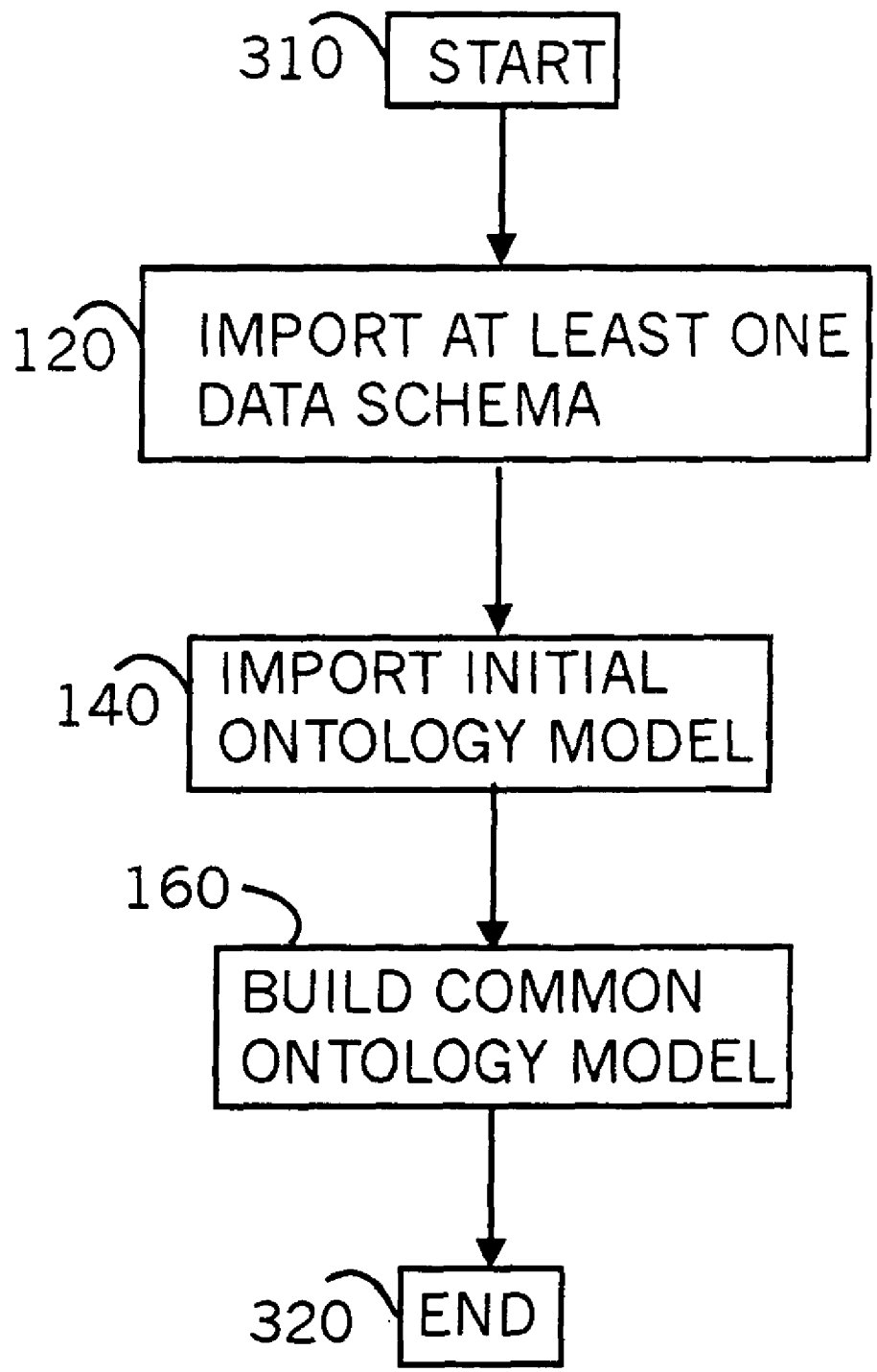
FIG. 3 is a simplified flowchart of a method for building a common ontology model into which one or more data schema can be embedded, in accordance with a preferred embodiment of the present invention.

Reference is now made to FIG. 3, which is a simplified flowchart of a method for building a common ontology model into which one or more data schema can be embedded, in accordance with a preferred embodiment of the present invention. The flowchart begins are step 310. Steps 120, 140 and 160 are similar to these same steps in FIG. 1, as described hereinabove. Finally, the flowchart terminates at step 320.

Figure 4:
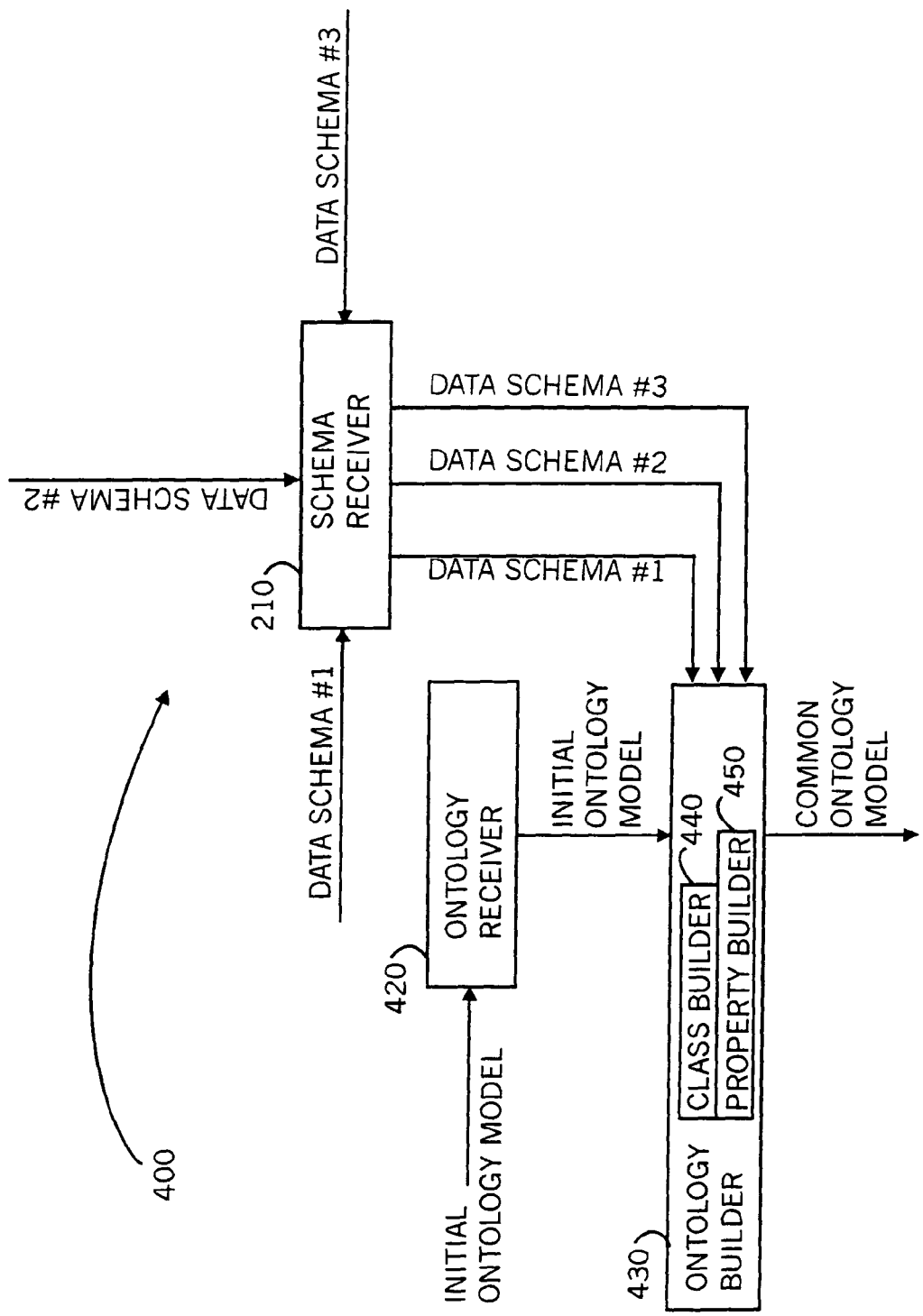
FIG. 4 is a simplified block diagram of a system for building a common ontology model into which one or more data schema can be embedded, in accordance with a preferred embodiment of the present invention.

Reference is now made to FIG. 4, which is a simplified block diagram of a system 400 for building a common ontology model into which one or more data schema can be embedded, in accordance with a preferred embodiment of the present invention. Shown in FIG. 4 is schema receiver 210 from FIG. 2 for importing data schema. Also shown in FIG. 4 is an ontology receiver 420, for importing an initial ontology model. If necessary, ontology receiver 420 converts the initial ontology model from an external format to an internal format.

The initial ontology model and the imported data schemas are used by an ontology builder 430 for generating a common ontology model, into which the imported data schemas can all be embedded. In a preferred embodiment of the present invention, ontology builder 430 generates the common ontology model by editing the initial ontology model; specifically, by using a class builder 440 to add classes thereto based on components of the imported data schema, and by using a property builder 450 to add properties thereto based on other components of the imported data schema.

A feature of the present invention is the capability to generate test instances of classes. In a preferred embodiment, a test instance is represented as an XML document that describes the instance and some or all of the values of its properties. Generation of test instances is enabled both manually, by a user filling in property values, and automatically without user intervention.

Applications of the present invention include inter alia:
integrating between two or more applications that need to share data;
transmitting data from a database schema across a supply chain to a supplier or customer using a different database schema;
moving data from two or more databases with different schemas into a common database, in order that queries may be performed across the two or more databases;
loading a data warehouse database for off-line analysis of data from multiple databases;
synchronizing two databases;
migrating data when a database schema is updated;
moving data from an old database or database application to a replacement database or database application, respectively; and
data cleansing where multiple databases store data with redundancy and perhaps with inconsistencies.

Relational Database Schema

Relational database schema (RDBS), also referred to as table definitions or, in some instances, metadata, are used to define templates for organizing data into tables and table columns, also referred to as fields. Often multiple schema exist for the same source of data, and as such the data cannot readily be imported or exported from one application to another. The present invention describes a general method and system for transforming an input, or source relational database schema into an output, or target schema. In a preferred embodiment, the present invention can be used to provide an SQL query, which when applied to a relational database from the source schema, produces a relational database in the target schema.

As described in detail hereinbelow, the present invention preferably uses an ontology model to determine an SQL query that accomplishes a desired source to target transformation. Specifically, the present invention employs a common ontology model into which both the source RDBS and target RDBS can be mapped. By mapping the source and target RDBS into a common ontology model, the present invention derives interrelationships among their tables and fields, and uses the interrelationships to determine a suitable SQL query for transforming databases conforming with the source RDBS into databases conforming with the target RDBS.

The present invention can also be used to derive executable code that transforms source relational databases into the target relational databases. In a preferred embodiment, the present invention creates a Java program that executes the SQL query using the JDBC (Java Database Connectivity) library. In an alternative embodiment the Java program manipulates the databases directly, without use of an SQL query.

For enterprise applications, SQL queries generated by the present invention are preferably deployed within an Enterprise Application Integration infrastructure.

Although the source and target RDBS are mapped into a common ontology model, the derived transformations of the present invention go directly from source RDBS to target RDBS without having to transform data via an ontological format. In distinction, prior art Universal Data Model approaches transform via a neutral model.

The present invention applies to N relational database schema, where $N \geq 2$. Using the present invention, by mapping the RDBS into a common ontology model, data can be moved from any one of the RDBS to any other one. In distinction to prior art approaches that require on the order of $N^2$ mappings, the present invention requires at most N mappings.

A "mapping" from an RDBS into an ontology model is defined as:
(i) an association of each table from the RDBS with a class in the ontology model, in such a way that rows of the table correspond to instances of the class; and
(ii) for each given table from the RDBS, an association of each column of the table with a property or a composition of properties in the ontology model, the source of which is the class corresponding to the given table and the target of which has a data type that is compatible with the data type of the column.

A mapping from an RDBS into an ontology model need not be subjective. That is, there may be classes and properties in the ontology that do not correspond to tables and columns, respectively, in the RDBS. A mapping is useful in providing a graph representation of an RDBS.

In general, although a mapping from an RDBS into an ontology model may exist, the nomenclature used in the RDBS may differ entirely from that used in the ontology model. Part of the utility of the mapping is being able to translate between RDBS language and ontology language. It may be appreciated by those skilled in the art, that in addition to translating between RDBS table/column language and ontology class/property language, a mapping is also useful in translating between queries from an ontology query language and queries from an RDBS language such as SQL (standard query language).

Figure 5:
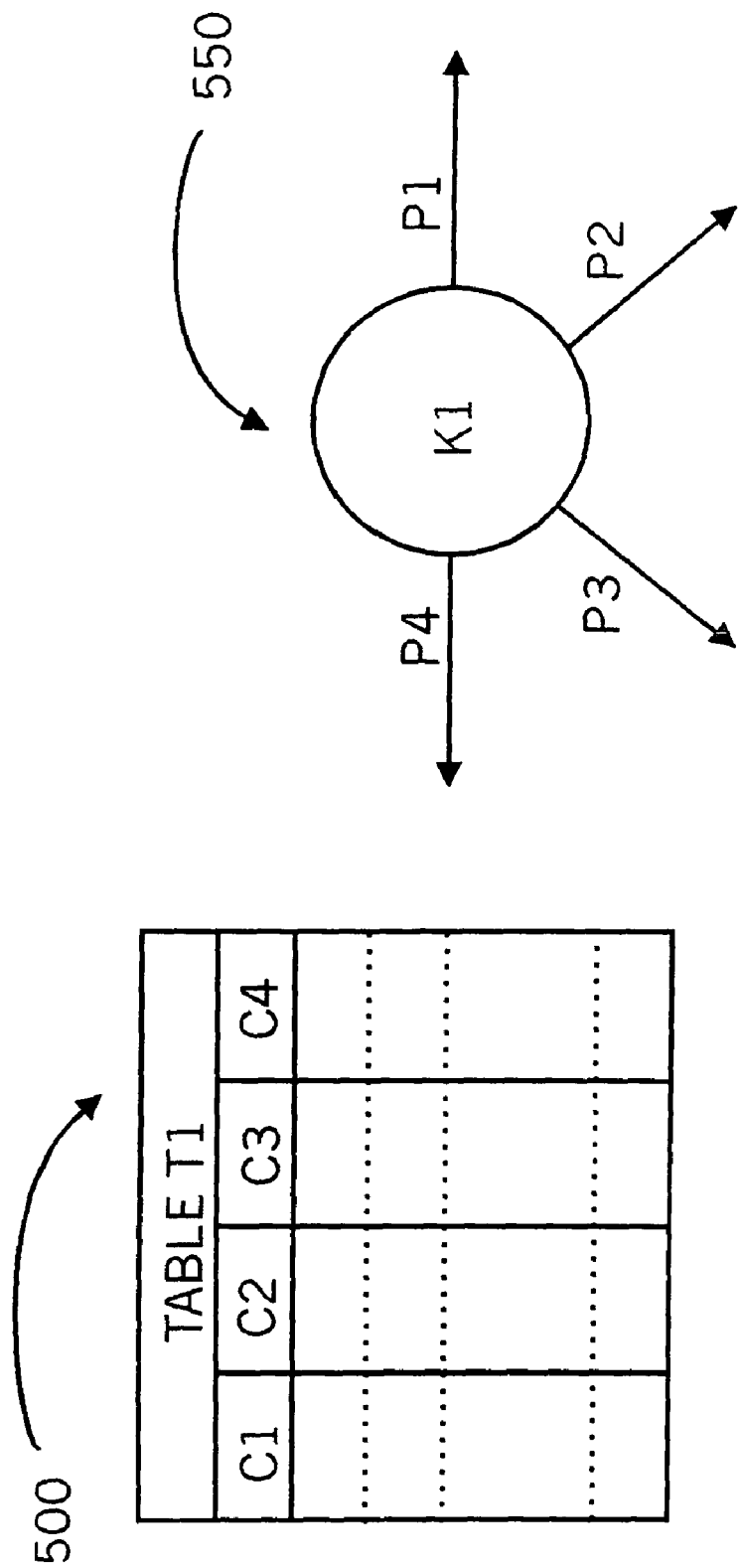
FIG. 5 is a simplified illustration of a mapping from an RDBS into an ontology model, in accordance with a preferred embodiment of the present invention.

Reference is now made to FIG. 5, which is a first simplified illustration of a mapping from an RDBS into an ontology model, in accordance with a preferred embodiment of the present invention. Shown in FIG. 5 is a table 500, denoted T1, having four columns denoted C1, C2, C3 and C4. Also shown in FIG. 1 is an ontology model 550 having a class denoted K1 and properties P1, P2, P3 and P4 defined on class T1. The labeling indicates a mapping from table T1 into class K1, and from columns C1, C2, C3 and C4 into respective properties P1, P2, P3 and P4.

Figure 6:
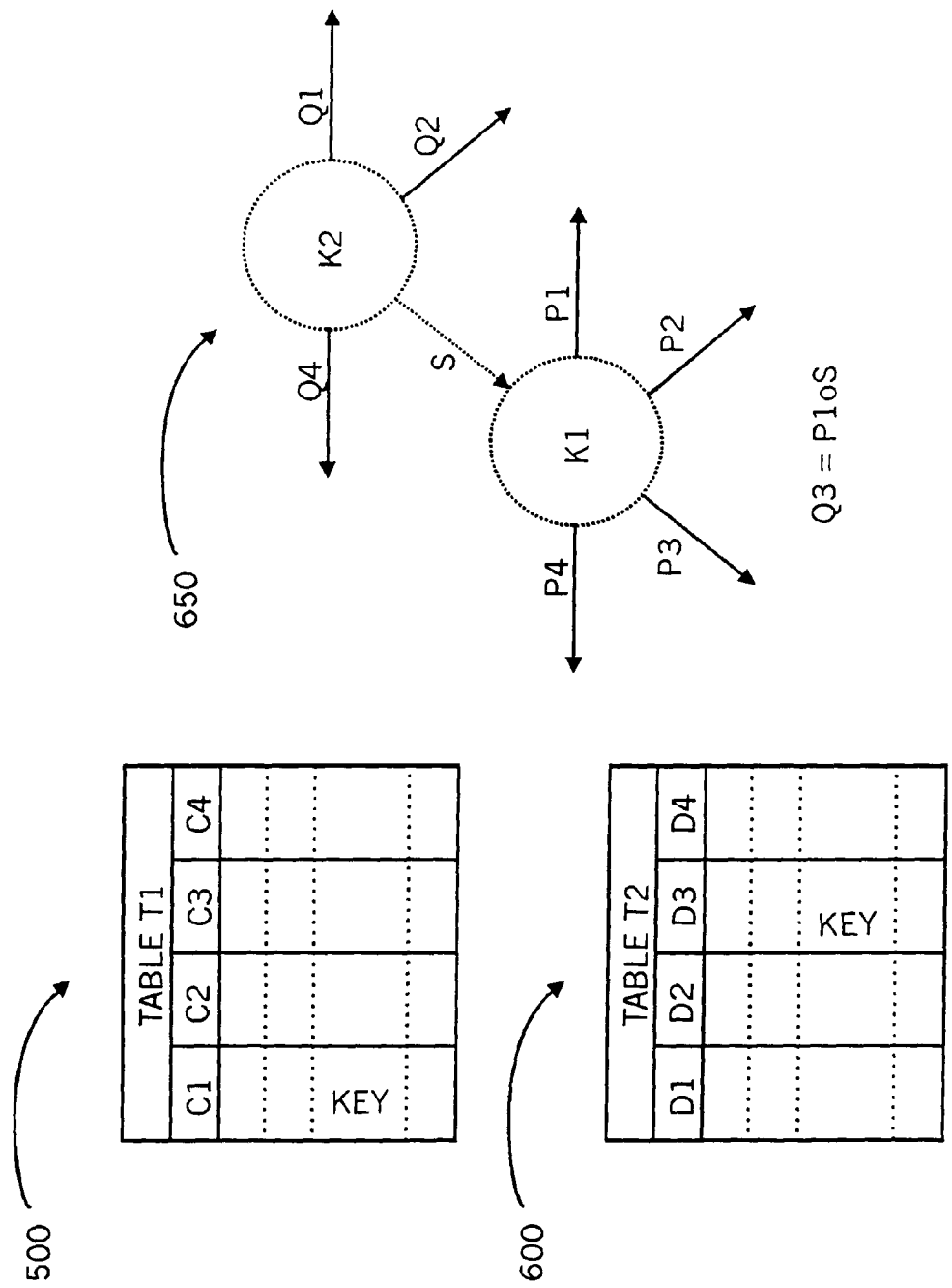
FIG. 6 is a second simplified illustration of a mapping from an RDBS into an ontology model, in accordance with a preferred embodiment of the present invention.

Reference is now made to FIG. 6, which is a second simplified illustration of a mapping from an RDBS into an ontology model, in accordance with a preferred embodiment of the present invention. Shown in FIG. 6 are table T1 from FIG. 5, and a second table 600, denoted T2, having four columns denoted D1, D2, D3 and D4. Column C1 of table T1 is a key; i.e., each entry for column C1 is unique, and can be used as an identifier for the row in which it is situated Column D3 of table T2 refers to table T1, by use of the key from column C1. That is, each entry of column D3 refers to a row within table T1, and specifies such row by use of the key from C1 for the row.

Also shown in FIG. 6 is an ontology model 650 having two classes, denoted K1 and K2. Class K1 has properties P1, P2, P3 and P4 defined thereon, and class K2 has properties Q1, Q2, Q4 and S defined thereon. Property S has as its source class K1 and as its target class K2. The labeling indicates a mapping from table T1 into class K1, and from columns C1, C2, C3 and C4 into respective properties P1, P2, P3 and P4. The fact that C1 serves as a key corresponds to property P1 being one-to-one, so that no two distinct instances of class K1 have the same values for property P1.

The labeling also indicates a mapping from table T2 into class K2, and from columns D1, D2 and D4 into respective properties Q1, Q2 and Q4. Column D3 corresponds to a composite property PloS, where o denotes function composition. In other words, column D3 corresponds to property P1 of S(K2).

The targets of properties P1, P2, P3, P4, Q1, Q2 and Q4 are not shown in FIG. 6, since these properties preferably map into fundamental types corresponding to the data types of the corresponding columns entries. For example, the target of P1 may be an integer, the target of P2 may be a floating-point number, and the target of P3 may be a character string. Classes for such fundamental types are not shown in order to focus on more essential parts of ontology model 650.

Classes K1 and K2, and property S are indicated with dotted lines in ontology model 650. These parts of the ontology are transparent to the RDBS underlying tables T1 and T2. They represent additional structure present in the ontology model, which is not directly present in the RDBS.

Given a source RDBS and a target RDBS, in a preferred embodiment of the present invention an appropriate transformation of source to target RDBS is generated by:
(i) mapping the source and target RDBS into a common ontology model;
(ii) representing fields of the source and target RDBS in terms of properties of the ontology model, using symbols for properties;
(iii) deriving expressions for target symbols in terms of source symbols; and
(iv) converting the expressions into one or more SQL queries.

Figure 7:
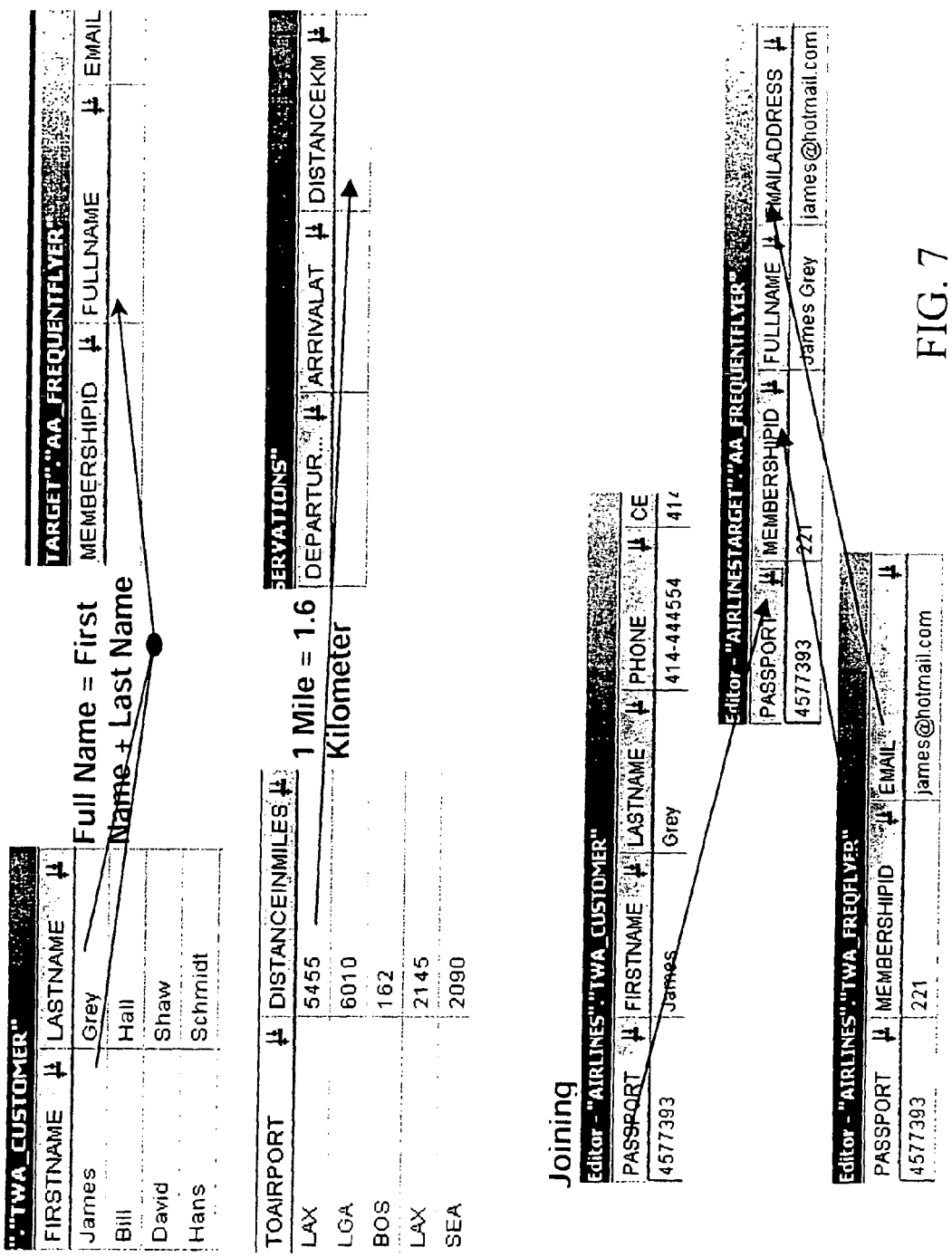
FIG. 7 is a simplified illustration of relational database transformations involving constraints and joins, in accordance with a preferred embodiment of the present invention.

Reference is now made to FIG. 7, which is a simplified illustration of relational database transformations involving constraints and joins, in accordance with a preferred embodiment of the present invention.

XML Schema

As described in detail hereinbelow, the present invention preferably uses an ontology model to determine an XSLT transformation that accomplishes a desired source to target transformation. Specifically, the present invention employs a common ontology model into which both the source XML schema and target XML schema can be mapped. By mapping the source and target XML schema into a common ontology model, the present invention derives interrelationships among their elements and attributes, and uses the interrelationships to determine suitable XSLT script for transforming documents generating documents conforming to the target XML schema from documents conforming to the source XML schema.

It may be appreciated by those skilled in the art that the present invention applies to structured document formats other than XML. For example, it applies inter alia to the message formats of Tibco Active Enterprise and IBM WebsphereMQ. Similarly, the present invention applies to transformation languages other than XSLT. For example, it applies inter alia to ESQL, which is the transformation language of IBM WebsphereMQ and to the transformations used by Tibco MessageBroker.

It may be appreciated by those skilled in the art that the present invention can be employed to run in batch mode, in response to GUI commands at design-time, and also in run-time mode, to generate transformations dynamically on the fly.

The present invention can also be used to derive executable code that transforms source XML documents into the target XML documents. In a preferred embodiment, the present invention packages the derived XSLT script with a Java XSLT engine to provide an executable piece of Java code that can execute the transformation.

Preferably, this is used to deploy XSLT scripts within an EAI product such as Tibco. Specifically, in a preferred embodiment of the present invention, a function (similar to a plug-in) is installed in a Tibco MessageBroker, which uses the Xalan XSLT engine to run XSLT scripts that are presented in text form. As an optimization, the XSLT script files are preferably compiled to Java classfiles.

Figure 8A:
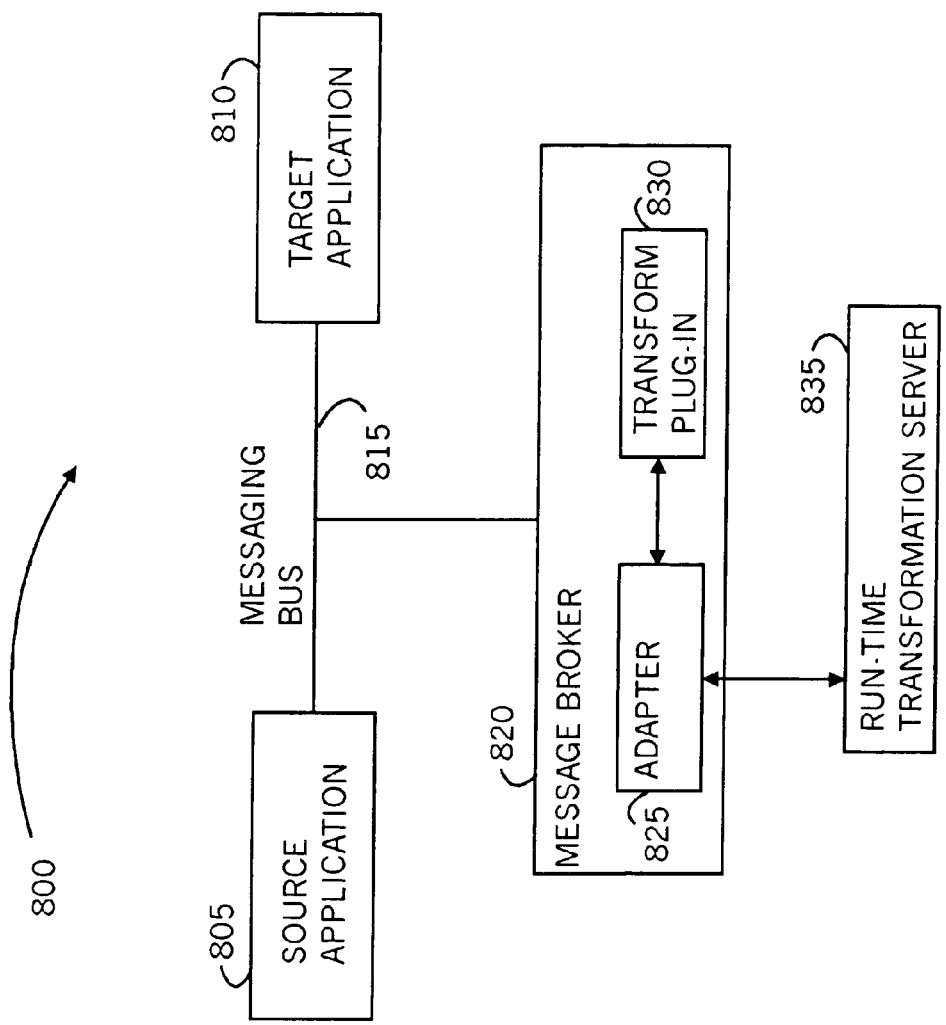
FIG. 8A is a simplified block diagram of a run-time architecture for implementing a preferred embodiment of the present invention within an enterprise application integration system.

Reference is now made to FIG. 8A, which is a simplified block diagram of a run-time architecture for implementing a preferred embodiment of the present invention within an enterprise application integration system. Shown in FIG. 8A is an enterprise system 800 including a source application 805, such as an enterprise accounting system, and a target application 810, such as an enterprise inventory system. Source application 805 and target application 810 communicate via a messaging bus 815. Typically, source application 805 sends information to target application 810 in the form of documents containing data. However, source application 805 and target application 810 may use different schema for data representation. A document processed by source application 805 typically must conform to a source data schema used by source application 805, and similarly a document processed by target application 810 typically must conform to a target data schema used by target application 810. Thus in general documents prepared by source application 805 are not in a proper format to be understood by target application 810.

To facilitate document routing and transformation, a Message Broker 820 is used to perform simple address-based and rule-based routing and transformation. Message Broker 820 is typically part of an enterprise application integration (EA) product, such as IBM's WebsphereMQ or Tibco's Active Enterprise. "Message Broker" is a term used by Tibco. Within IBM WebsphereMQ, it is referred to as an "Integrator." For purposes of clarity the name Message Broker is used henceforth within the present specification.

Message Broker 820 includes an adapter 825 and a transform plug-in 830. Adapter 825 is a component that enables Message Broker 820 to communicate with outside software. For example, adapter 825 may be used to query a database or to get information from an enterprise information system such as SAP. Plug-in 830 is a component that is dynamically loaded into Message Broker 820. Plug-in 830 is used to run XSLT within enterprise applications such as Tibco Active Enterprise and IBM WebsphereMQ, which use their own transformation languages.

For some EAI systems, use of adapter 825 may be optional. Generally, though, vendors of EAI systems recommend use of an adapter, rather than direct network access by plug-in 830. Adapter 825 may implement either (i) proprietary application programming interfaces (APIs) exposed by Message Broker 820, such as Tibco Message Broker or WebsphereMQ Integrator, or (ii) cross-platform APIs, such as Java Connector Architecture.

Also shown in FIG. 8A is a run-time transformation server 835, which communicates with plug-in 830 via adapter 825. In a preferred embodiment of the present invention, run-time transformation server 835 is used to assist Message Broker 820 in converting documents from the source schema to the target schema Plug-in 830 is used to prepare requests and process responses for run-time transformation server 835. There are several embodiments regarding the role of transformation server 835, three of which are described in FIGS. 8B-8D. For enterprise applications that run XSLT natively, plug-in 830 may not be necessary. Specifically, for architectures based on the implementation illustrated in FIG. 8B, where run-time transformation server 835 is not used and the purpose of plug-in 830 is to run XSLT scripts, plug-in 830 is not necessary for enterprise applications that run XSLT natively. However, for architectures based on implementations which use run-time transformation server 835, such as the implementations illustrated in FIGS. 8C and 8D, plug-in 830 is also used to prepare responses and process requests from run-time transformation server 835 and, as such, is a necessary component even within enterprise applications that run XSLT natively.

Communication between adapter 825 and run-time transformation server 835 is preferably achieved using an appropriate network request-response protocol.

It may be appreciated by those skilled in the art that one or more additional nodes may serve as protocol bridges between adapter 825 and run-time transformation server 835, translating among different network protocols. For example, in one implementation of the present invention, adapter 825 communicates using Simple Object Access Protocol (SOAP) Web Services with a SOAP Web Services server, such as Apache Jakarta Tomcat with Apache Axis. Such a SOAP Web Services server acts as a bridge, passing communication over Remote Method Invocation (RMI) to run-time transformation server 835.

Information about SOAP and Web Services is available though the World-Wide-Web Consortium at http://www.w3.org/2002/ws.

Figure 8B:
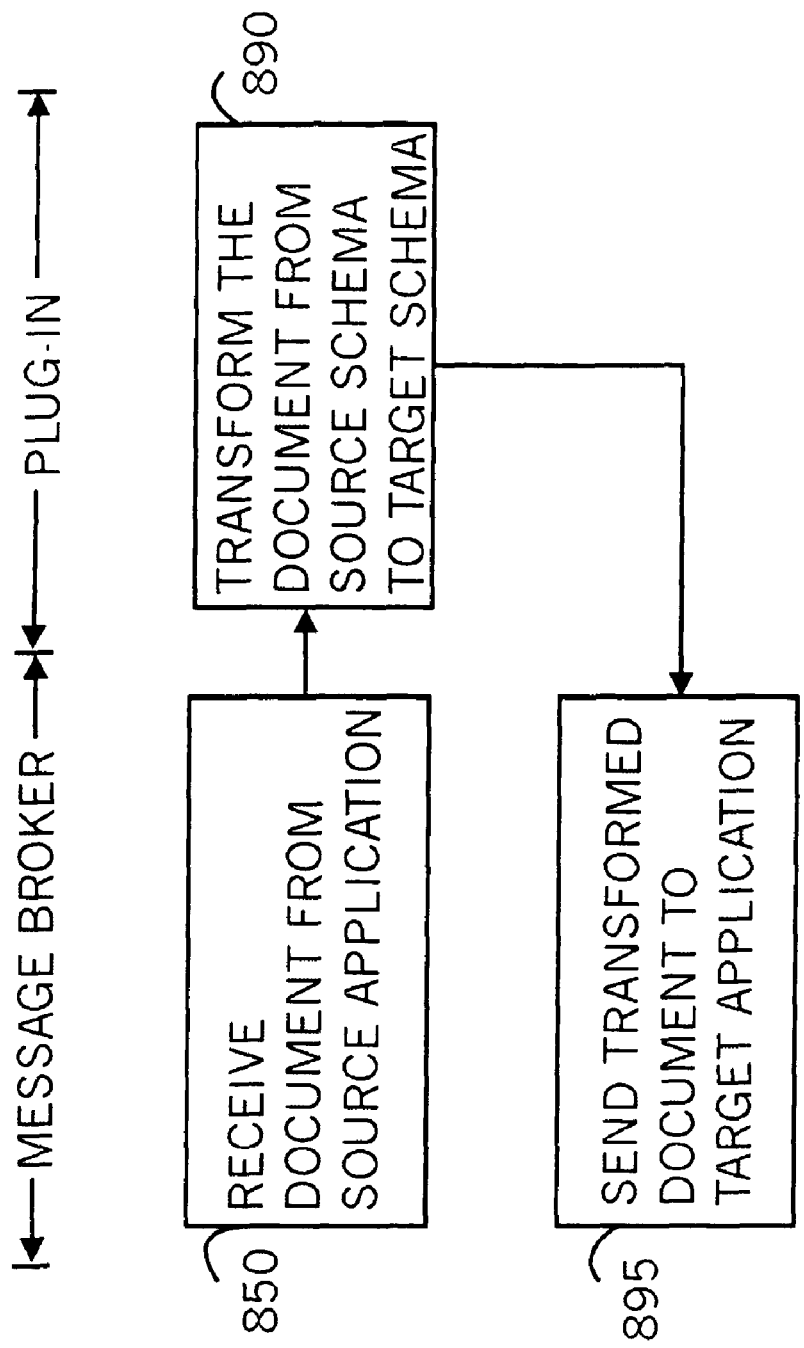
FIGS. 8B-8D are simplified flowcharts for alternative implementations of the present invention within an enterprise application integration system.

Reference is now made to FIG. 8B, which is a simplified flowchart for a first implementation of the present invention within an enterprise application integration system. In this first implementation, run-time transformation server 835 is not used. At step 850 Message Broker 820 receives a document from source application 805, intended for target application 810. In this first implementation, Message Broker 820 is configured to know the source schema and target schema, and to know which transformation to use for a given source schema and target schema. At step 890 plug-in 830 runs the specified transformation and transforms the document from the source schema to the target schema. At step 895, Message Broker 820 sends the transformed document to target application 810.

Figure 8C:
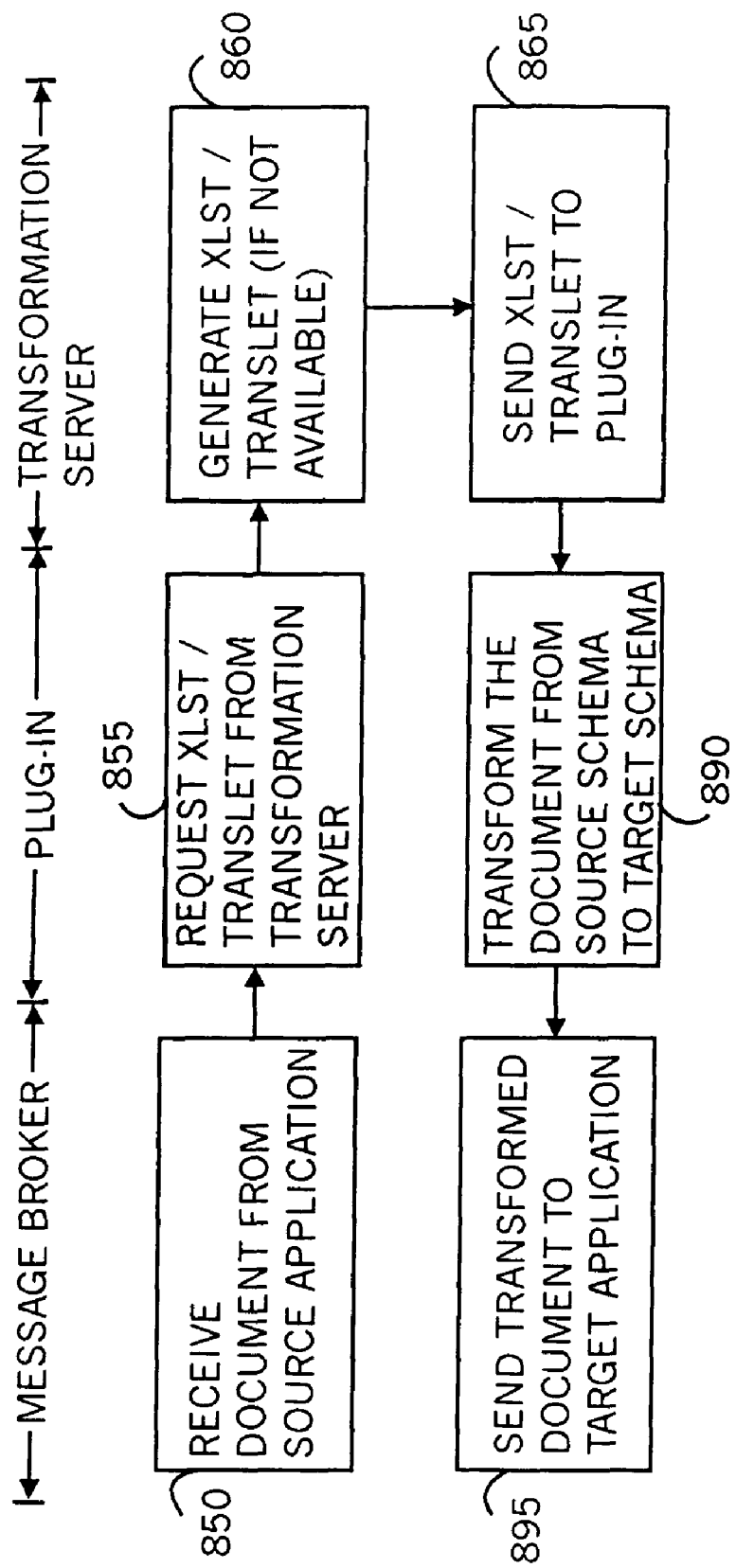

Reference is now made to FIG. 8C, which is a simplified flowchart for a second implementation of the present invention within an enterprise application integration system. In this second implementation run-time transformation server 835 is used to provide plug-in 830 with an appropriate transformation, such as an appropriate XSLT file. At step 850, Message Broker 820 receives a document from source application 805, intended for target application 810. In this second implementation, Message Broker 820 is configured to know the source and target schema, but not the transformation. Preferably, Message Broker 820 extracts an identifier for the source schema from an XML document received from source application 805. At step 855, plug-in 830 requests a transformation, such as an XSLT file or XSLT translet, from run-time transformation server 835. Preferably, plug-in 830 issues a request to run-time transformation server 835 specifying a source and target schema and requesting a transformation therebetween.

At step 860 run-time transformation server 835 generates the requested transformation, in accordance with a preferred embodiment of the present invention. It may be appreciated by those skilled in the art that run-time transformation server 835 may already have the requested transformation available, for example, having cached it from a previous request, or having it otherwise available in a memory store. In such a case, step 860 is omitted. At step 865 run-time transformation server 835 sends the requested transformation to plug-in 830. At step 890 plug-in 830 runs the specified transformation and transforms the document to the target schema. At step 895, Message Broker 820 sends the transformed document to target application 810.

Figure 8D:
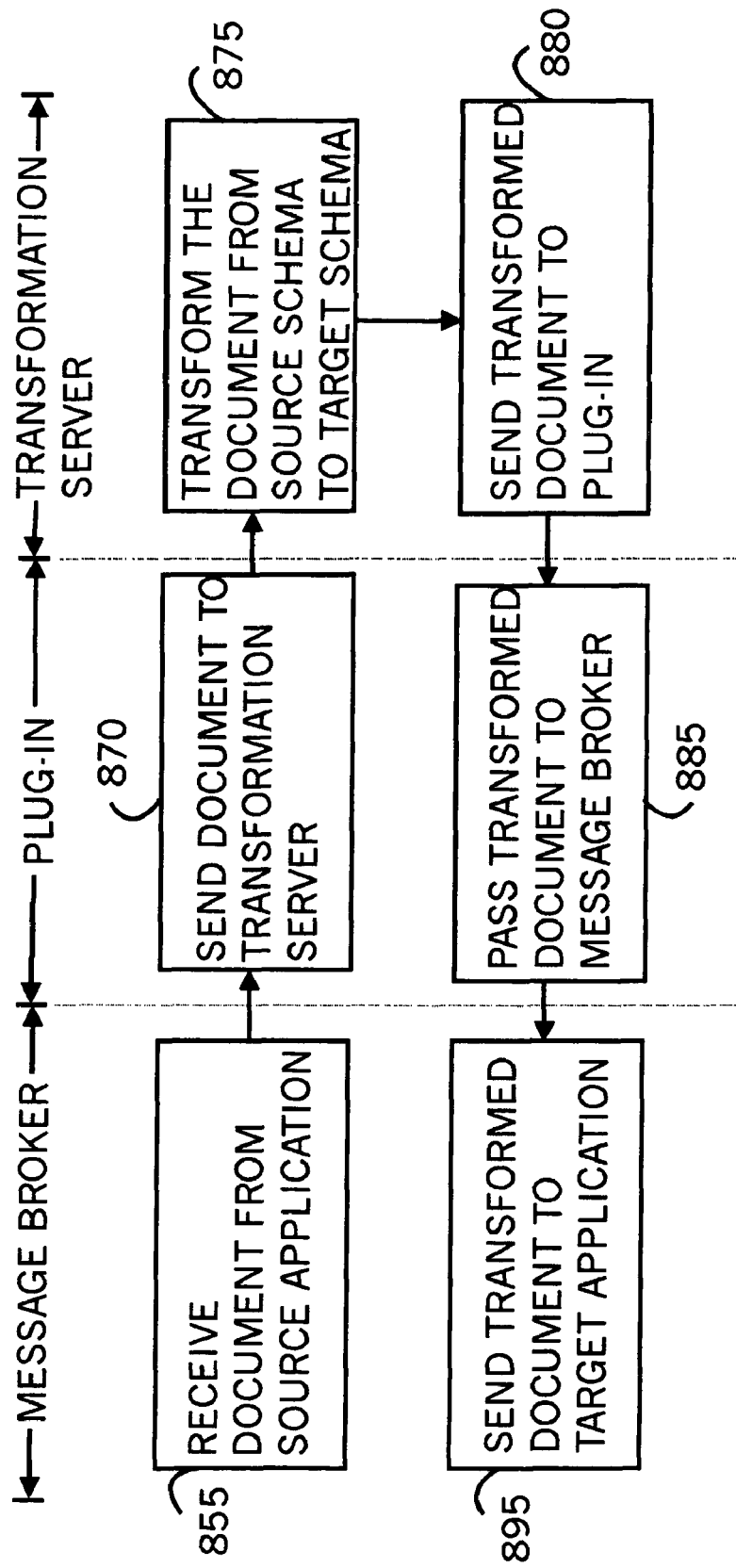

Reference is now made to FIG. 8D, which is a simplified flowchart for a third implementation of the present invention within an enterprise application integration system. In this third implementation run-time transformation server 835 is used to perform the transformations from source schema to target schema. At step 850, Message Broker 820 receives a document from source application 805, intended to target application 810. In this third implementation, Message Broker 820 is configured to know the target schema. At step 870 plug-in 830 sends the document to run-time transformation server 835, and requests that run-time transformation server 835 transform the document to a specified target schema.

Run-time transformation server 835 receives the source document and the target schema. Typically, the source document includes information about the source schema. For example, XML documents typically include references to the X schema to which they conform. Run-time transformation server 835 generates an appropriate transformation, in accordance with a preferred embodiment of the present invention, and at step 875 run-time transformation server 835 transforms the document from the source schema to the target schema. It may be appreciated by those skilled in the art that run-time transformation server 835 may already have the requested transformation available, for example, having cached it from a previous request, or having it otherwise available in a memory store. In such a case, it is not necessary to generate the transformation.

At step 880 run-time transformation server 835 sends the transformed document to plug-in 830. At step 885, plug-in 830 passes the documents to Message Broker 820, and at step 895 Message Broker 820 sends the transformed document to target application 810.

Figure 8E:
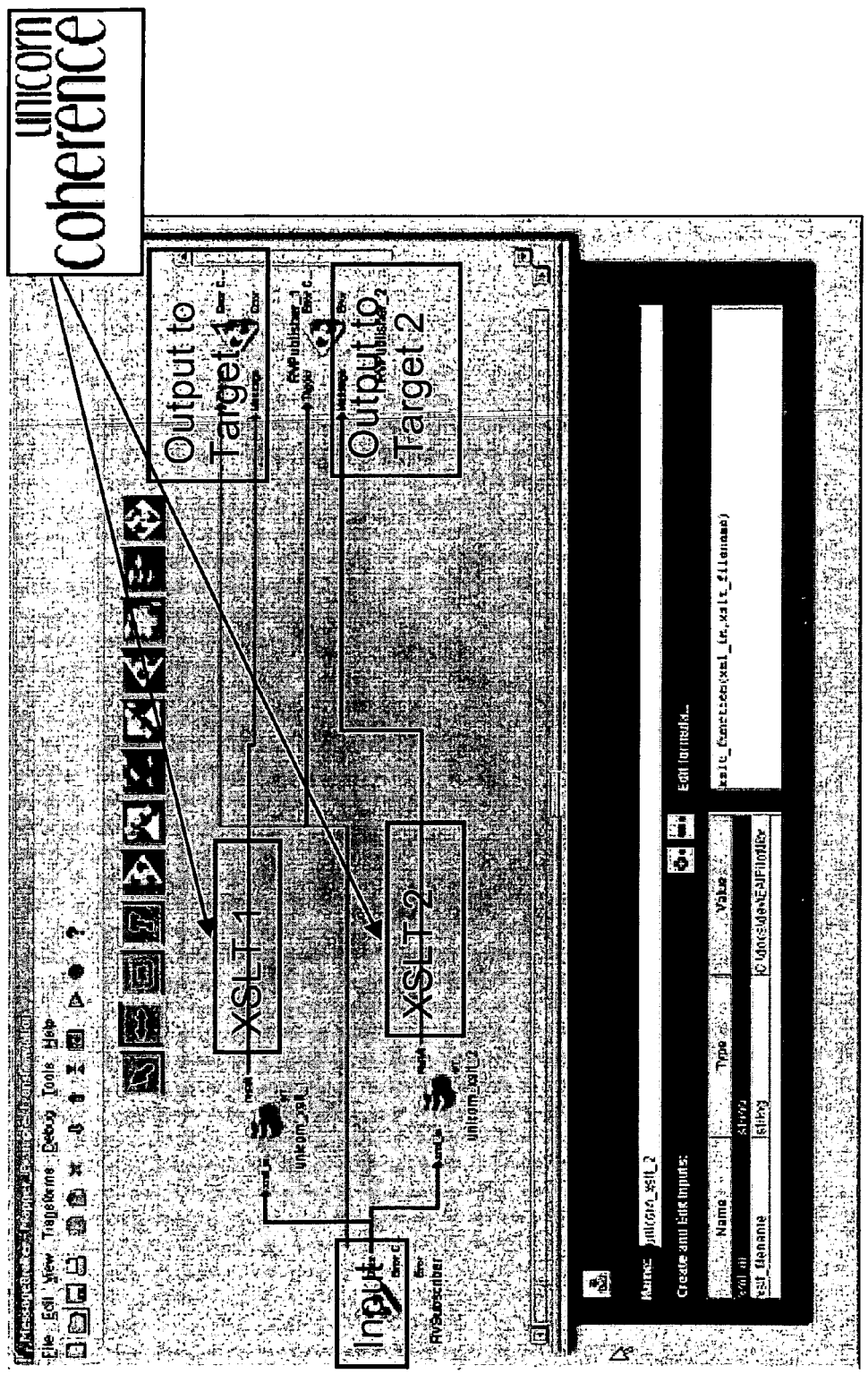
FIG. 8E is a simplified illustration of an enterprise application product, such as Tibco Active Enterprise, with the present invention therewithin.

Reference is now made to FIG. 8E, which is a simplified illustration of an enterprise application product, such as Tibco Active Enterprise, with the present invention therewithin. Shown in FIG. 8E is a Message Broker data flow in which an input document is transformed for delivery to two targets, each target having its own target schema. Unicorn Coherence is used to generate each of the source-to-target transformation, in accordance with a preferred embodiment of the present invention. FIG. 8E corresponds to the flowchart shown in FIG. 8B.

It may be appreciated by those skilled in the art that source application 805 and target application 810 may use multiple schemata and, as such, the references to source schema and target schema are intended to include single schema and multiple schemata.

User Interface

Applicant has developed a software application, named COHERENCE™, which implements a preferred embodiment of the present invention to transform data from one schema to another. Coherence enables a user to import source and target RDBS;

to build an ontology model into which both the source and target RDBS can be mapped;

to map the source and target RDBS into the ontology model; and to impose constraints on properties of the ontology model.

Once the mappings are defined, Coherence generates an SQL query to transform the source RDBS into the target RDBS.

Figure 9A:
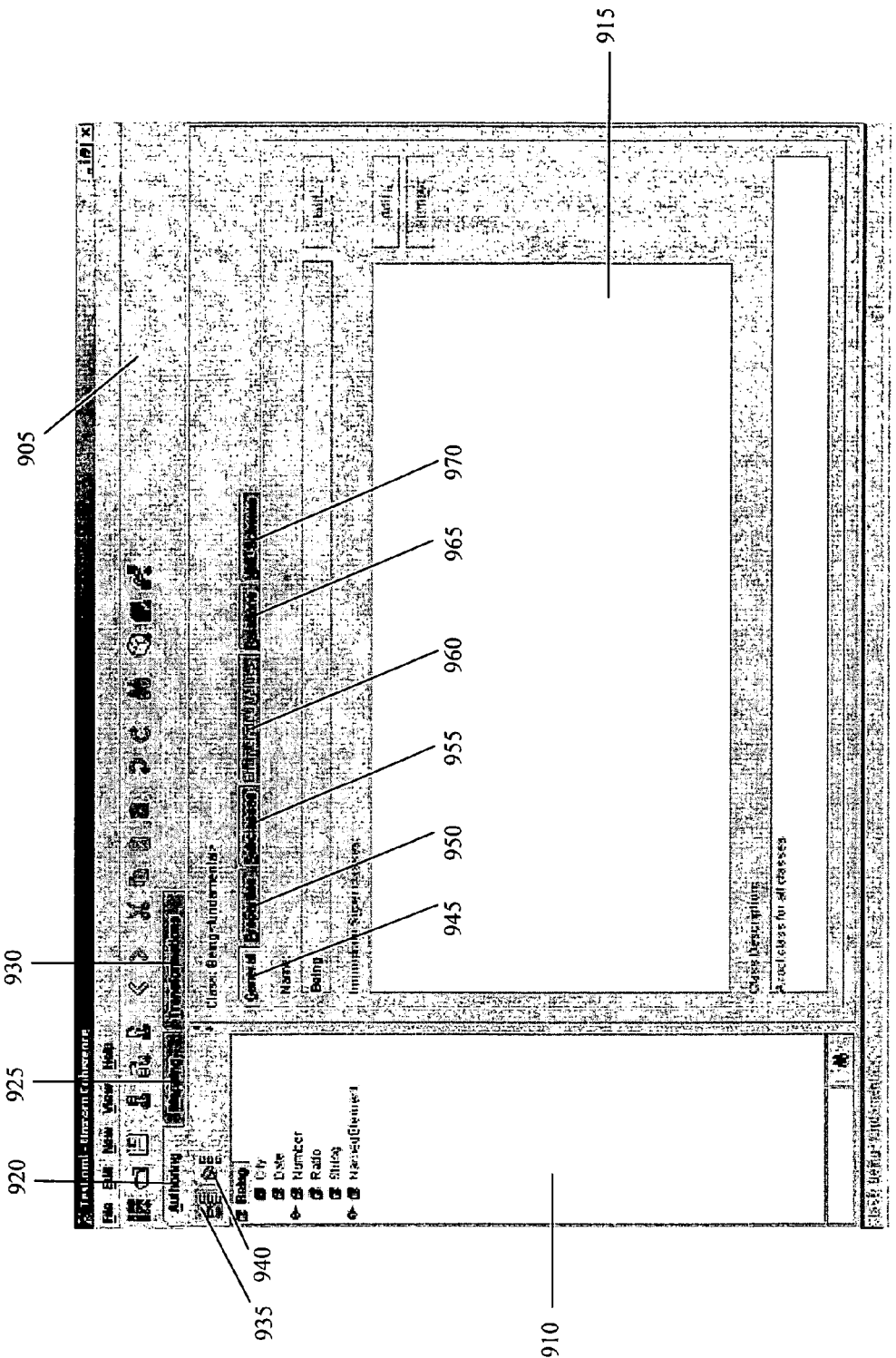

Reference is now made to FIGS. 9A-9E, which are illustrations of a user interface for transforming data from one relational database schema to another using the Coherence software application, in accordance with a preferred embodiment of the present invention. Shown in FIG. 9A is a main Coherence window 905 with a left pane 910 and a right pane 915. Window 905 includes three primary tabs 920, 925 and 930, labeled Authoring, Mapping and Transformations, respectively. Authoring tab 920 is invoked in order to display information about the ontology model, and to modify the model by adding, deleting and editing classes and properties. Mapping tab 925 is invoked in order to display information about the RDBS and the mappings of the RDBS into the ontology, and to edit the mappings. Transformations tab 930 is invoked to display transformations in the form of SQL queries, from a source RDBS into a target RDBS. In FIG. 9A, tab 920 for Authoring is shown selected.

Left pane 910 includes icons for two modes of viewing an ontology: icon 935 for viewing in inheritance tree display mode, and icon 940 for viewing in package display mode.

Inheritance tree display mode shows the classes of the ontology in a hierarchical fashion corresponding to superclass and subclass relationships. As illustrated in FIG. 9A, in addition to the fundamental classes for Date, Number, Ratio, String and NamedElement, there is a class for City. Corresponding to the class selected in left pane 910, right pane 915 displays information about the selected class. Right pane 915 includes six tabs for class information display: tab 945 for General, tab 950 for Properties, tab 955 for Subclasses, tab 960 for Enumerated Values, tab 965 for Relations and tab 970 for XML schema. Shown in FIG. 9A is a display under tab 945 for General. The display includes the name of the class, Being, and the package to which it belongs; namely, fundamental. Also shown in the display is a list of immediate superclasses, which is an empty list for class Being. Also shown in the display is a textual description of the class; namely, that Being is a root class for all classes.

Tab 960 for Enumerated Values applies to classes with named elements; i.e., classes that include a list of all possible instances. For example, a class Boolean has enumerated values "True" and "False," and a class Gender may have enumerated values "Male" and "Female."

Figure 9B:
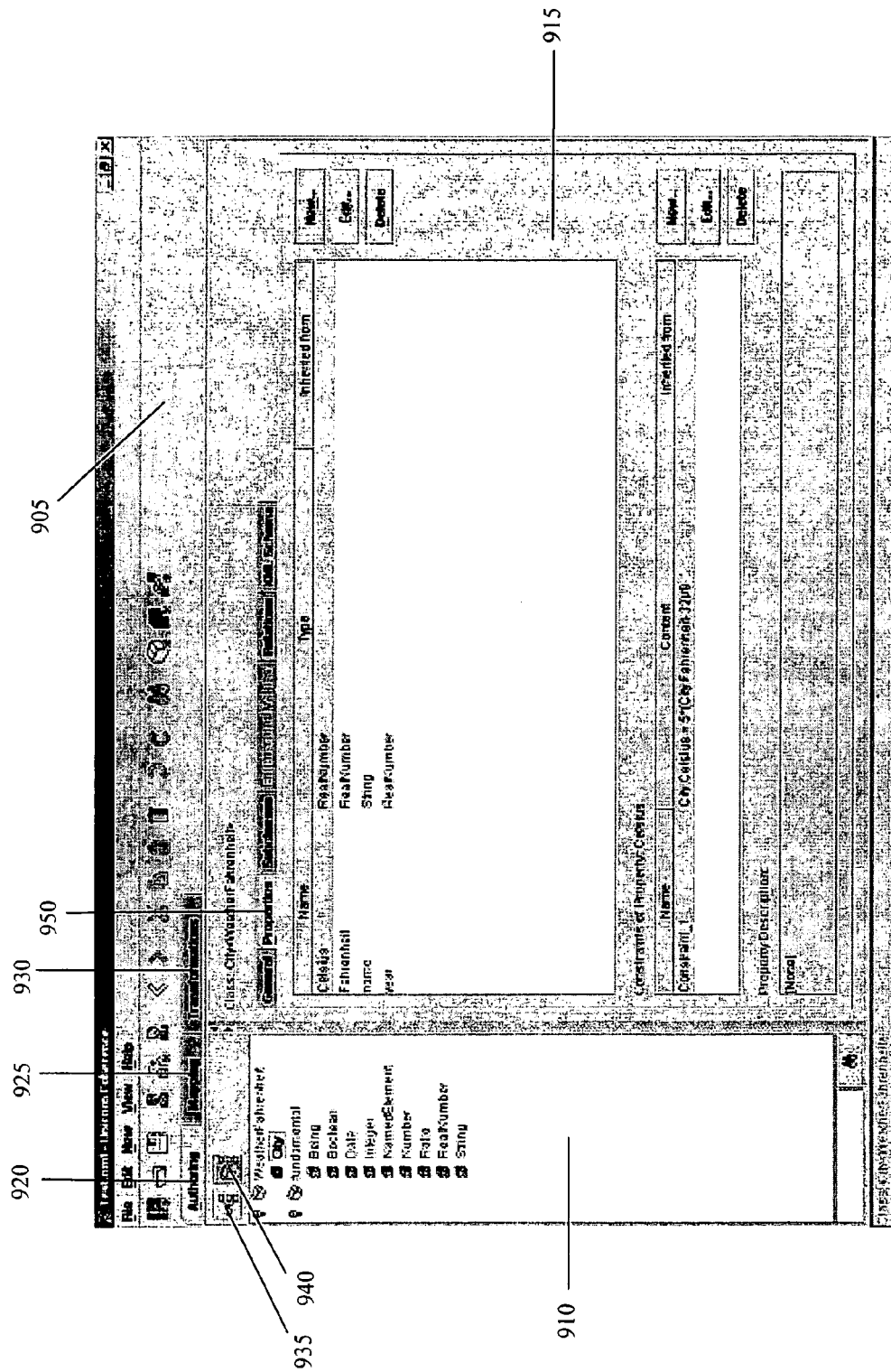

FIG. 9B illustrates package display mode for the ontology. Packages are groups including one or more ontology concepts, such as classes, and properties. Packages are used to organize information about an ontology into various groupings. As illustrated in FIG. 9B, there is a fundamental package that includes fundamental classes, such as Being, Boolean, Date and Integer. Also shown in FIG. 9B is a package named WeatherFahrenheit, which includes a class named City.

As shown in FIG. 9B, City is selected in left pane 910 and, correspondingly, right pane 915 displays information about the class City. Right pane 915 display information under Tab 950 for Properties. As can be seen, class City belongs to the package WeatherFahrenheit, and has four properties; namely, Celsius of type RealNumber, city of type String, Fahrenheit of type RealNumber and year of type RealNumber. FIG. 9B indicates that the property Celsius satisfies a constraint. Specifically, Celsius=5¤(Fahrenheit−32)/9.

Figure 9C:
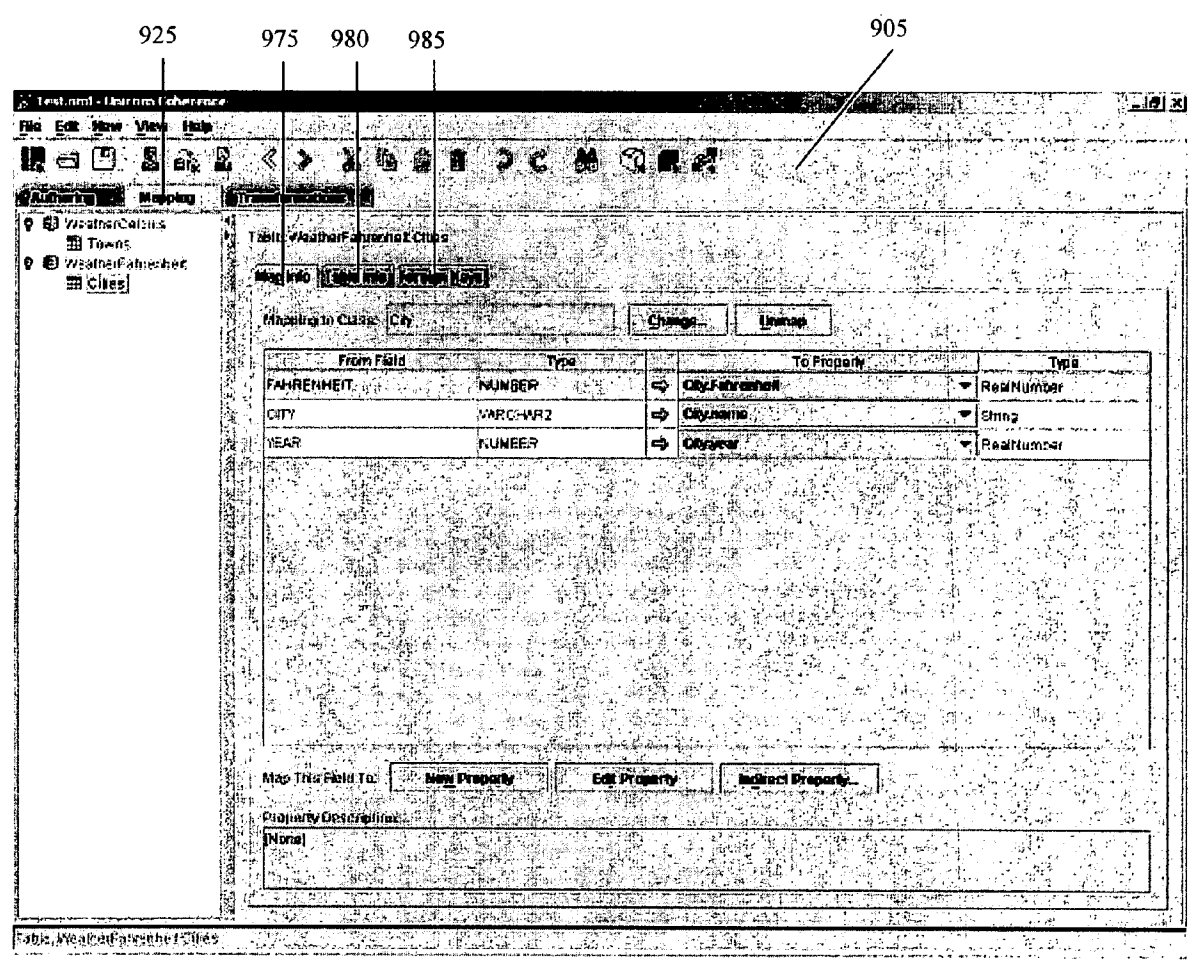

In FIG. 9C, the tab 925 for Mapping is shown selected. As shown in the left pane of FIG. 9C, two RDBS have been imported into Coherence. A first RDBS named WeatherCelsius, which includes a table named Towns, and a second RDBS named WeatherFahrenheit, which includes a table named Cities.

The table named Cities is shown selected in FIG. 9C, and correspondingly the right pane display information regarding the mapping of Cities into the ontology. As can be seen, the table Cities contains three fields; namely, Fahrenheit, city and year. The table Cities has been mapped into the ontology class City, the field Fahrenheit has been mapped into the ontology property Fahrenheit, the field city has been mapped into the ontology property name, and the field year has been mapped into the ontology property year. The RDBS WeatherFahrenheit will be designated as the source RDBS.

When tab 925 for Mapping is selected, the right pane includes three tabs for displaying information about the RDBS: tab 975 for Map Info, tab 980 for Table Info and tab 985 for Foreign Keys.

Figure 9D:
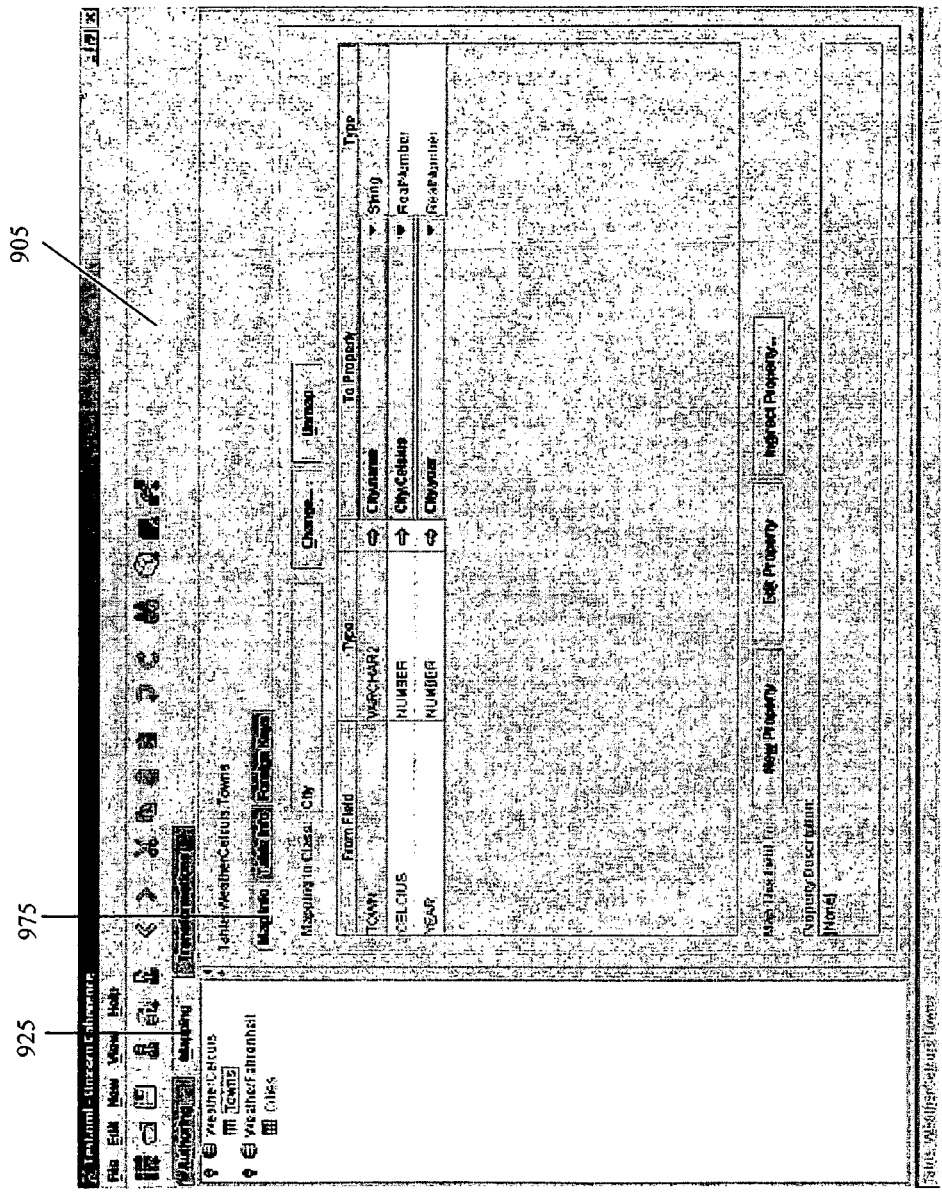

The RDBS named WeatherCelsius is displayed in FIG. 9D. As can be seen, the table Towns contains three fields; namely, town, Celcius and year. The table Towns has been mapped into the ontology class City, the field town has been mapped into the ontology property name, the field Celcius has been mapped into the ontology property Celcius, and the field year had been mapped into the ontology property year. The RDBS WeatherCelcius will be designated as the target RDBS.

As such, the target RDBS is

TABLE I

| Towns | | |
|---|---|---|
| Town | Celcius | Year | and the source RDBS is

TABLE II

| Cities | | |
|---|---|---|
| Fahrenheit | City | Year |

Figure 9E:
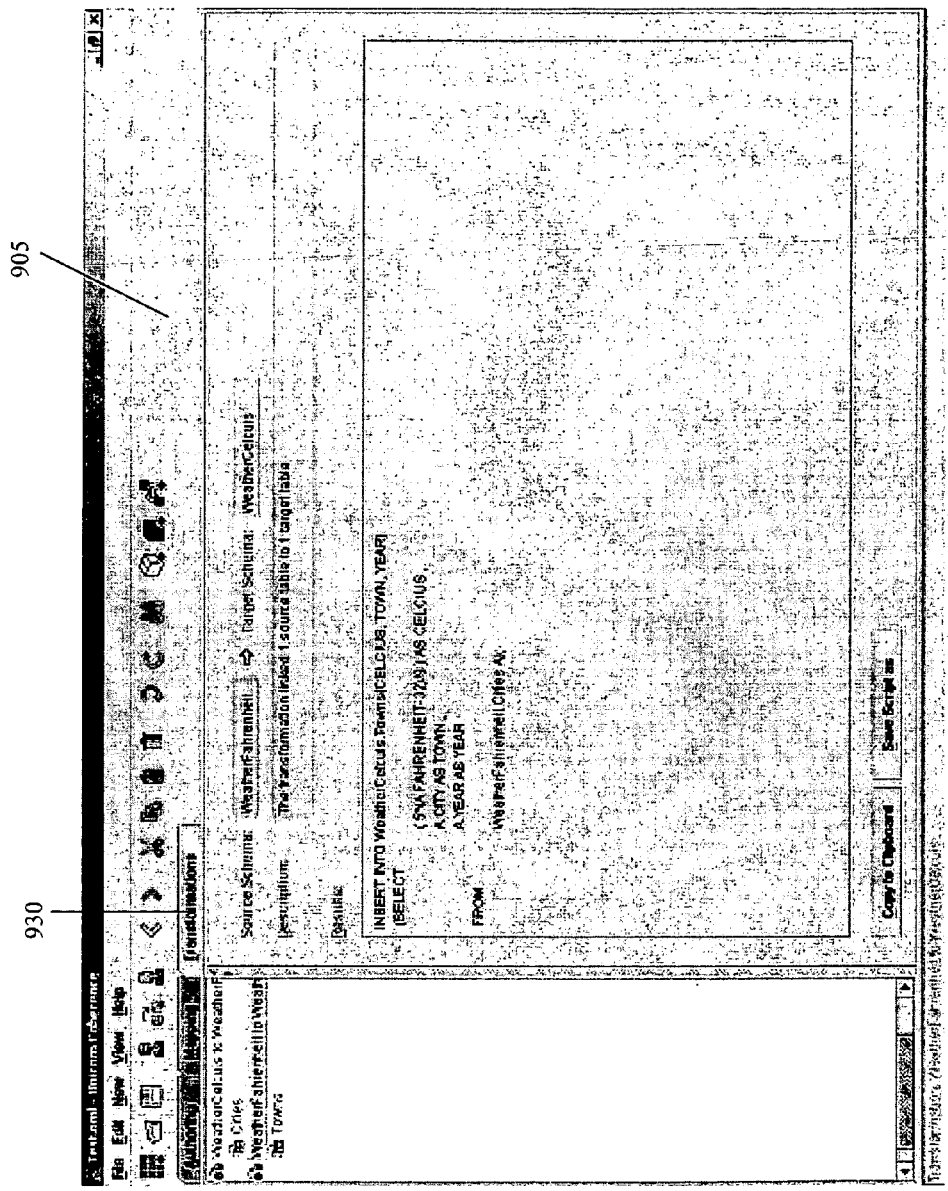

In FIG. 9E, the tab 930 for Transformations is shown selected. As can be seen in the right pane, the source table is Cities and the target table is Towns. The SQL query

```
INSERT INTO WeatherCelcius.Towns(CELCIUS, TOWN, YEAR)
(SELECT
        (5 * (A.FAHRENHEIT − 32) / 9) AS CELCIUS,
        A.CITY AS TOWN,
        A.YEAR AS YEAR
FROM
        WeatherFahrenheit.Cities A);
``` accomplishes the desired transformation.

Figure 10:
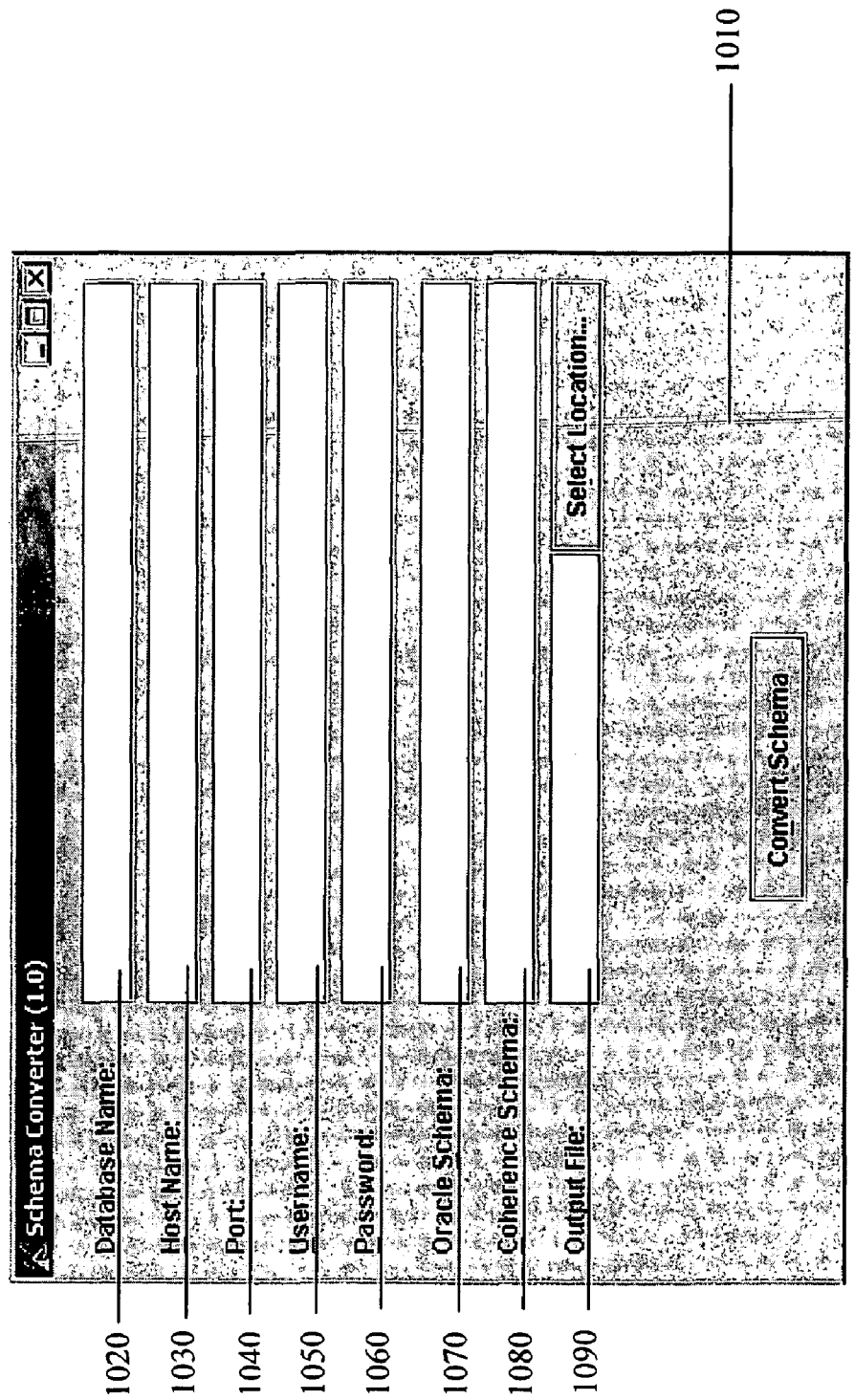
FIG. 10 is an illustration of a user interface for an application that imports an RDBS into the software application illustrated in FIGS. 8A-8E, in accordance with a preferred embodiment of the present invention.

Reference is now made to FIG. 10, which is an illustration of a user interface for an application that imports an RDBS into Coherence, in accordance with a preferred embodiment of the present invention. Shown in FIG. 10 is a window 1010 for a schema convertor application. Preferably, a user specifies the following fields:

Database Name 1020: What Oracle refers to as an SID (System Identifier).

Host Name 1030: The name of an Oracle 8i server (or Global Database Name).

Port 1040: Port number

Username 1050: The username of a user with privileges to the relevant schemas.

Password 1060: The password of the user with privileges to the relevant schemas.

Oracle schema 1070: The schema or database in Oracle to be converted to .SML format. The .SML format is an internal RDBS format used by Coherence. When importing more than one schema, a semicolon (;) is placed between schema names.

Coherence schema 1080: The label identifying the RDBS that is displayed on the Mapping Tab in Coherence. This field is optional; if left blank, the Oracle schema name will be used.

Output File 1090: A name for the .SML file generated.

Figure 11A:
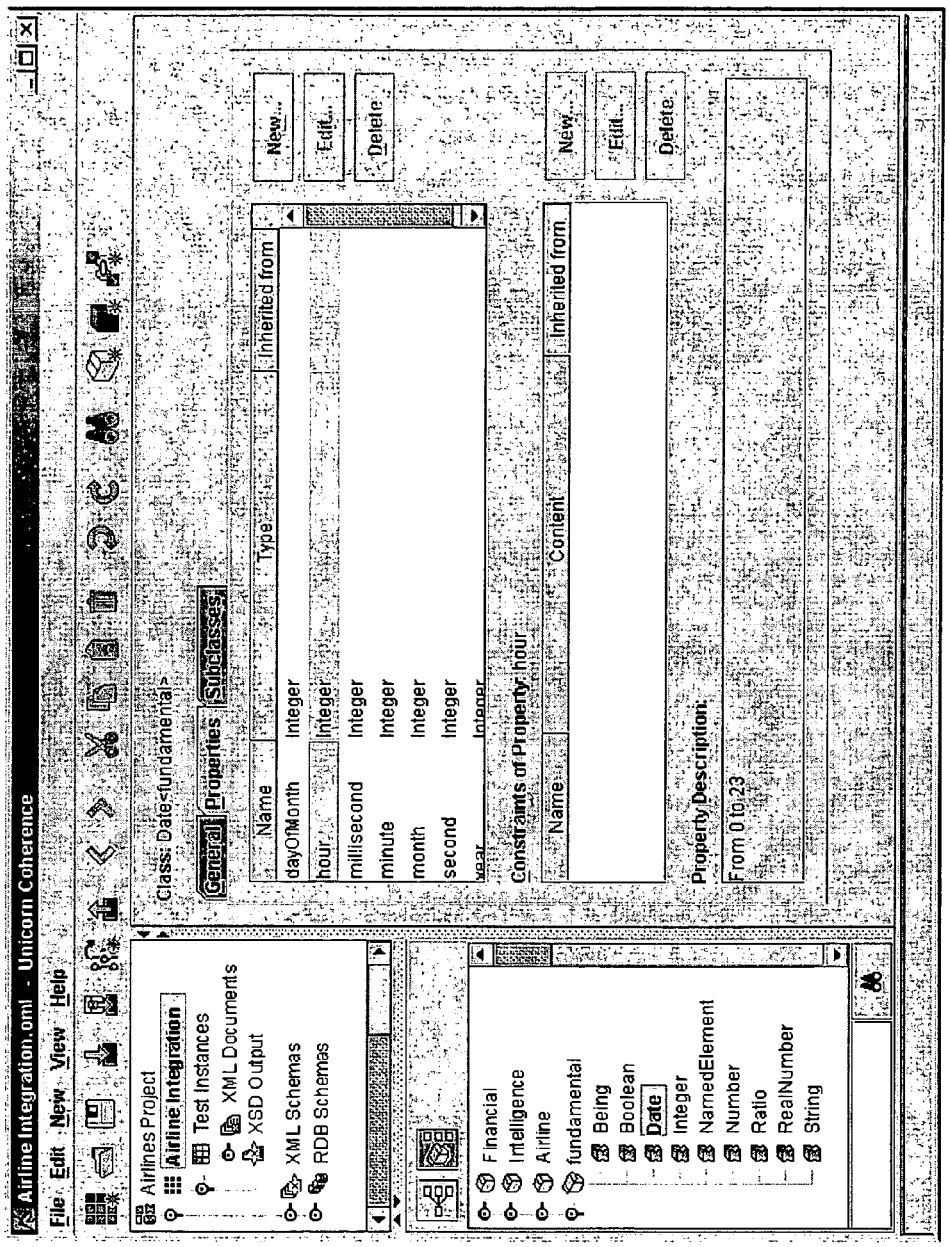
FIGS. 11A-11R are illustrations of a user interface for a software application that transforms data from one XML schema to another, in accordance with a preferred embodiment of the present invention.
Figure 11B:
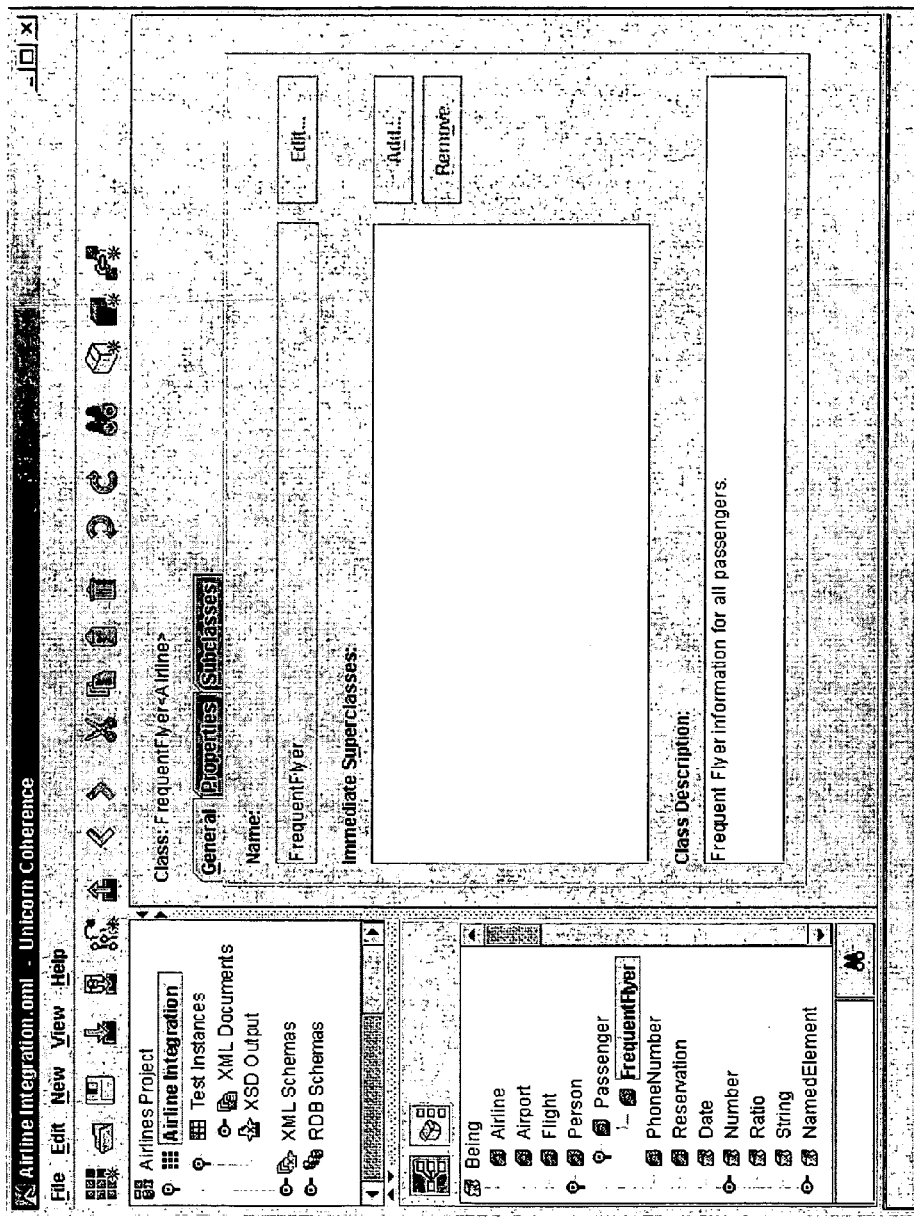
Figure 11C:
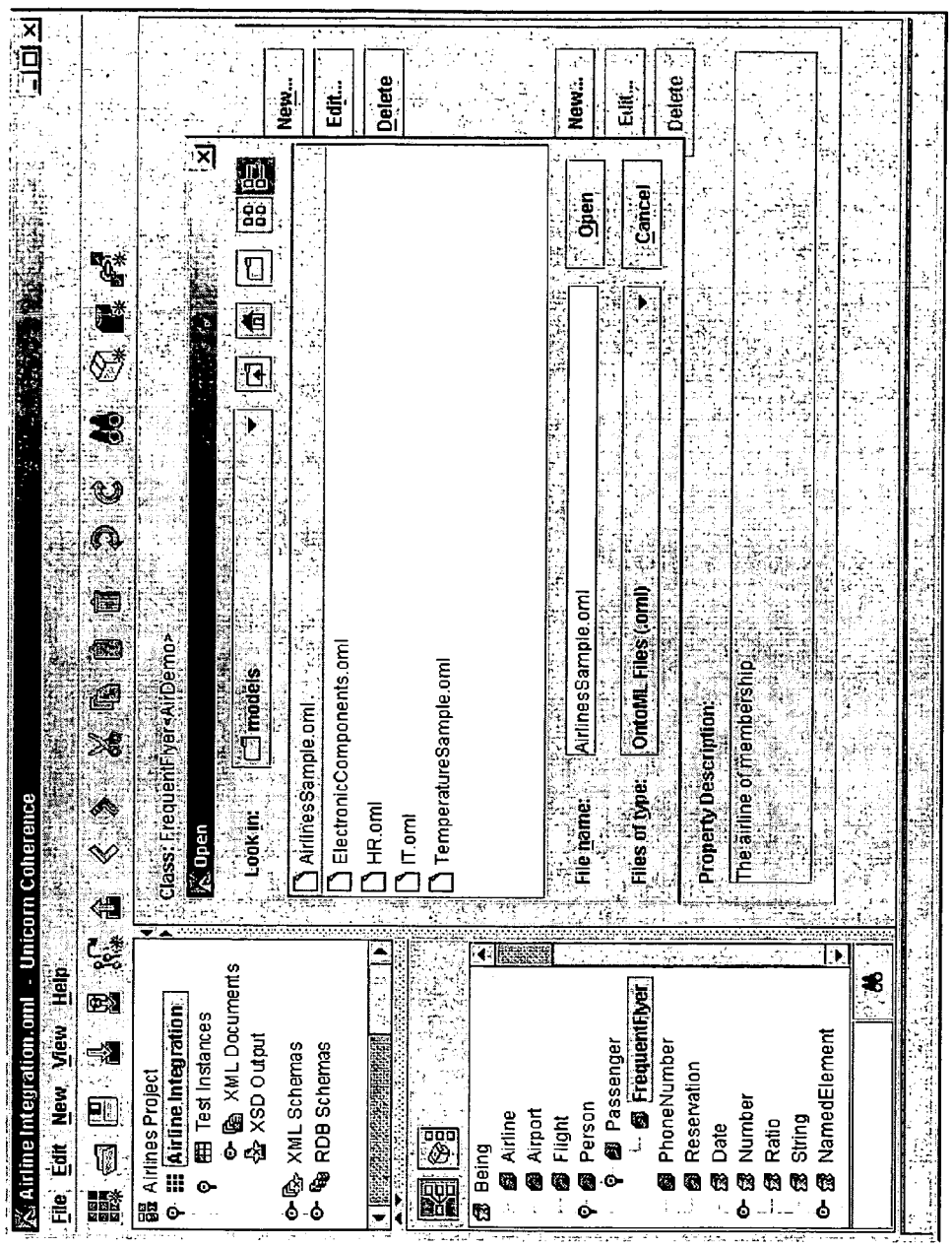
Figure 11D:
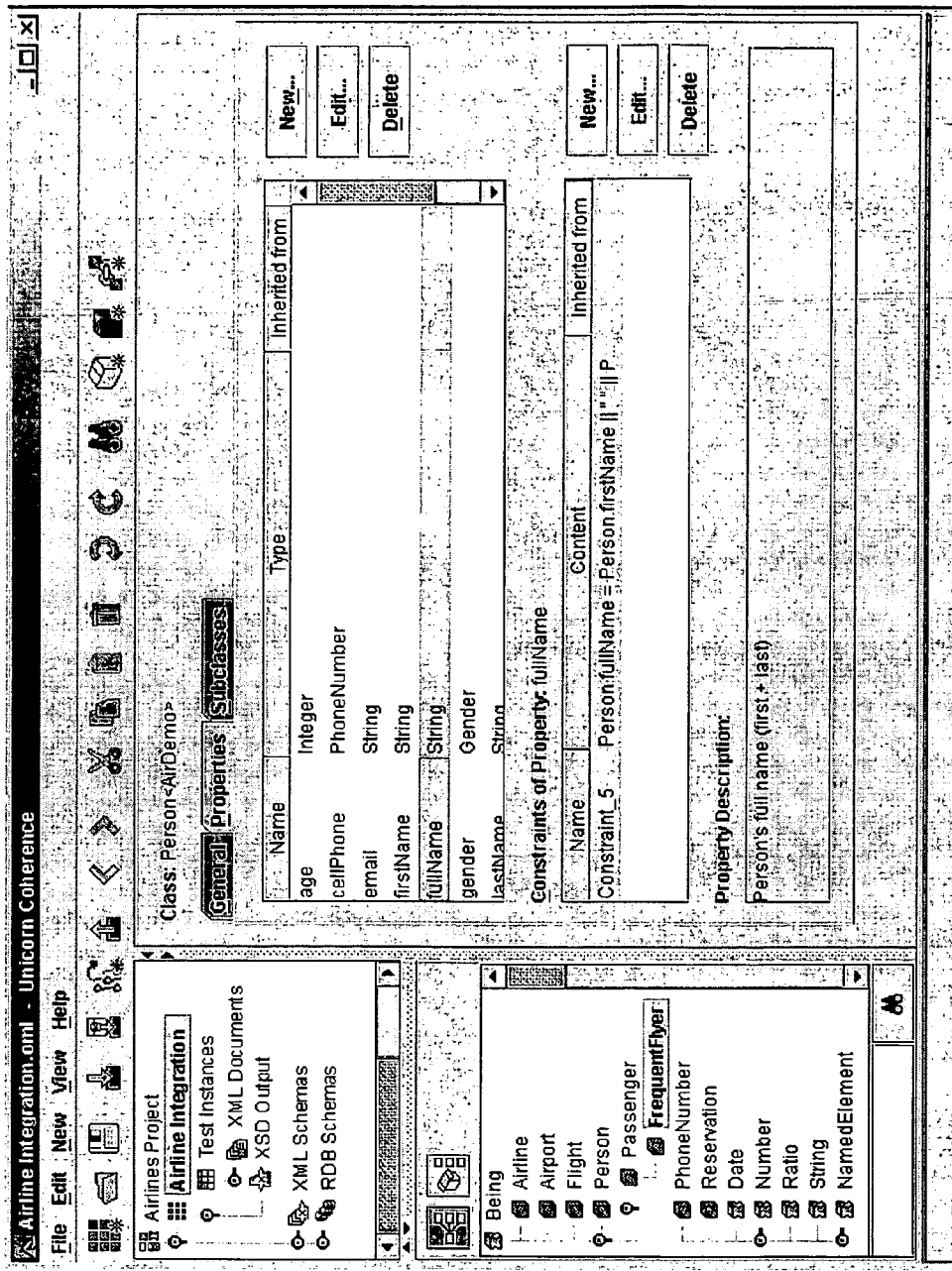
Figure 11E:
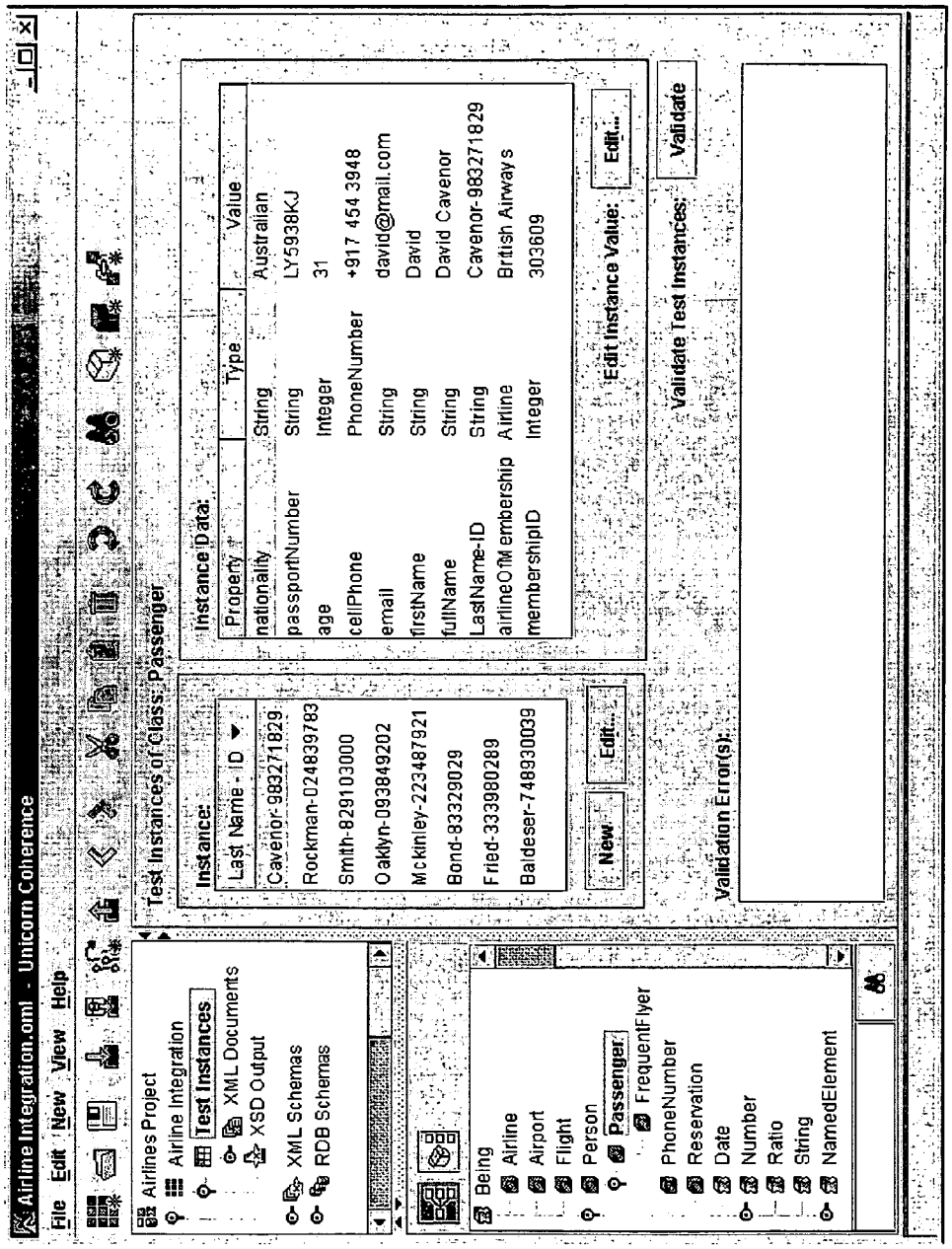
Figure 11F:
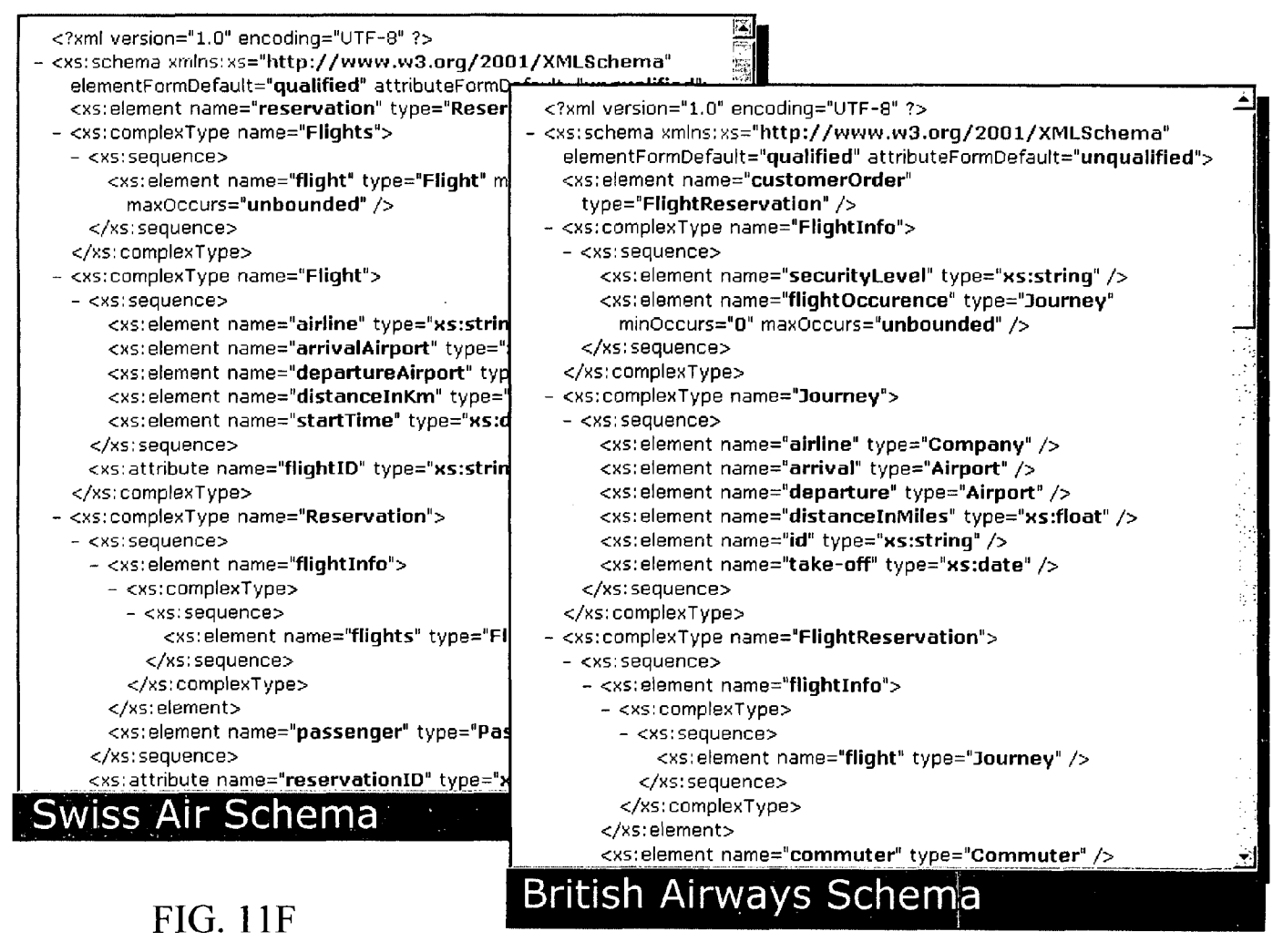
Figure 11G:
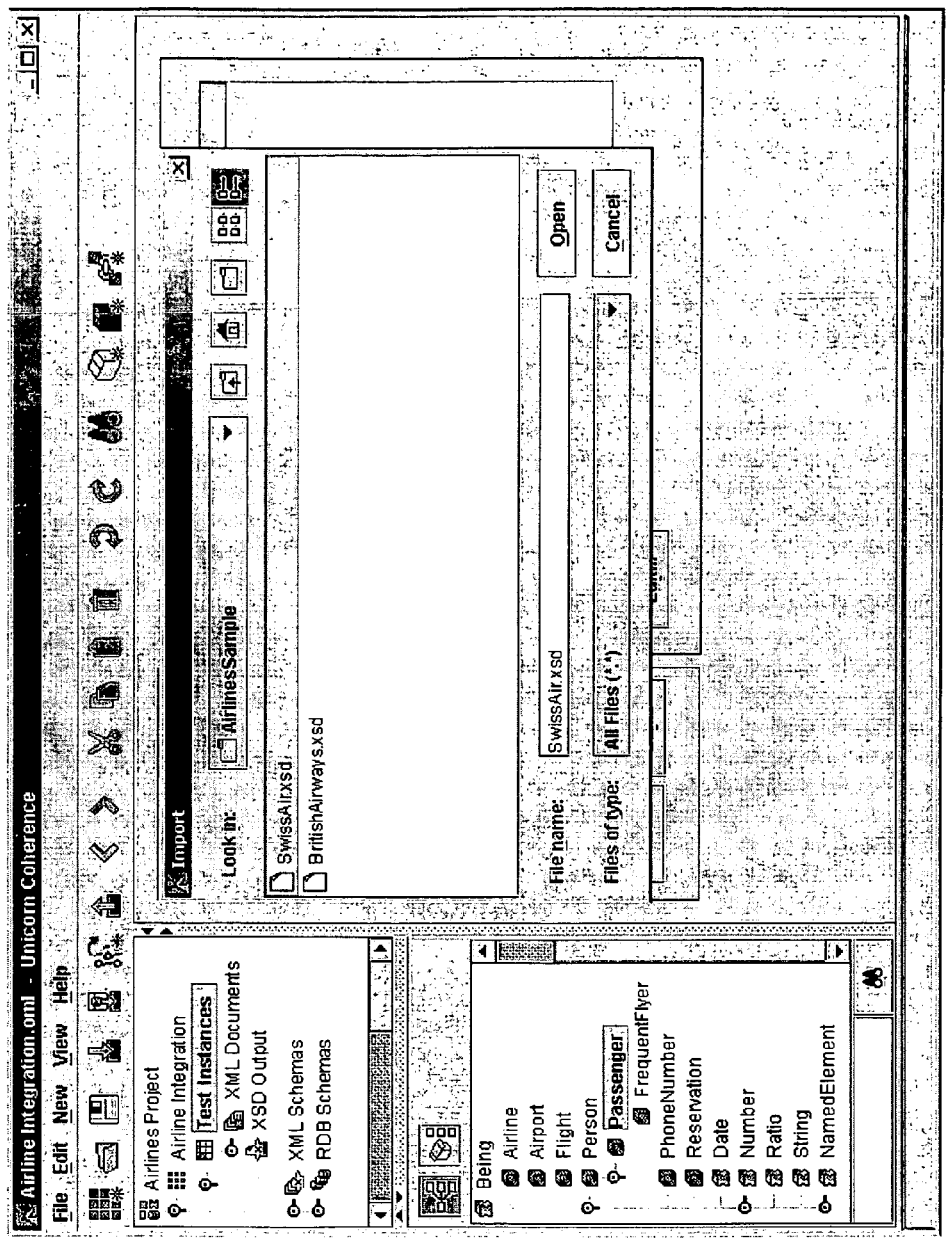
Figure 11H:
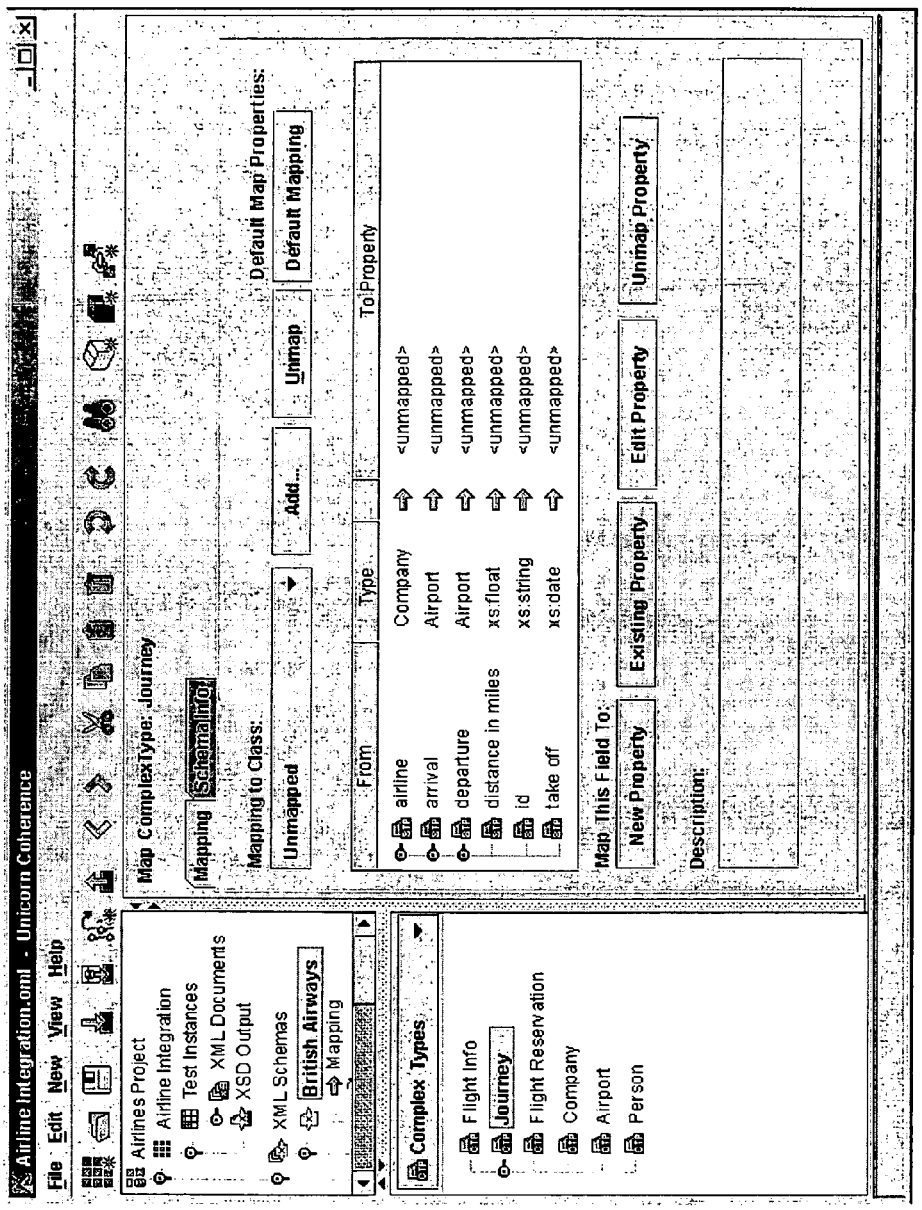
Figure 11I:
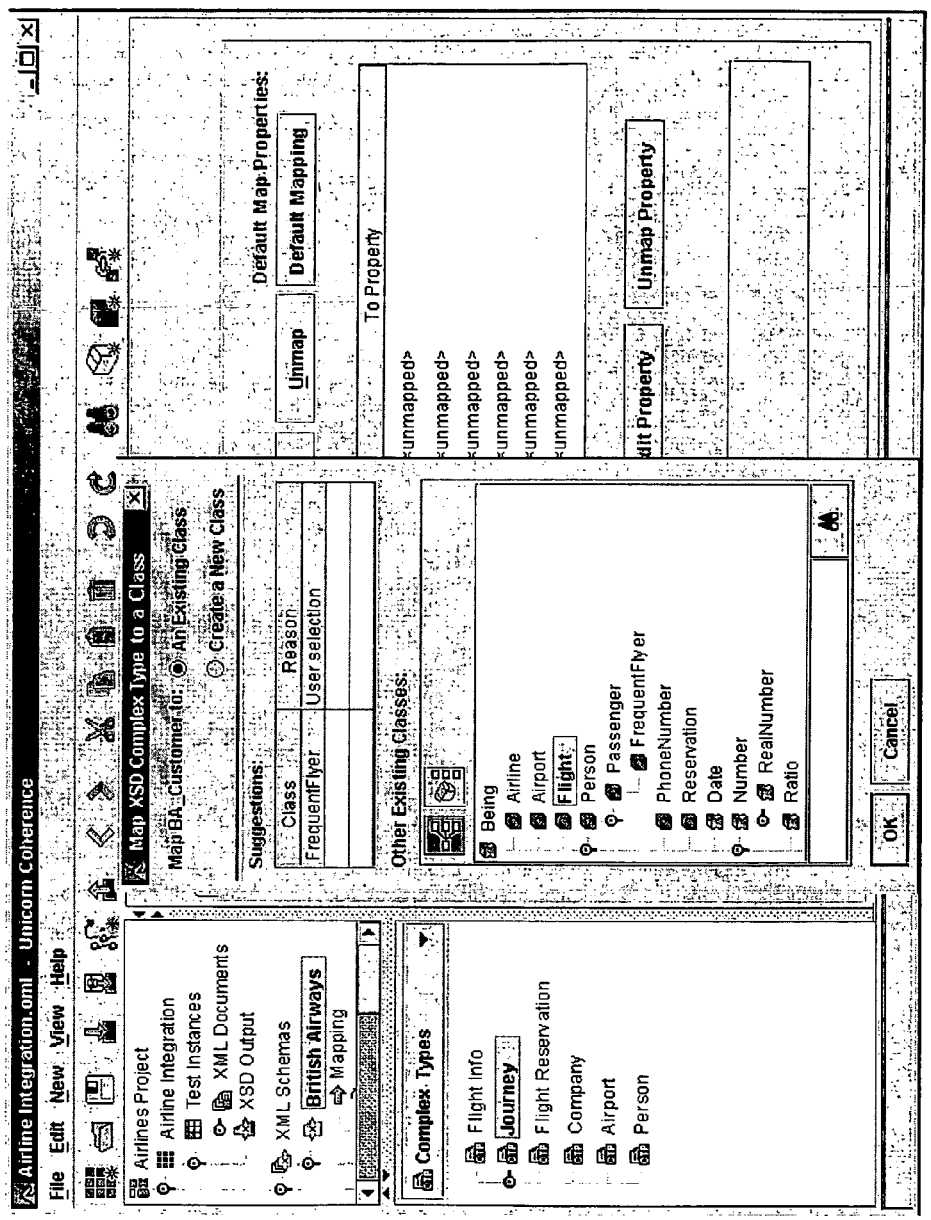
Figure 11J:
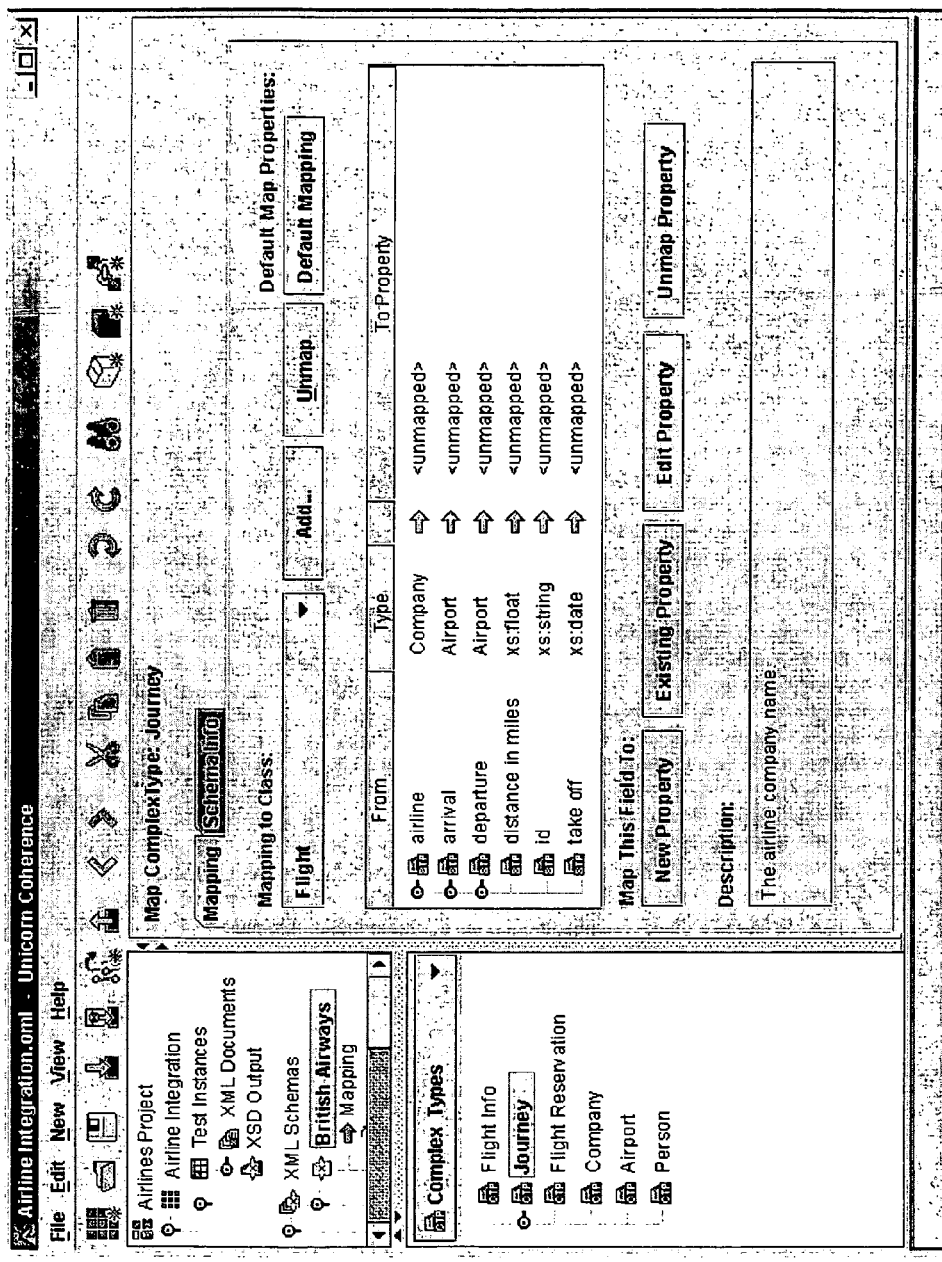
Figure 11K:
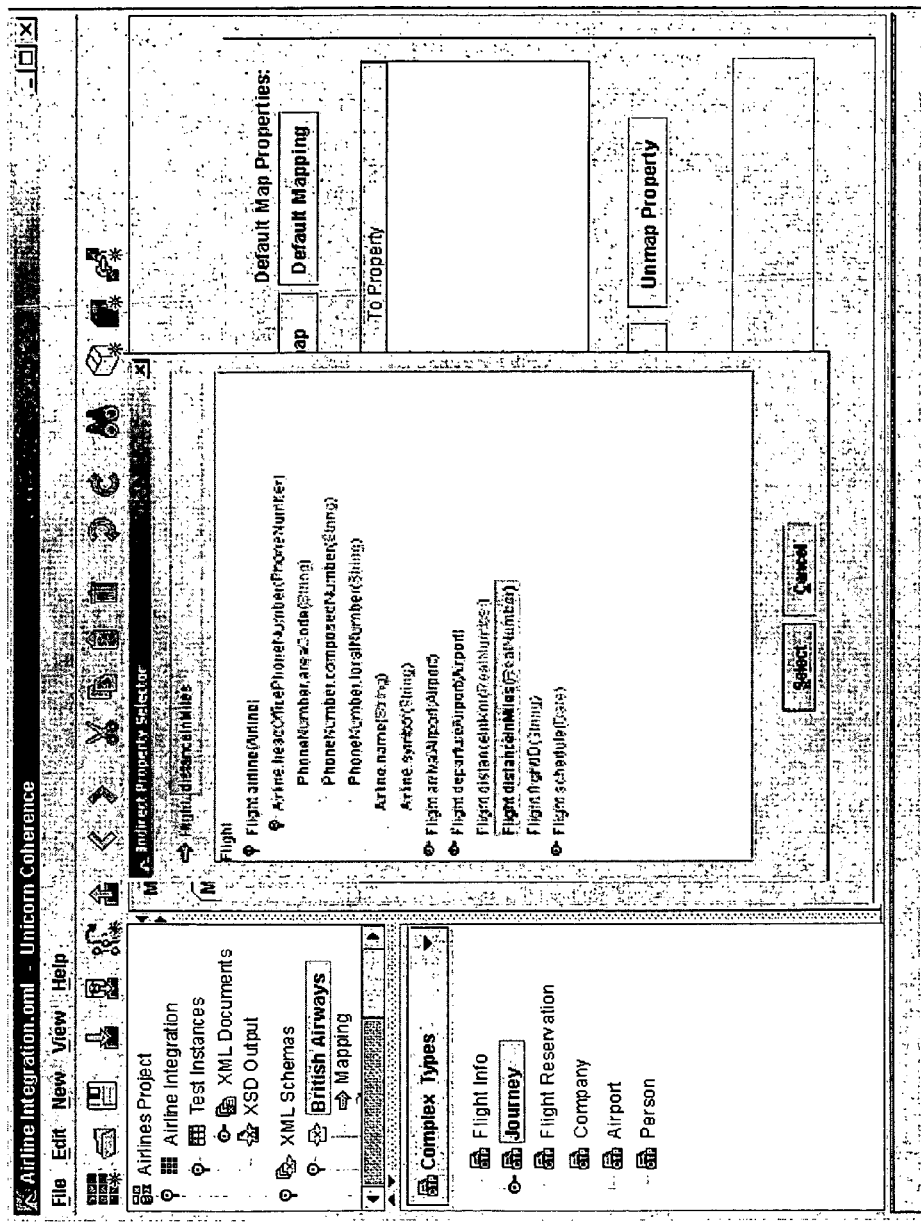
Figure 11L:
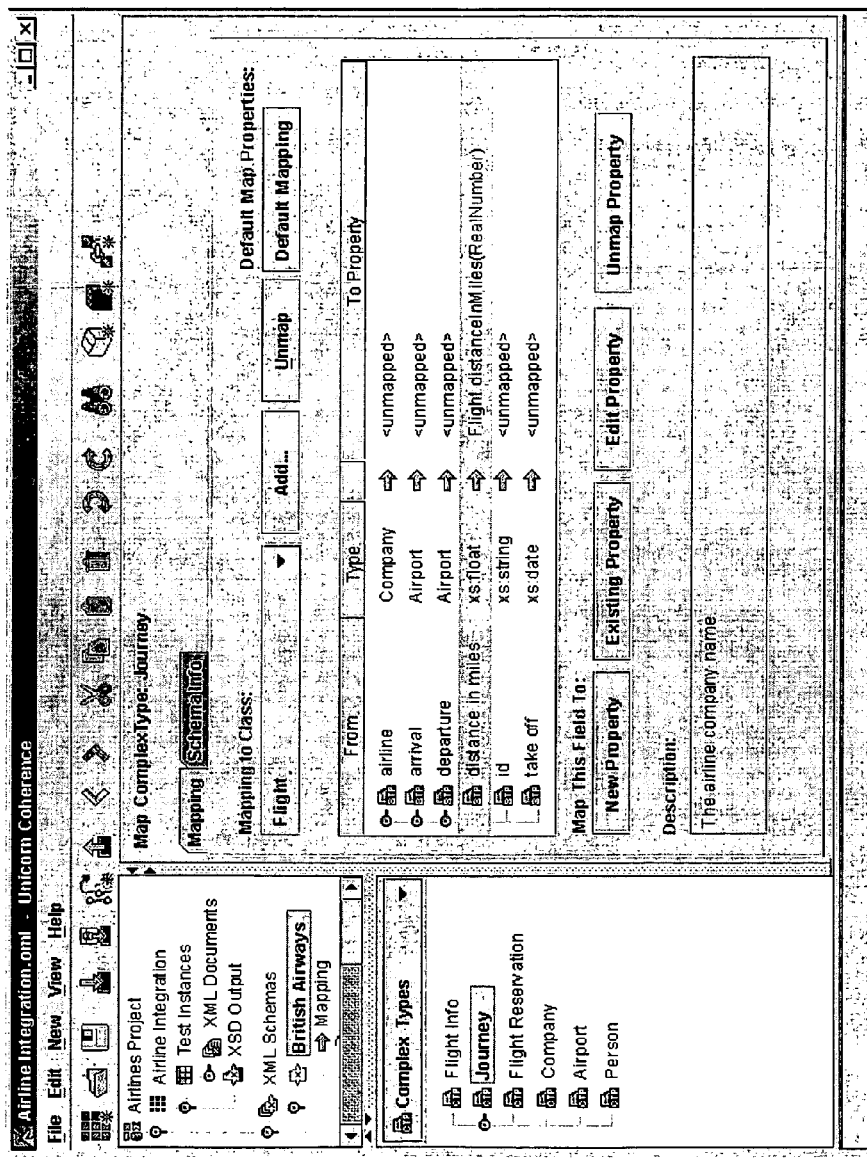
Figure 11M:
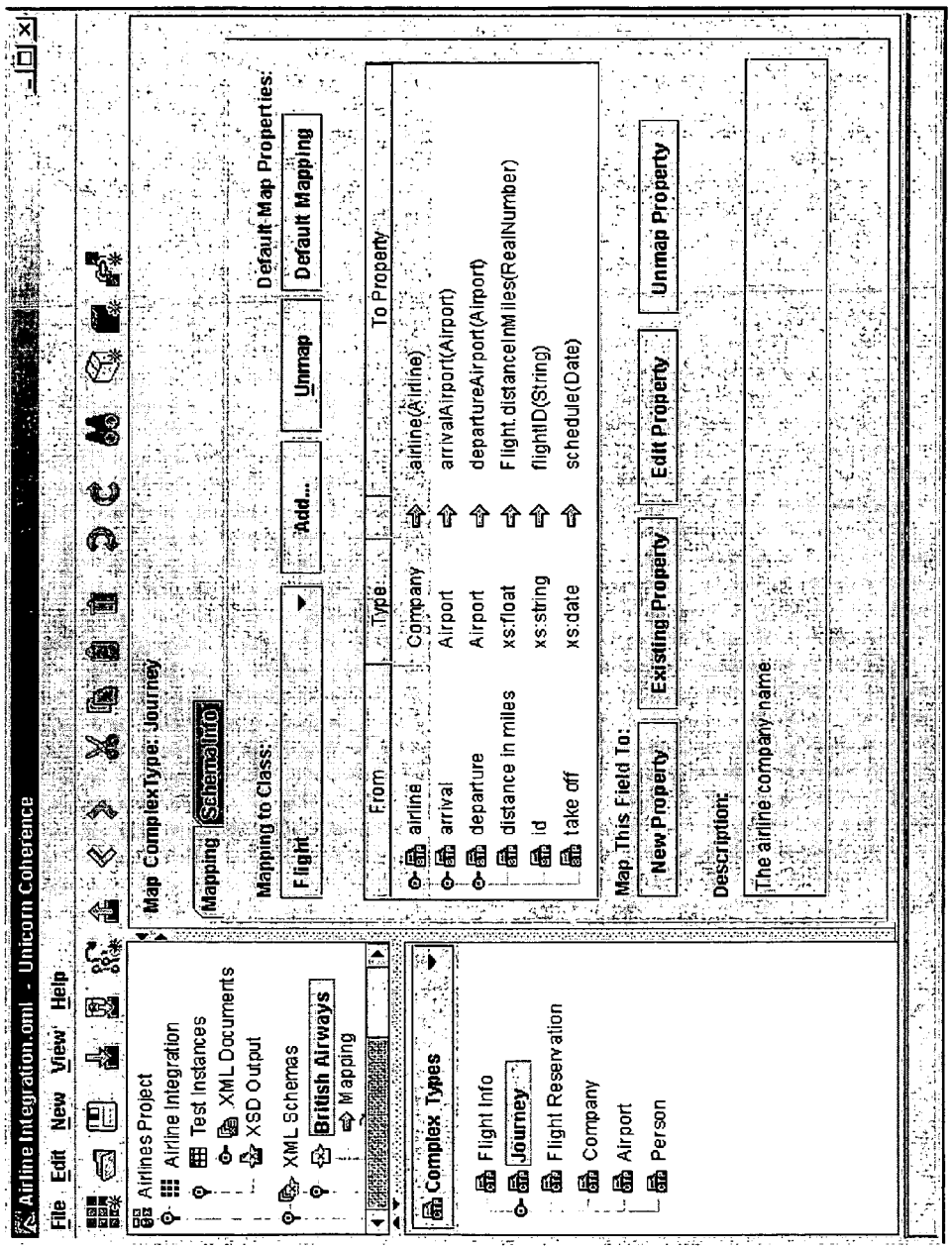
Figure 11N:
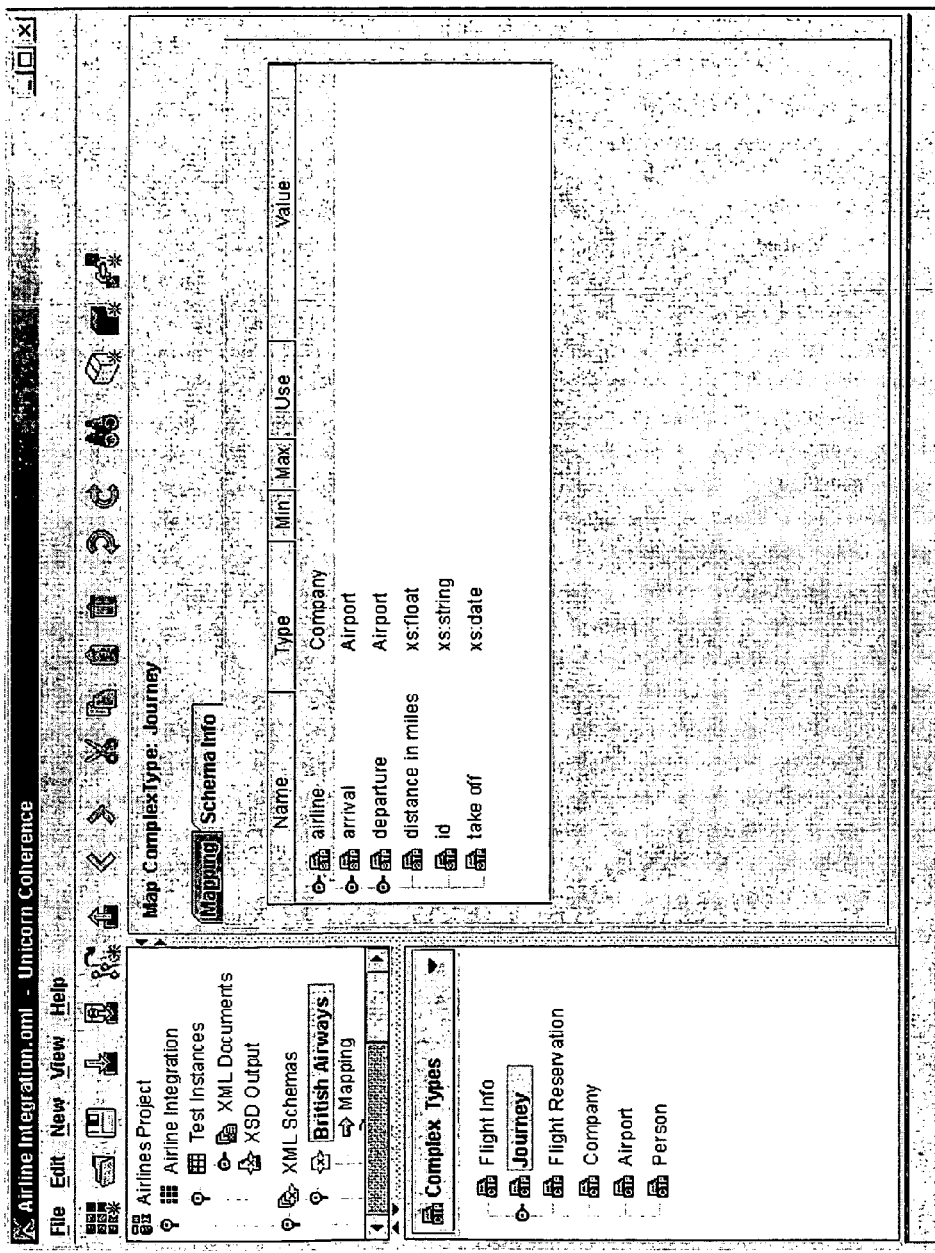
Figure 11O:
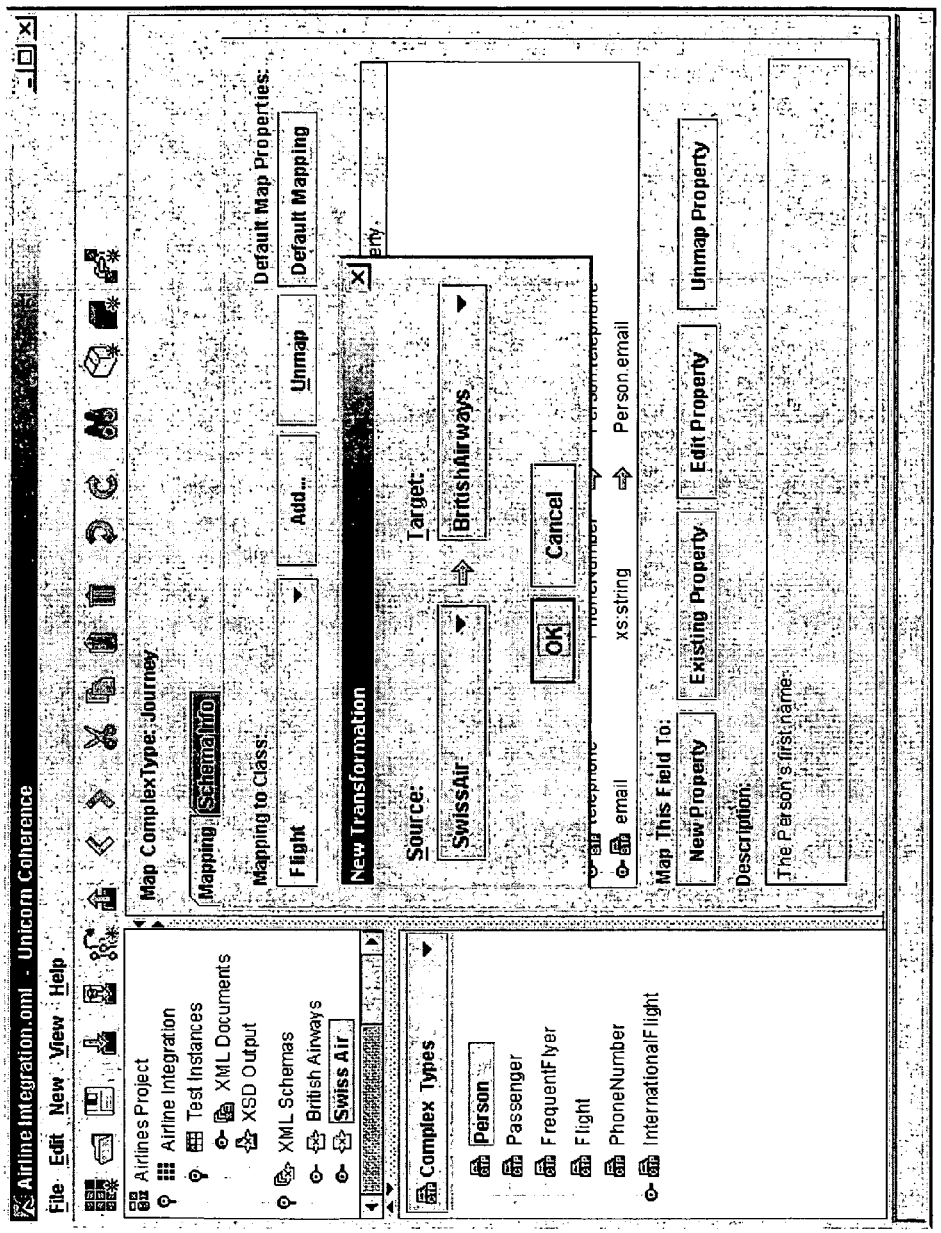
Figure 11P:
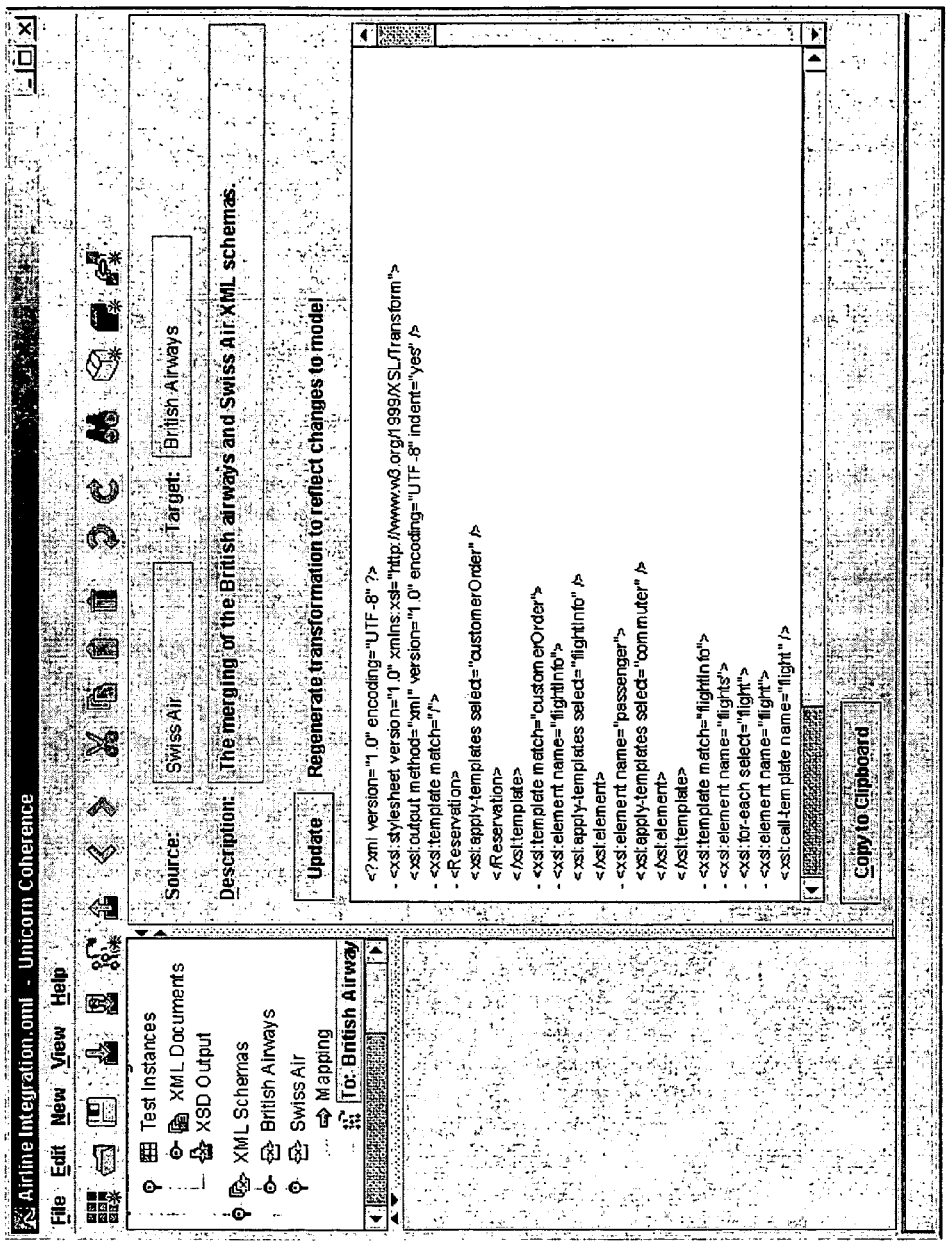
Figure 11Q:
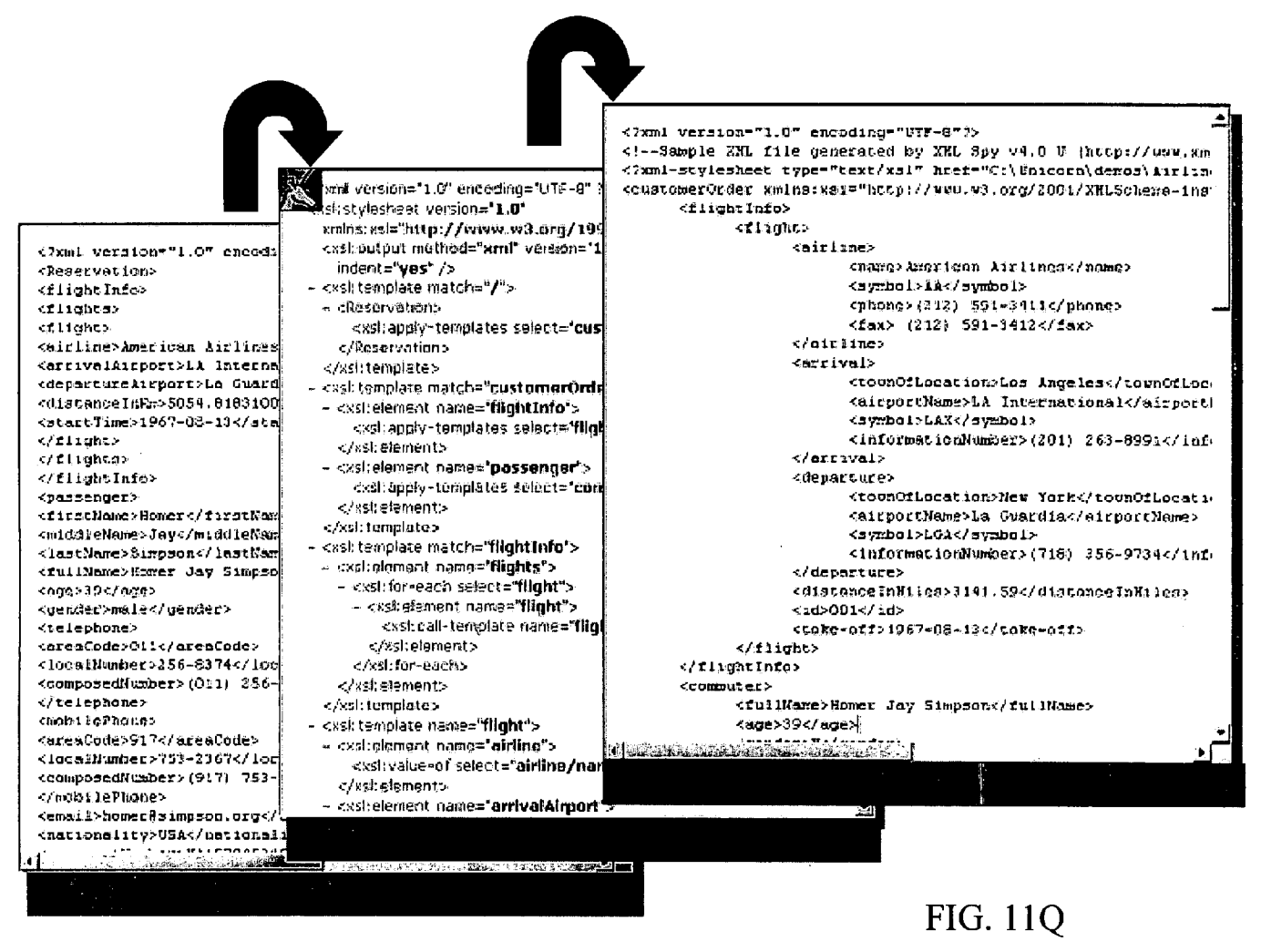
Figure 11R:
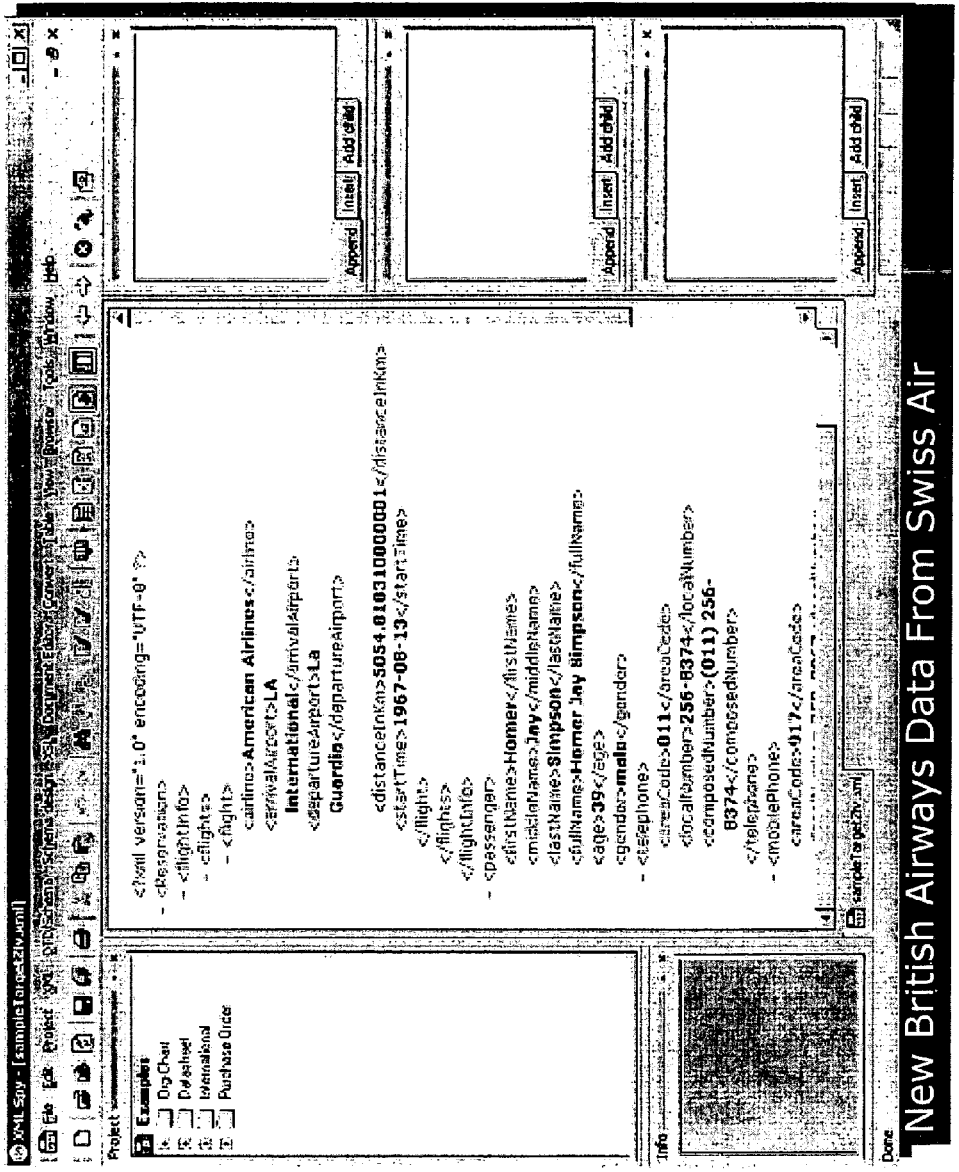

Reference is now made to FIGS. 11A-11R, which are illustrations of a user interface for transforming data from one XML, schema to another using the Coherence software application, in accordance with a preferred embodiment of the present invention. Shown in FIG. 11A is a window with package view of an Airline Integration ontology model in its left pane. The left pane displays classes from a fundamental package. A class Date is shown highlighted, and its properties are shown in the right pane. Fundamental packages are used for standard data types. Shown in FIG. 11B is a window with a hierarchical view of the Airline Integration ontology model in its left pane. The left pane indicates that FrequentFlyer is a subclass of Passenger, Passenger is a subclass of Person, and Person is a subclass of Being. The right pane displays general information about the class FrequentFlyer.

FIG. 11C shows a window used for opening an existing ontology model. In the Coherence software application, ontology models are described using XML and stored in .oml files. Such files are described in applicant's co-pending patent application U.S. Ser. No. 09/866,101 filed on May 25, 2001 and entitled METHOD AND SYSTEM FOR COLLABORATIVE ONTOLOGY MODELING, the contents of which are hereby incorporated by reference.

FIG. 11D shows the hierarchical view from FIG. 11B, indicating properties of the FrequentFlyer class. The property fullName is highlighted, and a window for constraint information indicates that there is a relationship among the ontology properties firstName, lastName and fullName; namely, that fullName is the concatenation of firstName and lastName with a white space therebetween. This relationship is denoted as Constraint_5.

FIG. 11E shows the hierarchical view from FIG. 11B, indicating test instance of the Passenger class. A list of instances is displayed in the right pane, along with property values for a specific selected instance from the list.

FIG. 11F shows two imported XML schema for airline information. FIG. 11G shows a window for importing XML schema into Coherence. FIG. 11H shows a window with a display of an imported XML schema for British Airways, with a list of complexTypes from the imported schema. The complexType Journey is selected, and the right pane indicates that Journey and its elements are currently not mapped to a class and properties of the ontology model.

FIG. 11I shows a window for generating a mapping from the British Airways XML schema into the Airline Integration ontology model. The ontology class Flight is shown selected to correspond to the XML ComplexType Journey. FIG. 11J shows the left pane from FIG. 11H, with the right pane now indicating that the XML complexType Journey from the British Airways XML schema has been mapped to the class Flight from the Airline Integration ontology model. FIG. 11K shows the left pane from FIG. 11H, with a window for selecting properties and indirect properties (i.e., compositions of properties) to correspond to elements from the XML schema. Shown selected in FIG. 11K is a property distanceInMiles( ) of the class Flight FIG. 11L shows the left pane from FIG. 11H, with the right pane now indicated that Journey has been mapped to Flight, and the XML element distance_in_miles within the complexType Journey has been mapped to the property distanceInMiles( ) of the class Flight. FIG. 11M shows the left pane from FIG. 11H, with the right pane now indicating that the mapping has been extended to all XML elements of the complexType Journey, showing the respective properties to which each element is mapped. FIG. 11N shows schema info for the complexType Journey, listing its elements and their data types.

FIG. 11O shows a window for specifying a transformation to be derived. Shown in FIG. 11O is a request to derive a transformation from a source data schema, namely, the imported SwissAir XML schema to a target data schema, namely, the imported British Airways XML schema. Shown in FIG. 11P is an XSLT script generated to transform XML documents conforming to the SwissAir schema to XML documents conforming to the British Airways schema FIG. 11Q shows a specific transformation of a SwissAir XML document to a British Airways XML document, obtained by applying the derived XSLT script from FIG. 11P. Finally, FIG. 11R shows a display of the newly generated British Airways XML document with specific flights and passengers.

EXAMPLES

For purposes of clarity and exposition, the workings of the present invention are described first through a series of twenty-three examples, followed by a general description of implementation. Two series of examples are presented. The first series, comprising the first eleven examples, relates to RDBS transformations. For each of these examples, a source RDBS and target RDBS are presented as input, along with mappings of these schema into a common ontology model. The output is an appropriate SQL query that transforms database tables that conform to the source RDBS, into database tables that conform to the target RDBS. Each example steps through derivation of source and target symbols, expression of target symbols in terms of source symbols and derivation of an appropriate SQL query based on the expressions.

The second series of examples, comprising the last twelve examples, relates to XSLT transformation. For each of these examples, a source XML schema and target XML schema are presented as input, along with mappings of these schema into a common ontology model. The output is an appropriate XSLT script that transforms XML documents that conform to the source schema into XML documents that conform to the target schema.

A First Example

Schoolchildren

In a first example, a target table is of the following form:

TABLE III

Target Table T for First Example

| Child Name | Mother Name | School Location | Form |
|---|---|---|---|

Four source tables are given as follows:

TABLE IV

Source Table $S_1$ for First Example

| Name | School Attending | Mother NI Number |
|---|---|---|

TABLE V

Source Table $S_2$ for First Example

| NI Number | Name | Region | Car Number |
|---|---|---|---|

TABLE VI

Source Table $S_3$ for First Example

| Name | Location | HeadTeacher |
|------|----------|-------------|
|      |          |             |

TABLE VII

Source Table $S_4$ for First Example

| Name | Year | Form |
|------|------|------|
|      |      |      |

Figure 12:
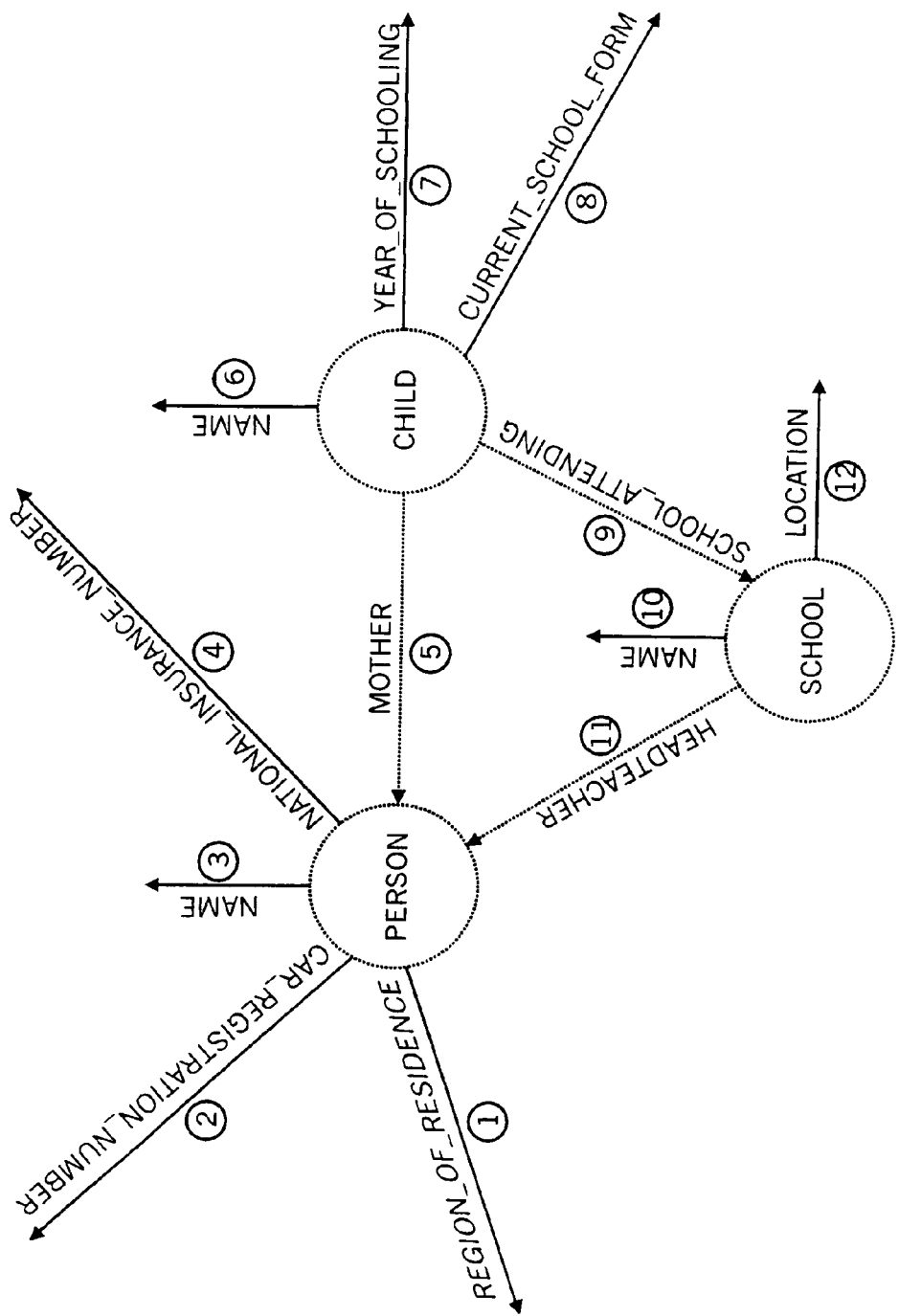
FIG. 12 is an illustration of ontology model corresponding to a first example.

The underlying ontology is illustrated in FIG. 12. The dotted portions of the ontology in FIG. 12 show additional ontology structure that is transparent to the relational database schema. Using the numbering of properties indicated in FIG. 12, the unique properties of the ontology are identified as:

TABLE VIII

Unique Properties within Ontology for First Example

| Property | Property Index |
|----------|----------------|
| name(Child) | 6 |
| national_insurance_number(Person) | 4 |
| name(School) | 10 |

The mapping of the target schema into the ontology is as follows:

TABLE IX

Mapping from Target schema to Ontology for First Example

| schema | Ontology | Property Index |
|--------|----------|----------------|
| T | Class: Child | |
| T.Child_Name | Property: name(Child) | 6 |
| T.Mother_Name | Property: name(mother(Child)) | 3o5 |

TABLE IX-continued

Mapping from Target schema to Ontology for First Example

| schema | Ontology | Property Index |
|--------|----------|----------------|
| T.School_Location | Property: location(school_attending(Child)) | 12o9 |
| T.Form | Property: current_school_form(Child) | 8 |

The symbol o is used to indicate composition of properties. The mapping of the source schema into the ontology is as follows:

TABLE X

Mapping from Source schema to Ontology for First Example

| schema | Ontology | Property Index |
|--------|----------|----------------|
| $S_1$ | Class: Child | |
| $S_1$.Name | Property: name(Child) | 6 |
| $S_1$.School_Attending | Property: name(school_attending(Child)) | 10o9 |
| $S_1$.Mother_NI_Number | Property: national_insurance_number(mother(Child)) | 4o5 |
| $S_2$ | Class: Person | |
| $S_2$.NI_Number | Property: national_insurance_number(Person) | 4 |
| $S_2$.Name | Property: name(Person) | 3 |
| $S_2$.Region | Property: region_of_residence(Person) | 1 |
| $S_2$.Car_Number | Property: car_registration_number(Person) | 2 |
| $S_3$ | Class: School | |
| $S_3$.Name | Property: name(School) | 10 |
| $S_3$.Location | Property: location(School) | 12 |
| $S_3$.HeadTeacher | Property: name(headteacher(School)) | 3o11 |
| $S_4$ | Class: Child | |
| $S_4$.Name | Property: name(Child) | 6 |
| $S_4$.Year | Property: year_of_schooling(Child) | 7 |
| $S_4$.Form | Property: current_school_form(Child) | 8 |

The indices of the source properties are:

TABLE XI

Source Symbols for First Example

| Source Table | Source Symbols |
|--------------|----------------|
| $S_1$ | $10o9o6^{-1}$ |
|       | $4o5o6^{-1}$ |
| $S_2$ | $3o4^{-1}$ |
|       | $1o4^{-1}$ |
|       | $2o4^{-1}$ |
| $S_3$ | $12o10^{-1}$ |
|       | $3o11o10^{-1}$ |
| $S_4$ | $7o6^{-1}$ |
|       | $8o6^{-1}$ |

The symbols in Table XI relate fields of a source table to a key field. Thus in table $S_1$ the first field, $S_1$.Name is a key field. The second field, $S_1$.School_Attending is related to the first field by the composition $10o9o6^{-1}$, and the third field, $S_1$.Mother_NI_Number is related to the first field by the composition $4o5o6^{-1}$. In general, if a table contains more than one key field, then expressions relative to each of the key fields are listed.

The inverse notation, such as $6^{-1}$ is used to indicate the inverse of property 6. This is well defined since property 6 is a unique, or one-to-one, property in the ontology model. The indices of the target properties, keyed on Child_Name are:

TABLE XII

Target Symbols for First Example

| Target Table | Target Symbols | Paths |
|---|---|---|
| T | $3o5o6^{-1}$ | $(3o4^{-1}) o (4o5o6^{-1})$ |
|   | $12o9o6^{-1}$ | $(12o10^{-1}) o (10o9o6^{-1})$ |
|   | $8o6^{-1}$ | $(8o6^{-1})$ |

Based on the paths given in Table XII, the desired SQL query is:

```
INSERT INTO T(Child_Name, Mother_Name, School_Location, Form)
(SELECT
        S₁.Name AS Child_Name,
        S₂.Name AS Mother_Name,
        S₃.Location AS School_Location,
        S₄.Form AS Form
FROM
        S₁, S₂, S₃, S₄
WHERE
        S₂.NI_Number = S₁.Mother_NI_Number AND
        S₃.Name = S₁.School_Attending AND
        S₄.Name = S₁.Name);
```

The rules provided with the examples relate to the stage of converting expressions of target symbols in terms of source symbols, into SQL queries. In general, Rule 1: When a target symbol is represented using a source symbols, say $(aob^{-1})$, from a source table, S, then the column of S mapping to a is used in the SELECT clause of the SQL query and the column of S mapping to b is used in the WHERE clause.

Rule 2: When a target symbol is represented as a composition of source symbols, say $(aob^{-1}) o (boc^{-1})$, where $aob^{-1}$ is taken from a first source table, say $S_1$, and $boc^{-1}$ is taken from a second source table, say $S_2$, then $S_1$ and $S_2$ must be joined in the SQL query by the respective columns mapping to b.

Rule 3: When a target symbol is represented using a source symbols, say $(aob^{-1})$, from a source table, S, and is not composed with another source symbol of the form $boc^{-1}$, then table S must be joined to the target table through the column mapping to b.

When applied to the following sample source data, Tables XIII, XIV, XV and XVI, the above SQL query produces the target data in Table XVII.

TABLE XIII

Sample Source Table $S_1$ for First Example

| Name | School_Attending | Mother_NI_Number |
|---|---|---|
| Daniel Ashton | Chelsea Secondary School | 123456 |
| Peter Brown | Warwick School for Boys | 673986 |
| Ian Butler | Warwick School for Boys | 234978 |
| Matthew Davies | Manchester Grammar School | 853076 |
| Alex Douglas | Weatfields Secondary School | 862085 |
| Emma Harrison | Camden School for Girls | 275398 |
| Martina Howard | Camden School for Girls | 456398 |

TABLE XIV

Sample Source Table $S_2$ for First Example

| NI_Number | Name | Region | Car_Number |
|---|---|---|---|
| 123456 | Linda | London | NULL |
| 673986 | Amanda | Warwick | NULL |
| 456398 | Claire | Cambridgeshire | NULL |
| 862085 | Margaret | NULL | NULL |
| 234978 | Amanda | NULL | NULL |
| 853076 | Victoria | Manchester | NULL |
| 275398 | Elizabeth | London | NULL |

TABLE XV

Sample Source Table $S_3$ for First Example

| Name | Location | HeadTeacher |
|---|---|---|
| Manchester Grammar School | Manchester | M. Payne |
| Camden School for Girls | London | J. Smith |
| Weatfields Secondary School | Cambridgeshire | NULL |
| Chelsea Secondary School | London | I. Heath |
| Warwick School for Boys | Warwickshire | NULL |

TABLE XVI

Sample Source Table $S_4$ for First Example

| Name | Year | Form |
|---|---|---|
| Peter Brown | 7 | Lower Fourth |
| Daniel Ashton | 10 | Mid Fifth |
| Matthew Davies | 4 | Lower Two |
| Emma Harrison | 6 | Three |
| James Kelly | 3 | One |
| Greg McCarthy | 5 | Upper Two |
| Tina Reynolds | 8 | Upper Fourth |

TABLE XVII

Sample Target Table T for First Example

| Child_Name | Mother_Name | School_Location | Form |
|---|---|---|---|
| Daniel Ashton | Linda | London | Mid Fifth |
| Peter Brown | Amanda | Warwickshire | Lower Fourth |
| Matthew Davies | Victoria | Manchester | Lower Two |
| Emma Harrison | Elizabeth | London | Three |

A Second Example

Employees

In a second example, a target table is of the following form:

TABLE XVIII

Target Table T for Second Example

| Name | Department | Supervisor | Room# |
|---|---|---|---|

Four source tables are given as follows:

TABLE XIX

Source Table $S_1$ for Second Example

| Emp_ID# | Name | Department |
|---------|------|------------|

TABLE XX

Source Table $S_2$ for Second Example

| Employee_Name | Supervisor | Project |
|---------------|------------|---------|

TABLE XXI

Source Table $S_3$ for Second Example

| ID# | Room_Assignment | Telephone# |
|-----|-----------------|------------|

TABLE XXII

Source Table $S_4$ for Second Example

| Department | Budget |
|------------|--------|

Figure 13:
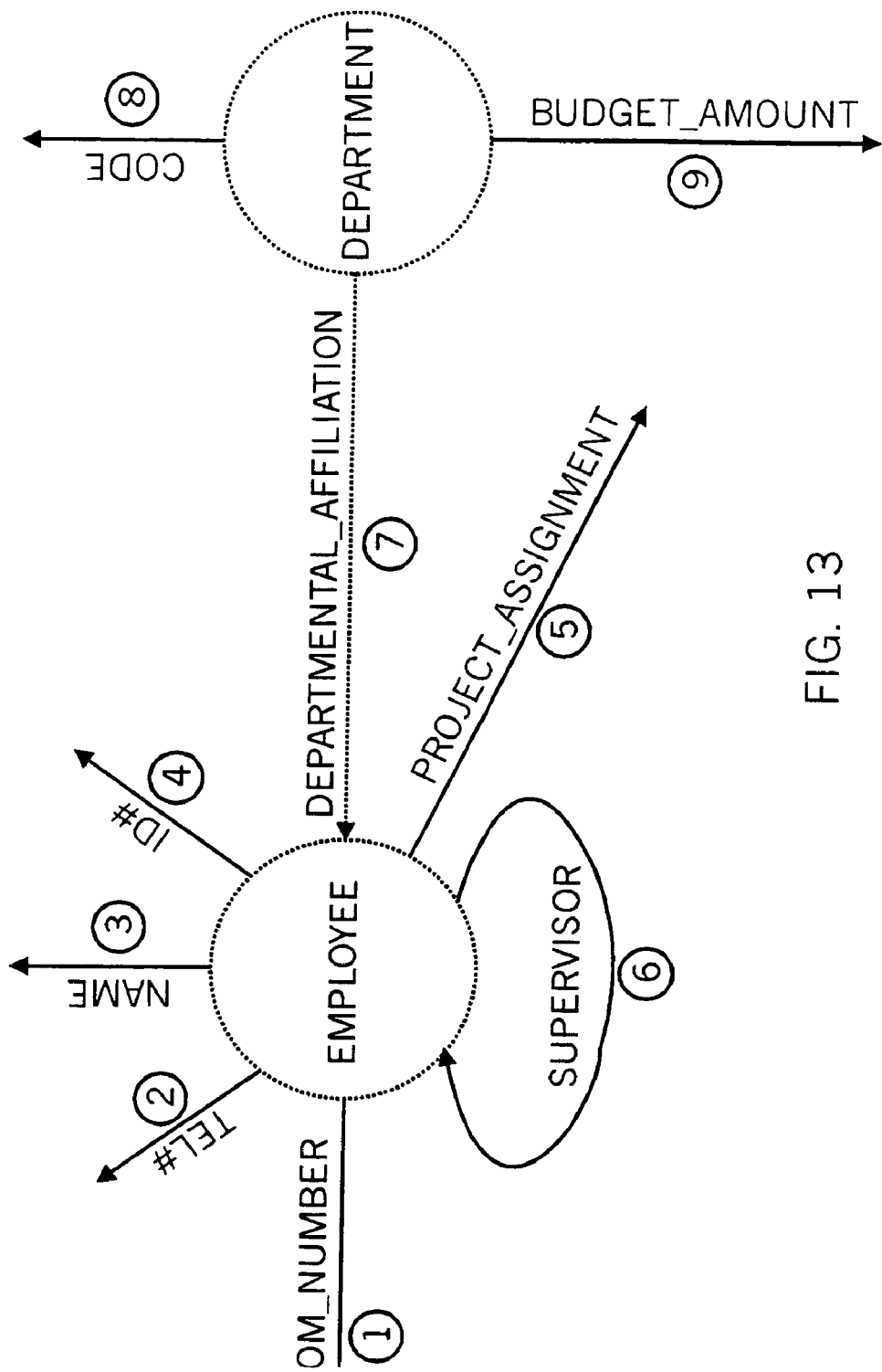
FIG. 13 is an illustration of ontology model corresponding to a second example.

The underlying ontology is illustrated in FIG. 13. The dotted portions of the ontology in FIG. 13 are additional ontology structure that is transparent to the relational database schema. The unique properties of the ontology are:

TABLE XXIII

Unique Properties within Ontology for Second Example

| Property | Property Index |
|----------|----------------|
| name(Employee) | 3 |
| ID#(Employee) | 4 |

The mapping of the target schema into the ontology is as follows:

TABLE XXIV

Mapping from Target schema to Ontology for Second Example

| schema | Ontology | Property Index |
|--------|----------|----------------|
| T | Class: Employee | |
| T.Name | Property: name(Employee) | 3 |
| T.Department | Property: code(departmental_affiliation(Employee)) | 807 |
| T.Supervisor | Property: name(supervisor(Employee)) | 306 |
| T.Room# | Property: room_number(Employee) | 1 |

The mapping of the source schema into the ontology is as follows:

TABLE XXV

Mapping from Source schema to Ontology for Second Example

| schema | Ontology | Property Index |
|--------|----------|----------------|
| $S_1$ | Class: Employee | |
| $S_1$.Emp_ID# | Property: ID#(Employee) | 4 |
| $S_1$.Name | Property: name(Employee) | 3 |
| $S_1$.Department | Property: code(departmental_affiliation(Employee)) | 807 |
| $S_2$ | Class: Employee | |
| $S_2$.Employee_Name | Property: name(Employee) | 3 |
| $S_2$.Supervisor | Property: name(supervisor(Employee)) | 306 |
| $S_2$.Project | Property: project_assignment(Employee) | 5 |
| $S_3$ | Class: Employee | |
| $S_3$.ID# | Property: ID#(Employee) | 4 |
| $S_3$.Room_Assignment | Property: room_number(Employee) | 1 |
| $S_3$.Telephone# | Property: tel#(Employee) | 2 |
| $S_4$ | Class: Department | |

TABLE XXV-continued

Mapping from Source schema to Ontology for Second Example

| schema | Ontology | Property Index |
|---|---|---|
| $S_4$.Department | Property: code(Department) | 8 |
| $S_4$.Budget | Property: budget_amount(Department) | 9 |

The indices of the source properties are:

TABLE XXVI

Source Symbols for Second Example

| Source Table | Source Symbols |
|---|---|
| $S_1$ | $3o4^{-1}$ |
|  | $8o7o4^{-1}$ |
|  | $4o3^{-1}$ |
|  | $8o7o3^{-1}$ |
| $S_2$ | $3o6o3^{-1}$ |
|  | $5o3^{-1}$ |
| $S_3$ | $1o4^{-1}$ |
|  | $2o4^{-1}$ |
| $S_4$ | $9o8^{-1}$ |

The indices of the target properties, keyed on Name are:

TABLE XXVII

Target Symbols for Second Example

| Target Table | Target Symbols | Paths |
|---|---|---|
| T | $8o7o3^{-1}$ | $(8o7o3^{-1})$ |
|  | $3o6o3^{-1}$ | $(3o6o3^{-1})$ |
|  | $1o3^{-1}$ | $(1o4^{-1}) o (4o3^{-1})$ |

Based on the paths given in Table XXVII, the desired SQL query is:

```
INSERT INTO T(Name, Department, Supervisor, Room#)
(SELECT
        S₁.Name AS Name,
        S₁.Department AS Department,
        S₂.Supervisor AS Supervisor,
        S₃.Room_Assignment AS Room#
FROM
        S₁, S₂, S₃
WHERE
        S₂.Employee_Name = S₁.Name AND
        S₃.ID# = S₁.Emp_ID#);
```

It is noted that Table $S_4$ not required in the SQL. When applied to the following sample source data, Tables XXVIII, XXIX and XXX, the above SQL query produces the target data in Table XXXI.

TABLE XXVIII

Sample Source Table $S_1$ for Second Example

| Emp_ID# | Name | Department |
|---|---|---|
| 198 | Patricia | SW |
| 247 | Eric | QA |
| 386 | Paul | IT |

TABLE XXIX

Sample Source Table $S_2$ for Second Example

| Employee_Name | Supervisor | Project |
|---|---|---|
| Eric | John | Release 1.1 |
| Patricia | George | Release 1.1 |
| Paul | Richard | Release 1.1 |

TABLE XXX

Sample Source Table $S_3$ for Second Example

| ID# | Room_Assignment | Telephone# |
|---|---|---|
| 386 | 10 | 106 |
| 198 | 8 | 117 |
| 247 | 7 | 123 |

TABLE XXXI

Sample Target Table T for Second Example

| Name | Department | Supervisor | Room# |
|---|---|---|---|
| Patricia | SW | George | 8 |
| Eric | QA | John | 7 |
| Paul | IT | Richard | 10 |

A Third Example

Airline Flights

In a third example, a target table is of the following form:

TABLE XXXII

Target Table T for Third Example

| FlightID | DepartingCity | ArrivingCity |
|---|---|---|

Two source tables are given as follows:

TABLE XXXIII

Source Table $S_1$ for Third Example

| Index | APName | Location |
|---|---|---|

TABLE XXXIV

Source Table $S_2$ for Third Example

| FlightID | FromAirport | ToAirport |
|---|---|---|

Figure 14:
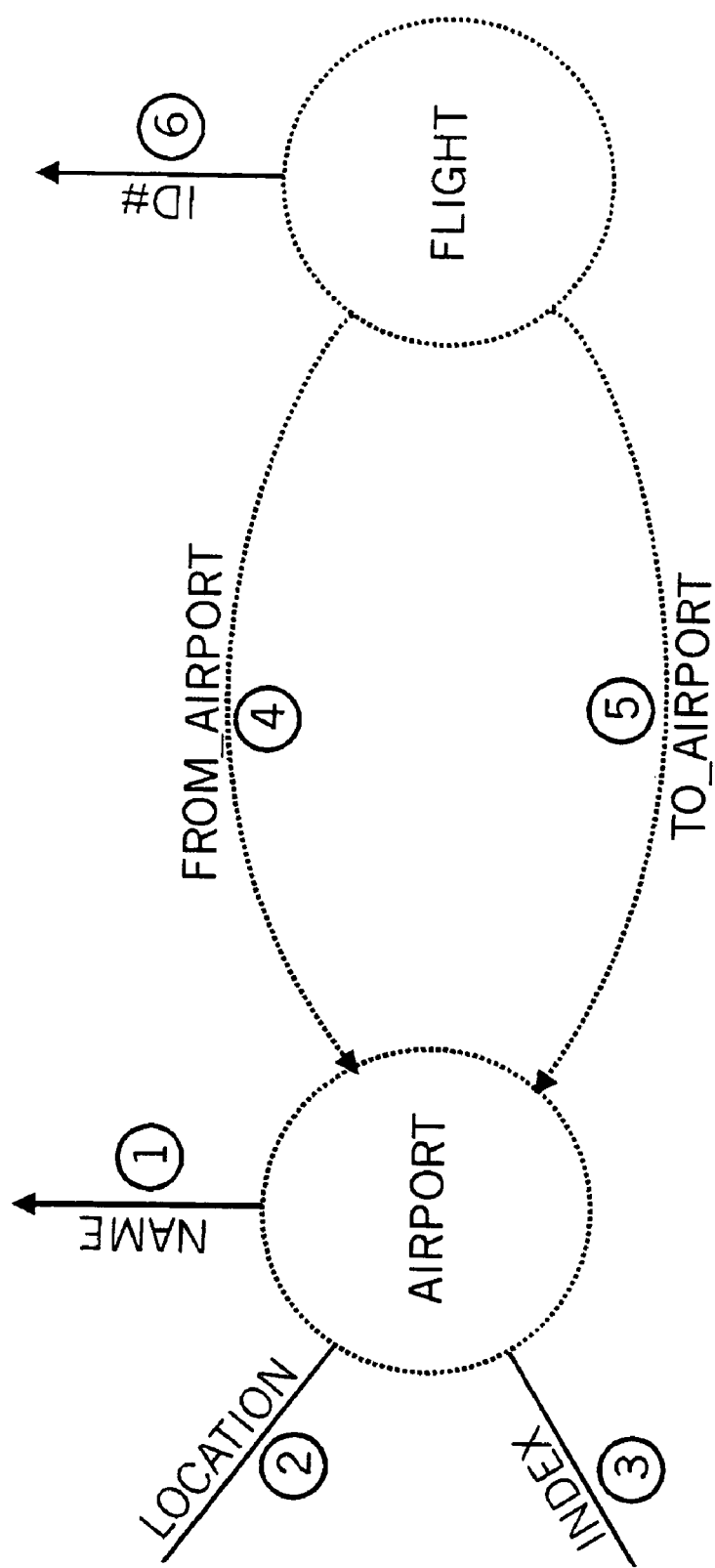
FIG. 14 is an illustration of ontology model corresponding to a third example.

The underlying ontology is illustrated in FIG. 14. The dotted portions of the ontology in FIG. 14 are additional ontology structure that is transparent to the relational database schema. The unique properties of the ontology are:

TABLE XXXV

Unique Properties within Ontology for Third Example

| Property | Property Index |
|---|---|
| name(Airport) | 1 |
| ID(Flight) | 6 |

The mapping of the target schema into the ontology is as follows:

TABLE XXXVI

Mapping from Target schema to Ontology for Third Example

| schema | Ontology | Property Index |
|---|---|---|
| T | Class: Flight | |
| T.FlightID | Property: ID#(Flight) | 6 |
| T.DepartingCity | Property: location(from_airport(Flight)) | $2o4$ |
| T.ArrivingCity | Property: location(to_airport(Flight)) | $2o5$ |

The mapping of the source schema into the ontology is as follows:

TABLE XXXVII

Mapping from Source schema to Ontology for Third Example

| schema | Ontology | Property Index |
|---|---|---|
| $S_1$ | Class Airport | |
| $S_1$.Index | Property Index(Airport) | 3 |
| $S_1$.APName | Property. name(Airport) | 1 |
| $S_1$.Location | Property: location(Airport) | 2 |
| $S_2$ | Class: Flight | |
| $S_2$.FlightID | Property: ID#(Flight) | 6 |
| $S_2$.FromAirport | Property: name(from_airport(Flight)) | $1o4$ |
| $S_2$.ToAirport | Property: name(to_airport(Flight)) | $1o5$ |

The indices of the source properties are:

TABLE XXXVIII

Source Symbols for Third Example

| Table | Source Symbols |
|---|---|
| $S_1$ | $1o3^{-1}$ |
| | $2o3^{-1}$ |
| | $3o1^{-1}$ |
| | $2o1^{-1}$ |
| $S_2$ | $1o4o6^{-1}$ |
| | $1o5o6^{-1}$ |

The indices of the target properties, keyed on FlightID are:

TABLE XXXIX

Target Symbols for Third Example

| Table | Target Symbols | Paths |
|---|---|---|
| T | $2o4o6^{-1}$ | $(2o1^{-1}) \circ (1o4o6^{-1})$ |
| | $2o5o6^{-1}$ | $(2o1^{-1}) \circ (1o5o6^{-1})$ |

Since the path $(2o1^{-1})$ appears in two rows of Table XXXIX, it is necessary to create two tables for $S_1$ in the SQL query. Based on the paths given in Table XXXII, the desired SQL query is:

```
INSERT INTO T(FlightID, DepartingCity, ArrivingCity)
(SELECT
        S_2.FlightID AS FlightID,
        S_11.Location AS DepartingCity,
        S_12.Location AS ArrivingCity
FROM
        S_1 S_11, S_1 S_12, S_2
WHERE
        S_11.APName = S_2.FromAirport AND
        S_12.APName = S_2.ToAirport);
```

In general,

Rule 4: When the same source symbol is used multiple times in representing target symbols, each occurrence of the source symbol must refer to a different copy of the source table containing it.

When applied to the following sample source data, Tables XL XLI, the above SQL query produces the target data in Table XLII.

TABLE XL

Sample Source Table $S_1$ for Third Example

| Index | APName | Location |
|---|---|---|
| 1 | Orly | Paris |
| 2 | JFK | New York |
| 3 | LAX | Los Angeles |
| 4 | HNK | Hong Kong |
| 5 | TLV | Tel Aviv |
| 6 | Logan | Boston |

TABLE XLI

Sample Source Table $S_2$ for Third Example

| FlightID | FromAirport | ToAirport |
|---|---|---|
| 001 | Orly | JFK |
| 002 | JFK | LAX |
| 003 | TLV | HNK |
| 004 | Logan | TLV |

TABLE XLII

Sample Target Table T for Third Example

| FlightID | DepartingCity | ArrivingCity |
|---|---|---|
| 001 | Paris | New York |
| 002 | New York | Los Angeles |
| 003 | Tel Aviv | Hong Kong |
| 004 | Boston | Tel Aviv |

A Fourth Example

Lineage

In a fourth example, a target table is of the following form:

TABLE XLIII

Target Table T for Fourth Example

| ID | Name | Father_Name |
|----|------|-------------|

One source table is given as follows:

TABLE XLIV

Source Table S for Fourth and Fifth Examples

| ID | Name | Father_ID |
|----|------|-----------|

Figure 15:
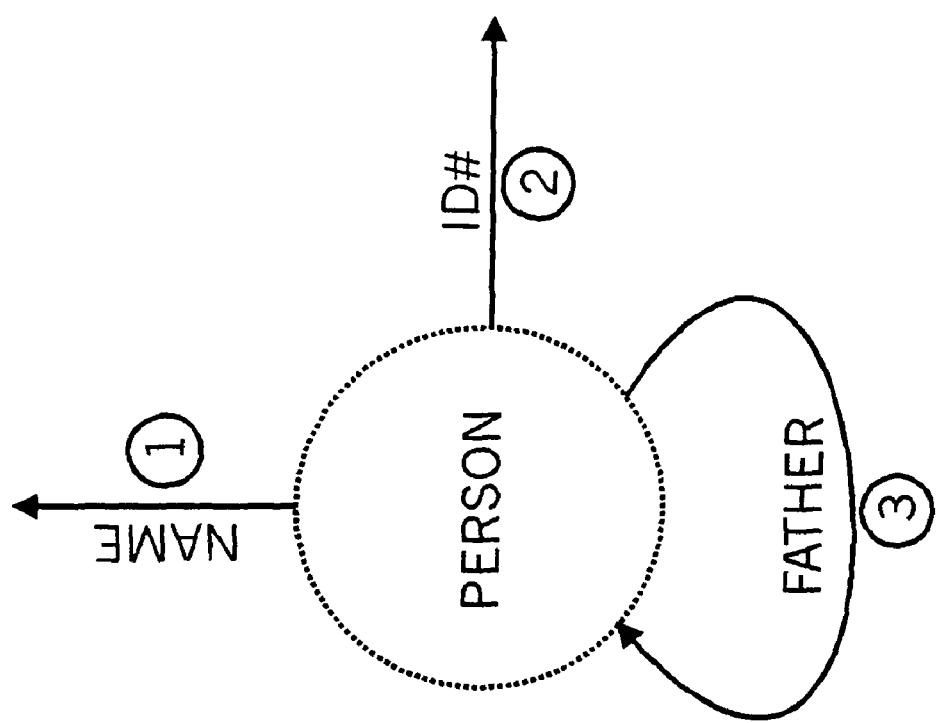
FIG. 15 is an illustration of ontology model corresponding to a fourth example.

The underlying ontology is illustrated in FIG. 15. The dotted portions of the ontology in FIG. 15 are additional ontology structure that is transparent to the relational database schema. The unique properties of the ontology are:

TABLE XLV

Unique Properties within Ontology for Fourth and Fifth Examples

| Property | Property Index |
|----------|----------------|
| name(Person) | 1 |
| ID#(Person) | 2 |

The mapping of the target schema into the ontology is as follows:

TABLE XLVI

Mapping from Target schema to Ontology for Fourth Example

| schema | Ontology | Property Index |
|--------|----------|----------------|
| T | Class: Person | |
| T.ID | Property: ID#(Person) | 2 |
| T.Name | Property: name(Person) | 1 |
| T.Father_Name | Property: name(father(Person)) | 1o3 |

The mapping of the source schema into the ontology is as follows:

TABLE XLVII

Mapping from Source schema to Ontology for Fourth and Fifth Examples

| schema | Ontology | Property Index |
|--------|----------|----------------|
| S | Class: Person | |
| S.ID | Property: ID#(Person) | 2 |
| S.Name | Property: name(Person) | 1 |
| S.Father_ID | Property: ID#(father(Person)) | 2o3 |

The indices of the source properties are:

TABLE XLVIII

Source Symbols for Fourth and Fifth Examples

| Table | Source Symbols |
|-------|----------------|
| $S_1$ | $1o2^{-1}$ |
|       | $2o3o2^{-1}$ |

The indices of the target properties, keyed on ID are:

TABLE XLIX

Target Symbols for Fourth Example

| Table | Target Symbols | Paths |
|-------|----------------|-------|
| T | $1o2^{-1}$ | $(1o2^{-1})$ |
|   | $1o3o2^{-1}$ | $(1o2^{-1}) \circ (2o3o2^{-1})$ |

Based on the paths given in Table XLIX, the desired SQL query is:

```
INSERT INTO T(ID, Name, Father_ID)
(SELECT
        S₁.ID AS ID,
        S₁.Name AS Name,
        S₂.ID AS Father_ID
FROM
        S S₁, S S₂
WHERE
        S₂.ID = S₁.Father_ID);
```

A Fifth Example

Lineage

In a fifth example, the target property of Father_Name in the fourth example is changed to Grandfather_Name, and the target table is thus of the following form:

TABLE L

Target Table T for Fifth Example

| ID | Name | Grandfather_Name |
|----|------|------------------|

One source table is given as above in Table XLIV.

The underlying ontology is again illustrated in FIG. 15. The unique properties of the ontology are as above in Table XLV.

The mapping of the target schema into the ontology is as follows:

TABLE LI

Mapping from Target schema to Ontology for Fifth Example

| schema | Ontology | Property Index |
|--------|----------|----------------|
| T | Class: Person | |
| T.ID | Property: ID#(Person) | 2 |
| T.Name | Property: name(Person) | 1 |

TABLE LI-continued

Mapping from Target schema to Ontology for Fifth Example

| schema | Ontology | Property Index |
|---|---|---|
| T.Grandfather_Name | Property: name(father(father(Person))) | $1o3o3$ |

The mapping of the source schema into the ontology is given in Table XLVII above.

The indices of the source properties are given in Table XLVIII above.

The indices of the target properties, keyed on ID are:

TABLE LII

Target Symbols for Fifth Example

| Table | Target Symbols | Paths |
|---|---|---|
| T | $1o2^{-1}$ $1o3o3o2^{-1}$ | $(1o2^{-1})$ $(1o2^{-1}) \circ (2o3o2^{-1}) \circ (2o3o2^{-1})$ |

Based on the paths given in Table LII, the desired SQL query is:

```
INSERT INTO T(ID, Name, Grandfather_ID)
(SELECT
        S₁.ID AS ID, S₁.Name AS Name,
        S₃.ID AS Grandfather_ID
FROM
        S S₁, S S₂, S S₃
WHERE
        S₃.ID = S₂.Father_ID AND
        S₂.ID = S₁.Father_ID);
```

A Sixth Example

Dog Owners

In a sixth example, a target table is of the following form:

TABLE LIII

Target Table T for Sixth Example

| ID | Name | Dogs_Previous_Owner |
|---|---|---|

Two source tables are given as follows:

TABLE LIV

Source Table $S_1$ for Sixth Example

| ID | Name | Dog |
|---|---|---|

TABLE LV

Source Table $S_2$ for Sixth Example

| Owner | Name | Previous_Owner |
|---|---|---|

Figure 16:
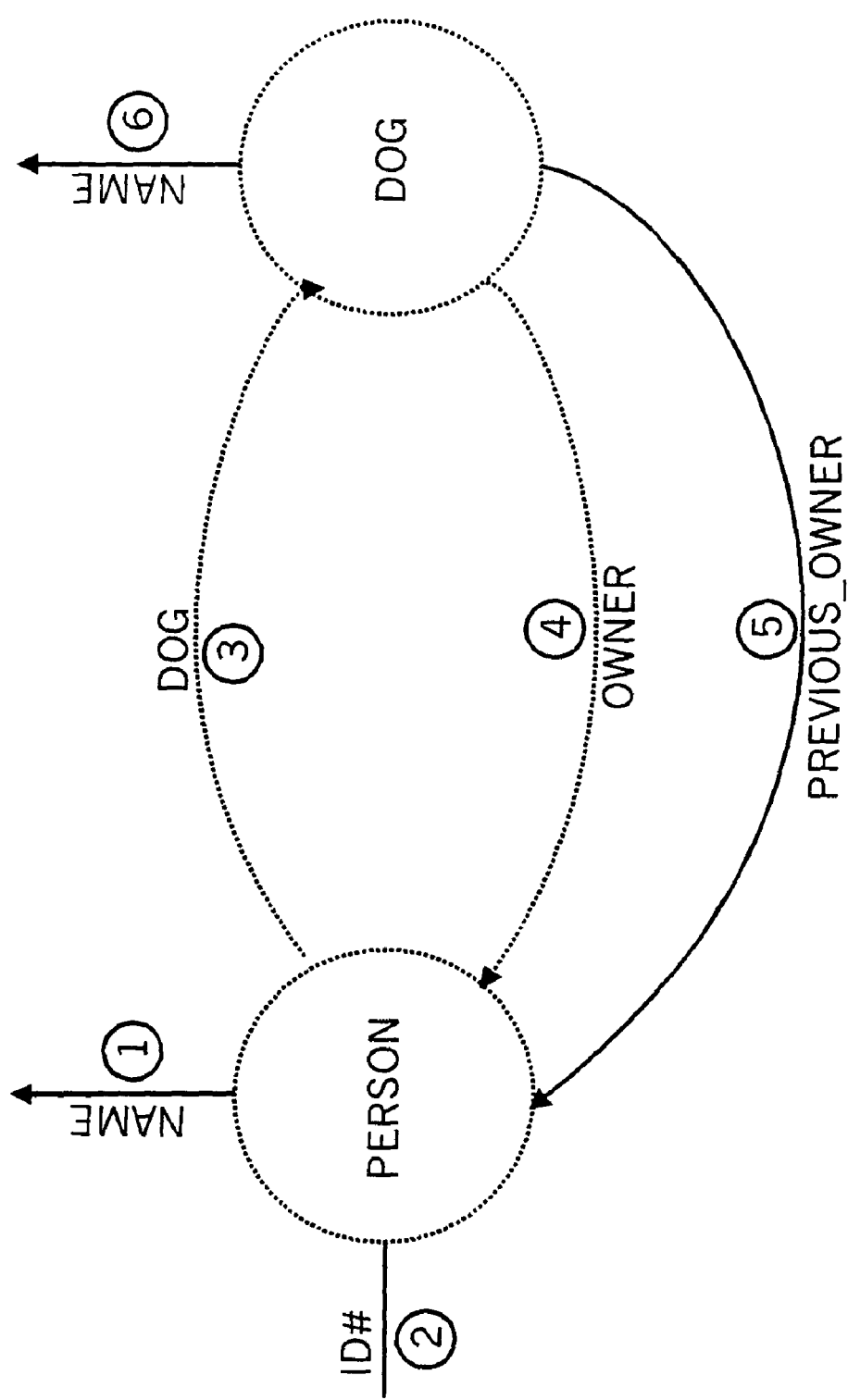
FIG. 16 is an illustration of ontology model corresponding to a fifth and sixth example.

The underlying ontology is illustrated in FIG. 16. The dotted portions of the ontology in FIG. 16 are additional ontology structure that is transparent to the relational database schema. The unique properties of the ontology are:

TABLE LVI

Unique Properties within Ontology for Sixth Example

| Property | Property Index |
|---|---|
| ID#(Person) | 2 |
| name(Dog) | 6 |

The mapping of the target schema into the ontology is as follows:

TABLE LVII

Mapping from Target schema to Ontology for Sixth Example

| schema | Ontology | Property Index |
|---|---|---|
| T | Class: Person | |
| T.ID | Property: ID#(Person) | 2 |
| T.Name | Property: name(Person) | 1 |
| T.Dogs_Previous_Owner | Property: previous_owner(dog(Person)) | $5o3$ |

The mapping of the source schema into the ontology is as follows:

TABLE LVIII

Mapping from Source schema to Ontology for Sixth Example

| schema | Ontology | Property Index |
|---|---|---|
| $S_1$ | Class: Person | |
| $S_1$.ID | Property: ID#(Person) | 2 |
| $S_1$.Name | Property: name(Person) | 1 |
| $S_1$.Dog | Property: name(dog(Person)) | $6o3$ |
| $S_2$ | Class: Dog | |
| $S_2$.Owner | Property: name(owner(Dog)) | $1o4$ |
| $S_2$.Name | Property: name(Dog) | 6 |
| $S_2$.Previous_Owner | Property: name(previous_owner(Dog)) | $1o5$ |

The indices of the source properties are:

TABLE LIX

Source Symbols for Sixth Example

| Table | Source Symbols |
|---|---|
| $S_1$ | $1o2^{-1}$ $6o3o2^{-1}$ |
| $S_2$ | $1o4o6^{-1}$ $1o5o6^{-1}$ |

The indices of the target properties, keyed on ID are:

TABLE LX

Target Symbols for Sixth Example

| Table | Target Symbols | Paths |
|---|---|---|
| T | $1o2^{-1}$ | $(1o2^{-1})$ |
|   | $5o3o2^{-1}$ | $(1o5o6^{-1}) \circ (6o3o2^{-1})$ |

Based on the paths given in Table LX, the desired SQL query is:

```
INSERT INTO T(ID, Name, Dogs_Previous_Owner)
(SELECT
        S₁.ID AS ID, S₁.Name AS Name,
        S₂.Previous_Owner AS Dogs_Previous_Owner
FROM
        S₁, S₂
WHERE
        S₂.Name = S₁.Dog);
```

A Seventh Example

Employees

In a seventh example, a target table is of the following form:

TABLE LXI

Target Table T for Seventh Example

| ID | Name | Email | Department |
|---|---|---|---|

Five source tables are given as follows:

TABLE LXII

Source Table $S_1$ for Seventh Example

| ID | Department |
|---|---|

TABLE LXIII

Source Table $S_2$ for Seventh Example

| ID | Email |
|---|---|

TABLE LXIV

Source Table $S_3$ for Seventh Example

| ID | Name |
|---|---|

TABLE LXV

Source Table $S_4$ for Seventh Example

| ID | Email |
|---|---|

TABLE LXVI

Source Table $S_5$ for Seventh Example

| ID | Department |
|---|---|

Figure 17:
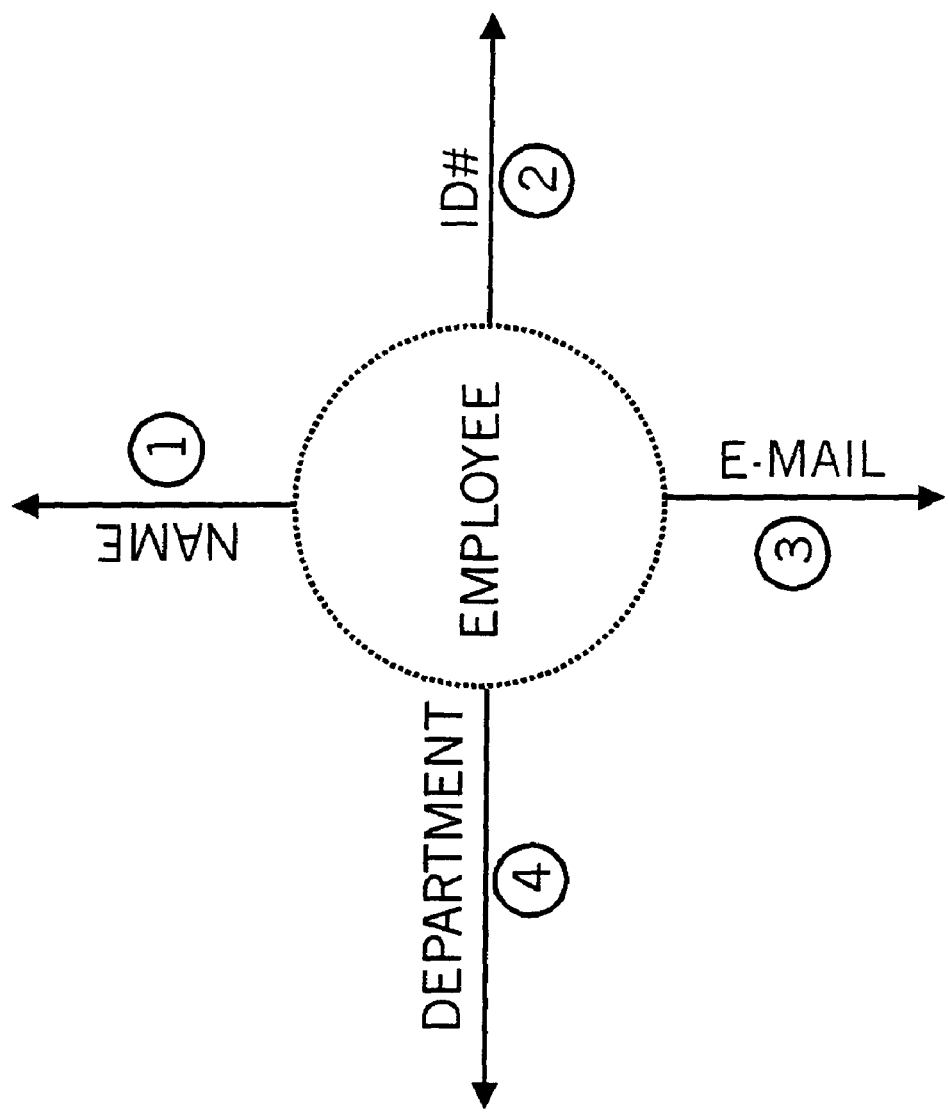
FIG. 17 is an illustration of ontology model corresponding to a seventh example.

The underlying ontology is illustrated in FIG. 17. The dotted portions of the ontology in FIG. 17 are additional ontology structure that is transparent to the relational database schema. The unique properties of the ontology are:

TABLE LXVII

Unique Properties within Ontology for Seventh Example

| Property | Property Index |
|---|---|
| ID#(Person) | 2 |

The mapping of the target schema into the ontology is as follows:

TABLE LXVIII

Mapping from Target schema to Ontology for Seventh Example

| schema | Ontology | Property Index |
|---|---|---|
| T | Class: Person |  |
| T.ID | Property: ID#(Person) | 2 |
| T.Name | Property: name(Person) | 1 |
| T.Email | Property: e-mail(Person) | 3 |
| T.Department | Property: department(Person) | 4 |

The mapping of the source schema into the ontology is as follows:

TABLE LXIX

Mapping from Source schema to Ontology for Seventh Example

| schema | Ontology | Property Index |
|---|---|---|
| $S_1$ | Class: Employee |  |
| $S_1$.ID | Property: ID#(Employee) | 2 |
| $S_1$.Department | Property: department(Employee) | 4 |
| $S_2$ | Class: Employee |  |
| $S_2$.ID | Property: ID#(Employee) | 2 |
| $S_2$.Email | Property: e-mail(Employee) | 3 |
| $S_3$ | Class: Employee |  |
| $S_3$.ID | Property: ID#(Employee) | 2 |
| $S_3$.Name | Property: name(Employee) | 1 |
| $S_4$ | Class: Employee |  |
| $S_4$.ID | Property: ID#(Employee) | 2 |
| $S_4$.Email | Property: e-mail(Employee) | 3 |
| $S_5$ | Class: Employee |  |
| $S_5$.ID | Property: ID#(Employee) | 2 |
| $S_5$.Department | Property: department(Employee) | 4 |

The indices of the source properties are:

TABLE LXX

Source Symbols for Seventh Example

| Table | Source Symbols |
|---|---|
| $S_1$ | $4o2^{-1}$ |
| $S_2$ | $3o2^{-1}$ |
| $S_3$ | $1o2^{-1}$ |
| $S_4$ | $3o2^{-1}$ |
| $S_5$ | $4o2^{-1}$ |

The indices of the target properties, keyed on ID are:

TABLE LXXI

Target Symbols for Seventh Example

| Table | Target Symbols | Paths |
|---|---|---|
| T | $1o2^{-1}$ | $(1o2^{-1})$ |
|   | $3o2^{-1}$ | $(3o2^{-1})$ |
|   | $4o2^{-1}$ | $(4o2^{-1})$ |

Based on the paths given in Table LXXI, the desired SQL query is:

```
INSERT INTO T(ID, Name, Email, Department)
(SELECT
        S₁.ID AS ID, S₃.Name AS Name,
        S₂.Email AS Email,
        S₁.Department AS Department
FROM
        S₁, S₂, S₃
WHERE
        S₂.ID = S₁.ID AND S₃.ID = S₁.ID
UNION
SELECT
        S₁.ID AS ID,
        S₃.Name AS Name,
        S₄.Email AS Email,
        S₁.Department AS Department
FROM
        S₁, S₃, S₄
WHERE
        S₃.ID = S₁.ID AND S₄.ID = S₁.ID
UNION
SELECT
        S₁.ID AS ID,
        S₃.Name AS Name,
        S₂.Email AS Email,
        S₅.Department AS Department
FROM
        S₁, S₂, S₃, S₅
WHERE
        S₂.ID = S₁.ID AND S₃.ID = S₁.ID AND S₅.ID = S₁.ID
UNION
SELECT
        S₁.ID AS ID,
        S₃.Name AS Name,
        S₄.Email AS Email,
        S₅.Department AS Department
FROM
        S₁, S₃, S₄, S₅
WHERE
        S₂.ID = S₁.ID AND S₃.ID = S₁.ID AND
        S₄.ID = S₁.ID AND S₅.ID = S₁.ID);
```

In general,

Rule 5: When a source symbol used to represent a target symbol is present in multiple source tables, each such table must be referenced in an SQL query and the resultant queries joined.

When applied to the following sample source data, Tables LXXII, LXXIII, LXXIV, LXXV and LXXVI the above SQL query produces the target data in Table LXXVII

TABLE LXXII

Sample Source Table $S_1$ for Seventh Example

| ID | Department |
|---|---|
| 123 | SW |
| 456 | PdM |
| 789 | SW |

TABLE LXXIII

Sample Source Table $S_2$ for Seventh Example

| ID | Email |
|---|---|
| 123 | jack@company |
| 456 | jan@ company |
| 789 | jill@ company |

TABLE LXXIV

Sample Source Table $S_3$ for Seventh Example

| ID | Name |
|---|---|
| 123 | Jack |
| 456 | Jan |
| 789 | Jill |
| 999 | Joe |
| 111 | Jim |
| 888 | Jeffrey |

TABLE LXXV

Sample Source Table $S_4$ for Seventh Example

| ID | Email |
|---|---|
| 999 | joe@ company |
| 111 | jim@ company |
| 888 | jeffrey@ company |

TABLE LXXVI

Sample Source Table $S_5$ for Seventh Example

| ID | Department |
|---|---|
| 999 | Sales |
| 111 | Business_Dev |
| 888 | PdM |

TABLE LXXVII

Sample Target Table T for Seventh Example

| ID | Name | Email | Department |
|---|---|---|---|
| 123 | Jack | jack@company | SW |
| 456 | Jan | jan@company | PdM |
| 789 | Jill | jill@company | SW |
| 111 | Jim | jim@company | Business_Dev |
| 888 | Jeffrey | jeffrey@company | PdM |
| 999 | Joe | joe@company | Sales |

An Eighth Example

Employees

In an eighth example, a target table is of the following form:

TABLE LXXVIII

Target Table T for Eighth Example

| Emp_Name | Emp_Division | Emp_Tel_No |
|---|---|---|

Two source tables are given as follows:

TABLE LXXIX

Source Table $S_1$ for Eighth Example

| Employee_Division | Employee_Tel# | Employee_Name | Room# |
|---|---|---|---|

TABLE LXXX

Source Table $S_2$ for Eighth Example

| Name | Employee_Tel | Division |
|---|---|---|

Figure 18:
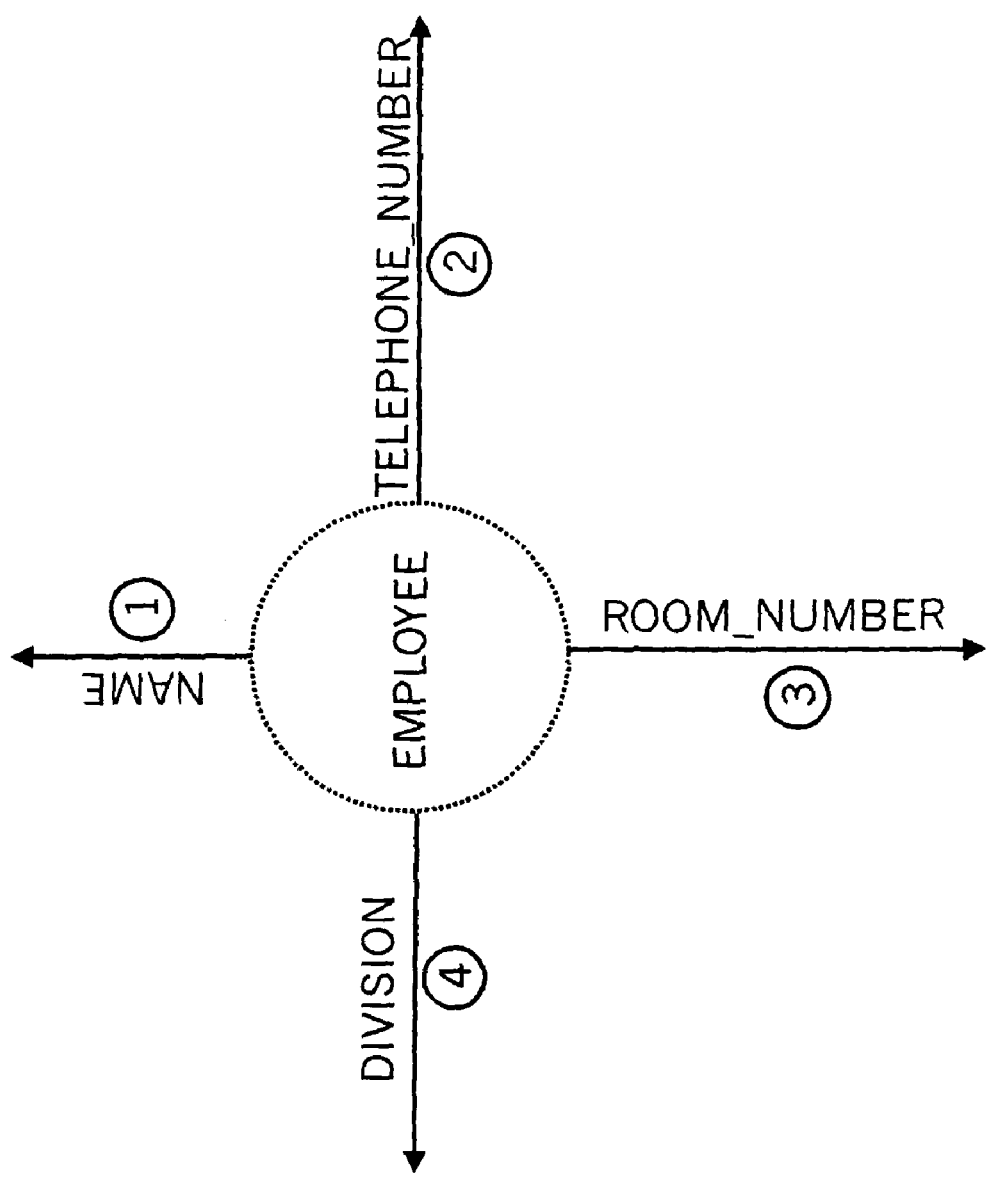
FIG. 18 is an illustration of ontology model corresponding to an eighth example

The underlying ontology is illustrated in FIG. 18. The dotted portions of the ontology in FIG. 18 are additional ontology structure that is transparent to the relational database schema. The unique properties of the ontology are:

TABLE LXXXI

Unique Properties within Ontology for Eighth Example

| Property | Property Index |
|---|---|
| name(Employee) | 1 |

The mapping of the target schema into the ontology is as follows:

TABLE LXXXII

Mapping from Target schema to Ontology for Eighth Example

| schema | Ontology | Property Index |
|---|---|---|
| T | Class: Employee | |
| T.Emp_Name | Property: name(Employee) | 1 |
| T.Emp_Division | Property: division(Employee) | 4 |
| T.Emp_Tel_No | Property: telephone_number(Employee) | 2 |

The mapping of the source schema into the ontology is as follows:

TABLE LXXXIII

Mapping from Source schema to Ontology for Eighth Example

| schema | Ontology | Property Index |
|---|---|---|
| $S_1$ | Class: Employee | |
| $S_1$.Employee_Division | Property: division(Employee) | 4 |
| $S_1$.Employee_Tel# | Property: telephone_number(Employee) | 2 |
| $S_1$.Employee_Name | Property: name(Employee) | 1 |
| $S_1$.Employee_Room# | Property: room_number(Employee) | 3 |
| $S_2$ | Class: Employee | |
| $S_2$.Name | Property: name(Employee) | 1 |
| $S_2$.Employee_Tel | Property: telephone_number(Employee) | 2 |
| $S_2$.Division | Property: division(Employee) | 4 |

The indices of the source properties are:

TABLE LXXXIV

Source Symbols for Eighth Example

| Table | Source Symbols |
|---|---|
| $S_1$ | $4o1^{-1}$ |
|  | $2o1^{-1}$ |
|  | $3o1^{-1}$ |
| $S_2$ | $2o1^{-1}$ |
|  | $4o1^{-1}$ |

The indices of the target properties, keyed on Emp_Name are:

TABLE LXXXV

Target Symbols for Eighth Example

| Table | Target Symbols | Paths |
|---|---|---|
| T | $4o1^{-1}$ | $(4o1^{-1})$ |
|  | $2o1^{-1}$ | $(2o1^{-1})$ |

Since each of the source tables $S_1$ and $S_2$ suffice to generate the target table T, the desired SQL is a union of a query involving $S_1$ alone and a query involving $S_2$ alone. Specifically, based on the paths given in Table LXXXV, the desired SQL query is:

```
INSERT INTO T(Emp_Name, Emp_Division, Emp_Tel_No)
(SELECT
        S₁.Employee_Name AS Emp_Name,
        S₁.Employee_Division AS Emp_Division,
        S₁.Employee_Tel# AS Emp_Tel_No
FROM
        S₁
UNION
SELECT
        S₂.Employee_Name AS Emp_Name,
        S₂.Employee_Division AS Emp_Division,
        S₂.Employee_Tel# AS Emp_Tel_No
FROM S₂);
```

In general,

Rule 6: When one or more source tables contain source symbols sufficient to generate all of the target symbols, then each such source table must be used alone in an SOL query, and the resultant queries joined. (Note that Rule 6 is consistent with Rule 5.)

When applied to the following sample source data, Tables LXXXVI and LXXXVII the above SQL query produces the target data in Table LXXXVIII.

TABLE LXXXVI

Sample Source Table $S_1$ for Eighth Example

| Employee_Division | Employee_Tel# | Employee_Name | Room# |
|---|---|---|---|
| Engineering | 113 | Richard | 10 |
| SW | 118 | Adrian | 4 |
| Engineering | 105 | David | 10 |

TABLE LXXXVII

Sample Source Table $S_2$ for Eighth Example

| Name | Employee_Tel | Division |
|---|---|---|
| Henry | 117 | SW |
| Robert | 106 | IT |
| William | 119 | PdM |
| Richard | 113 | Engineering |

TABLE LXXXVIII

Sample Target Table T for Eighth Example

| Emp_Name | Emp_Division | Emp_Tel_No |
|---|---|---|
| Tom | Engineering | 113 |
| Adrian | SW | 118 |
| David | Engineering | 105 |
| Henry | SW | 117 |
| Robert | IT | 106 |
| William | PdM | 119 |

A Ninth Example

Data Constraints—Temperature Conversion

In a ninth example, a target table is of the following form:

TABLE LXXXIX

Target Table T for Ninth Example

| City | Temperature |
|---|---|

Two source tables are given as follows:

TABLE XC

Source Table $S_1$ for Ninth Example

| City | Temperature |
|---|---|

TABLE XCI

Source Table $S_2$ for Ninth Example

| City | C. Temperature |
|---|---|

Figure 19:
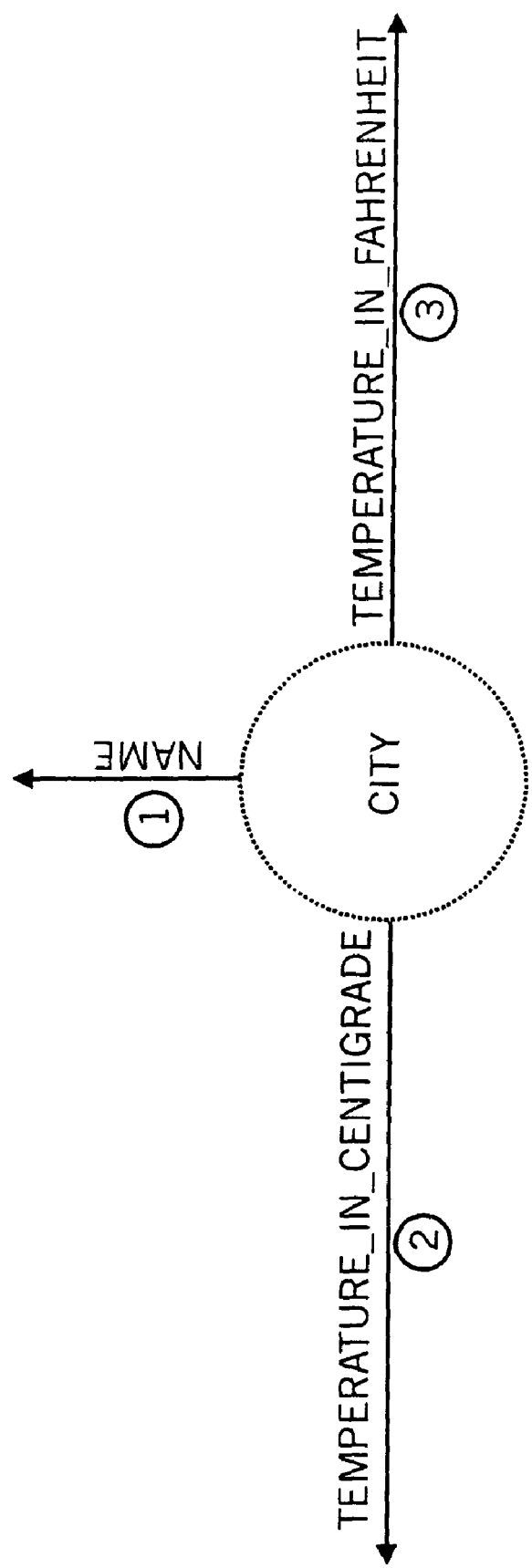
FIG. 19 is an illustration of ontology model corresponding to a ninth example

The underlying ontology is illustrated in FIG. 19. The dotted portions of the ontology in FIG. 19 are additional ontology structure that is transparent to the relational database schema. The properties temperature_in_Centrigade and temperaturein_Fahrenheit are related by the constraint:

$$\text{Temperature\_in\_Centrigade}(City) = 5/9 \times (\text{Temperature\_in\_Fahrenheit}(City) - 32)$$

The unique properties of the ontology are:

TABLE XCII

Unique Properties within Ontology for Ninth Example

| Property | Property Index |
|---|---|
| name(City) | 1 |

The mapping of the target schema into the ontology is as follows:

TABLE XCIII

Mapping from Target schema to Ontology for Ninth Example

| schema | Ontology | Property Index |
|---|---|---|
| T | Class: City | |
| T.City | Property: name(City) | 1 |
| T.Temperature | Property: temperature_in_Centigrade(City) | 2 |

The mapping of the source schema into the ontology is as follows:

TABLE XCIV

Mapping from Source schema to Ontology for Ninth Example

| schema | Ontology | Property Index |
|---|---|---|
| $S_1$ | Class: City | |
| $S_1$.City | Property: name(City) | 1 |
| $S_1$.Temperature | Property: temperature_in_Fahrenheit(City) | 3 |
| $S_2$ | Class: City | |
| $S_2$.City | Property: name(City) | 1 |
| $S_2$.C_Temperature | Property: temperature_in_Centrigade (City) | 2 |

The indices of the source properties are:

TABLE XCV

Source Symbols for Ninth Example

| Table | Source Symbols |
|---|---|
| $S_1$ | $3o1^{-1}$ |
| $S_2$ | $2o1^{-1}$ |

The indices of the target properties, keyed on City are:

TABLE XCVI

Target Symbols for Ninth Example

| Table | Target Symbols | Paths |
|---|---|---|
| T | $2o1^{-1}$ | $5/9 * ((3o1^{-1}) - 32) (2o1^{-1})$ |

Since each of the source tables $S_1$ and $S_2$ suffice to generate the target table T, the desired SQL is a union of a query involving $S_1$ alone and a query involving $S_2$ alone. Specifically, based on the paths given in Table XCVI, the desired SQL query is:

INSERT INTO T(City, Temperature)
(SELECT
    $S_1$.City AS City,
    5/9 * ($S_1$.Temperature − 32) AS Temperature
FROM
    $S_1$
UNION
SELECT
    $S_2$.City AS City, $S_2$.Temperature AS Temperature
FROM
    $S_2$);

In general,

Rule 7: When a target symbol can be expressed in terms of one or more source symbols by a dependency constraint, then such constraint must appear in the list of target symbols.

When applied to the following sample source data, Tables XCVII and XCVII, the above SQL query produces the target data in Table XCIX.

TABLE XCVII

Sample Source Table $S_1$ for Ninth Example

| City | Temperature |
|---|---|
| New York | 78 |
| Phoenix | 92 |
| Anchorage | 36 |
| Boston | 72 |

TABLE XCVIII

Sample Source Table $S_2$ for Ninth Example

| City | C_Temperature |
|---|---|
| Moscow | 12 |
| Brussels | 23 |
| Tel Aviv | 32 |
| London | 16 |

TABLE XCIX

Sample Target Table T for Ninth Example

| City | Temperature |
|---|---|
| New York | 25.5 |
| Phoenix | 33.3 |
| Anchorage | 2.22 |
| Boston | 22.2 |
| Moscow | 12 |
| Brussels | 23 |
| Tel Aviv | 32 |
| London | 16 |

A Tenth Example

Data Constraints—Pricing

In a tenth example, a target table is of the following form:

TABLE C

| Target Table T for Tenth Example | |
|---|---|
| Product | Price |

Two source tables are given as follows:

TABLE CI

| Source Table $S_1$ for Tenth Example | |
|---|---|
| SKU | Cost |

TABLE CII

| Source Table $S_2$ for Tenth Example | |
|---|---|
| Item | Margin |

Figure 20:
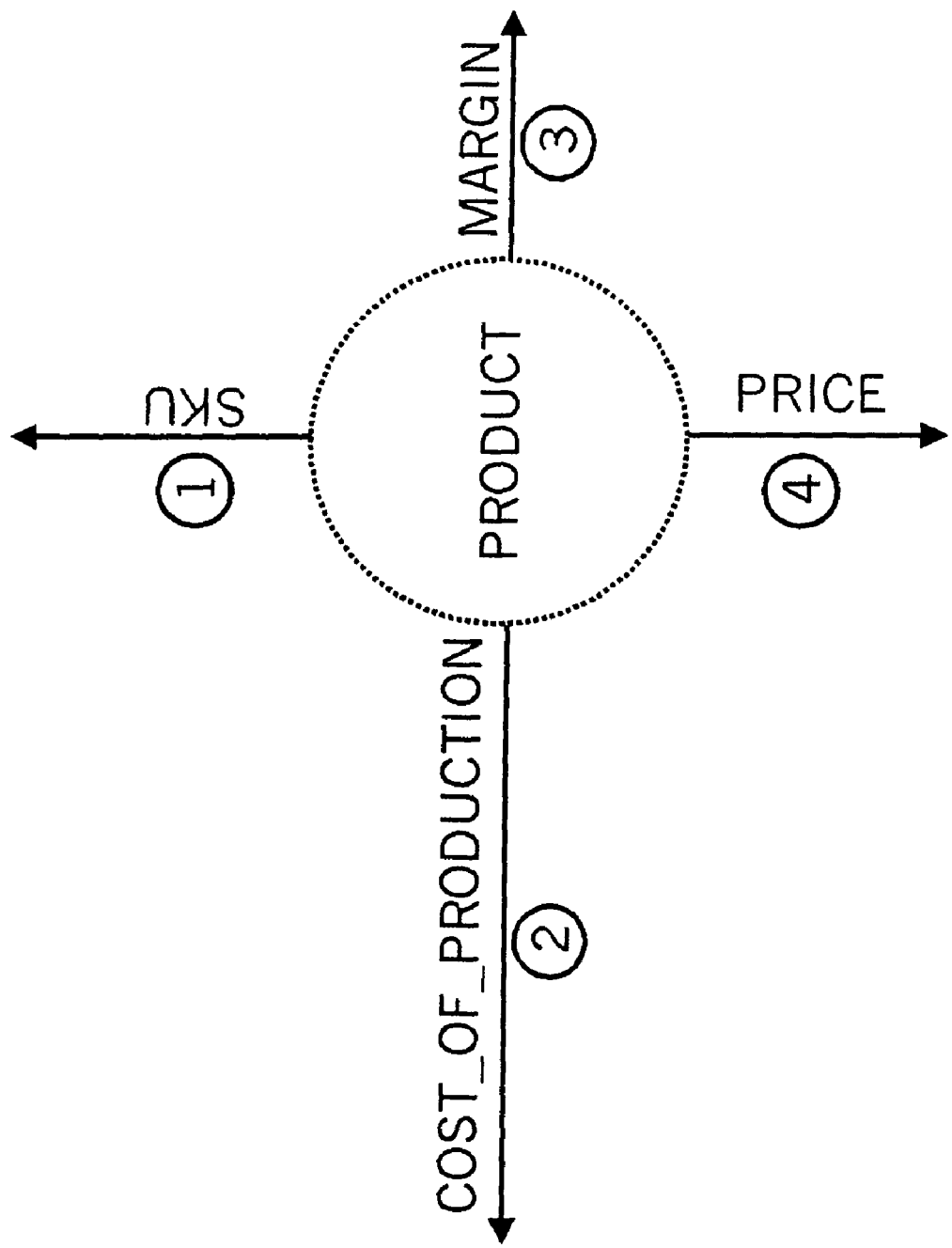
FIG. 20 is an illustration of ontology model corresponding to a tenth example.

The underlying ontology is illustrated in FIG. 20. The dotted portions of the ontology in FIG. 20 are additional ontology structure that is transparent to the relational database schema. The properties price, cost_of_production and margin are related by the constraint:

price(Product)=cost_of_production(Product)¤margin(Product).

The unique properties of the ontology are:

TABLE CIII

| Unique Properties within Ontology for Tenth Example | |
|---|---|
| Property | Property Index |
| SKU(product) | 1 |

The mapping of the target schema into the ontology is as follows:

TABLE CIV

| Mapping from Target schema to Ontology for Tenth Example | | |
|---|---|---|
| schema | Ontology | Property Index |
| T | Class: Product | |
| T.Product | Property: SKU(Product) | 1 |
| T.Price | Property: price(Product) | 4 |

The mapping of the source schema into the ontology is as follows:

TABLE CV

| Mapping from Source schema to Ontology for Tenth Example | | |
|---|---|---|
| schema | Ontology | Property Index |
| $S_1$ | Class: Product | |
| $S_1$.SKU | Property: SKU(Product) | 1 |
| $S_1$.Cost | Property: cost_of_production(Product) | 2 |
| $S_2$ | Class: Product | |
| $S_2$.Item | Property: SKU(Product) | 1 |
| $S_2$.Margin | Property: margin(Product) | 3 |

The indices of the source properties are:

TABLE CVI

| Source Symbols for Tenth Example | |
|---|---|
| Table | Source Symbols |
| $S_1$ | $2o1^{-1}$ |
| $S_2$ | $3o1^{-1}$ |

The indices of the target properties, keyed on Product are:

TABLE CVII

| Target Symbols for Tenth Example | | |
|---|---|---|
| Table | Target Symbols | Paths |
| T | $4o1^{-1}$ | $(2o1^{-1}) * (3o1^{-1})$ |

Based on the paths given in Table CVII, the desired SQL query

```
INSERT INTO T(Product, Price)
(SELECT
    S1.SKU AS Product, (S1.Cost) * (S2.Margin) AS Price
FROM
    S1, S2
WHERE
    S2.Item = S1.SKU);
```

When applied to the following sample source data, Tables CVIII CVIX, the above SQL query produces the target data in Table CX

TABLE CVIII

| Sample Source Table $S_1$ for Tenth Example | |
|---|---|
| SKU | Cost |
| 123 | 2.2 |
| 234 | 3.3 |
| 345 | 4.4 |
| 456 | 5.5 |

TABLE CIX

Sample Source Table $S_2$ for Tenth Example

| Item | Margin |
|------|--------|
| 123 | 1.2 |
| 234 | 1.1 |
| 345 | 1.04 |
| 456 | 1.3 |

TABLE CX

Sample Target Table T for Tenth Example

| Product | Price |
|---------|-------|
| 123 | 2.86 |
| 234 | 3.96 |
| 345 | 4.84 |
| 456 | 5.72 |

An Eleventh Example

Data Constraints—String Concatenation

In an eleventh example, a target table is of the following form:

TABLE CXI

Target Table T for Eleventh Example

| ID# | Full_Name |
|-----|-----------|

One source table is given as follows:

TABLE CXII

Source Table S for Eleventh Example

| ID# | First_Name | Last_Name |
|-----|------------|-----------|

Figure 21:
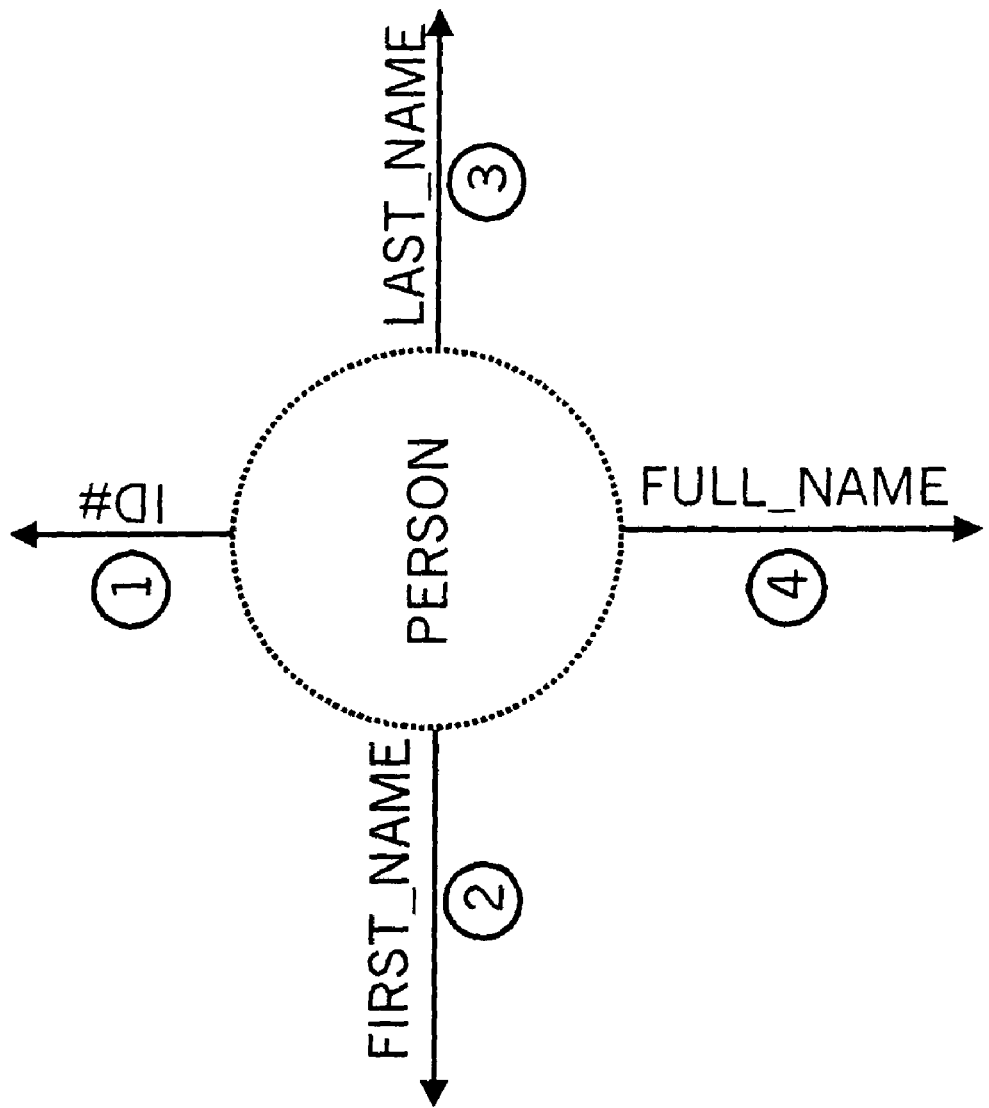
FIG. 21 is an illustration of ontology model corresponding to an eleventh example.

The underlying ontology is illustrated in FIG. 21. The dotted portions of the ontology in FIG. 21 are additional ontology structure that is transparent to the relational database schema. The properties full_name, first_name and last_name are related by the constraint:

full_name(Person)=first_name(Person)||last_name(Person), where || denotes string concatenation.

The unique properties of the ontology are:

TABLE CXIII

Unique Properties within Ontology for Eleventh Example

| Property | Property Index |
|----------|----------------|
| ID#(Product) | 1 |

The mapping of the target schema into the ontology is as follows:

TABLE CXIV

Mapping from Target schema to Ontology for Eleventh Example

| schema | Ontology | Property Index |
|--------|----------|----------------|
| T | Class: Person | |
| T.ID# | Property: ID#(Person) | 1 |
| T.Full_Name | Property: full_name(Person) | 4 |

The mapping of the source schema into the ontology is as follows:

TABLE CXV

Mapping from Source schema to Ontology for Eleventh Example

| schema | Ontology | Property Index |
|--------|----------|----------------|
| S | Class: Person | |
| S.ID# | Property: ID#(Person) | 1 |
| S.First_Name | Property: first_name(Person) | 2 |
| S.Last_Name | Property: last_name(Person) | 3 |

The indices of the source properties are:

TABLE CXVI

Source Symbols for Eleventh Example

| Table | Source Symbols |
|-------|----------------|
| S | $2o1^{-1}$ |
|   | $2o1^{-1}$ |

The indices of the target properties, keyed on ID# are:

TABLE CXVII

Target Symbols for Eleventh Example

| Table | Target Symbols | Paths |
|-------|----------------|-------|
| T | $4o1^{-1}$ | $(2o1^{-1}) \| \| (3o1^{-1})$ |

Based on the paths given in Table CXVII, the desired SQL query is:

```
INSERT INTO T(ID#, Full_Name)
(SELECT
    S.ID# AS ID#,
    (S.First_Name)|| (S.Last_Name) AS Full_Name
FROM
    S);
```

When applied to the following sample source data, Table CXVIII, the above SQL query produces the target data in Table CXIX.

TABLE CXVIII

Sample Source Table S for Eleventh Example

| ID# | First_Name | Last_Name |
|-----|------------|-----------|
| 123 | Timothy | Smith |
| 234 | Janet | Ferguson |

TABLE CXVIII-continued

Sample Source Table S for Eleventh Example

| ID# | First_Name | Last_Name |
|---|---|---|
| 345 | Ronald | Thompson |
| 456 | Marie | Baker |
| 567 | Adrian | Clark |

TABLE CXIX

Sample Target Table T for Eleventh Example

| ID# | Full_Name |
|---|---|
| 123 | Timothy Smith |
| 234 | Janet Ferguson |
| 345 | Ronald Thompson |
| 456 | Marie Baker |
| 567 | Adrian Clark |

As illustrated in the ninth, tenth and eleventh examples above, the present invention allows for dependency constraints, also referred to as "business rules," to exist among properties of a class. Correspondingly a target table column may be expressible as a function of one or more source table columns. In such a case, the target symbol is generally expressed as a function of composites of source symbols. From a broader perspective, since functional composition itself is a function of properties, constraints can be considered as another type of function of properties, and the expression of a target symbol in terms of source symbols is just a function of the source symbols.

Preferably, dependency constraints express dependencies between class properties that are representations. Such constraints involve fundamental data types. Such constraints include arithmetic dependencies among numeric data, string dependencies among character string data, and look-up tables. For example, constraints can be used to convert between one date format and another, such as between a format like 22/01/2002 and a format like Tues., Jan. 22, 2002; and to convert between color spaces, such as between RGB and HSL. In general, a constraint includes any programming method that accepts one or more fundamental data types as input, processes them and produces one or more fundamental data type as output.

In an alternate embodiment of the present invention, dependency constraints can be incorporated within mappings directly. That is, a given table column may be mapped to a function of properties, rather than to a single property or to a composition of properties. For example, rather than have temperature_in_Centigrade be a property of the class City in FIG. 19, the mapping in Table XCIII may map T.Temperature to $5/9¤(\text{Temperature\_in\_Fahrenheit}-32)$.

An advantage of treating dependency constraints within mappings themselves, is that this treatment generally avoids proliferation of dependent properties within the ontology model itself, such as many dependent properties for a date, each corresponding to a different date format.

In addition to dependency constraints, business rules allow for:

Two properties to be declared equivalent. For example, the properties city(Address) and town(Address) can be declared equivalent, meaning that they have identical values for every instance of the class Address. More generally, a property may be declared equivalent to a composition of properties. For example, the property grandfather(Person) may be declared equivalent to father(father(Person)).

A property may be declared to be unique, meaning that no two distinct instances of a class have the same value of such property. For example, a person's social security number may be declared a unique property of a class Person.

A property may be declared to be required, meaning that a description of an instance of a class is not valid unless such property is specified.

Dependency constraints and equivalences may relate properties of different classes.

Test instances as described hereinabove, are useful for validating an ontology model. In a preferred embodiment of the present invention, when a test instance is created or edited, a validation is performed for consistency vis a vis the properties entered by a user or generated automatically, and the business rules. For example, such validation will determine if a person's first name is inconsistent with his full name.

A Twelfth Example

Books→Documents

A source XML schema for books is given by:

```
<?xml version="1.0" encoding="UTF-8"?>
<xs:schema xmlns:xs="http://www.w3.org/2001/XMLschema">
<xs:element name="book" type="Book"/>
<xs:complexType name="Book">
  <xs:sequence>
    <xs:element name="name" type="xs:string"/>
    <xs:element name="author" type="Author"/>
  </xs:sequence>
</xs:complexType>
<xs:complexType name="Author">
  <xs:attribute name="name"/>
</xs:complexType>
</xs:schema>
```

A target XML schema for documents is given by:

```
<?xml version="1.0" encoding="UTF-8"?>
<xs:schema xmlns:xs="http://www.w3.org/2001/XMLschema">
<xs:element name="document" type="Document"/>
<xs:complexType name="Document">
  <xs:all>
    <xs:element name="writer" type="xs:string"/>
  </xs:all>
  <xs:attribute name="title"/>
</xs:complexType>
</xs:schema>
```

Figure 22:
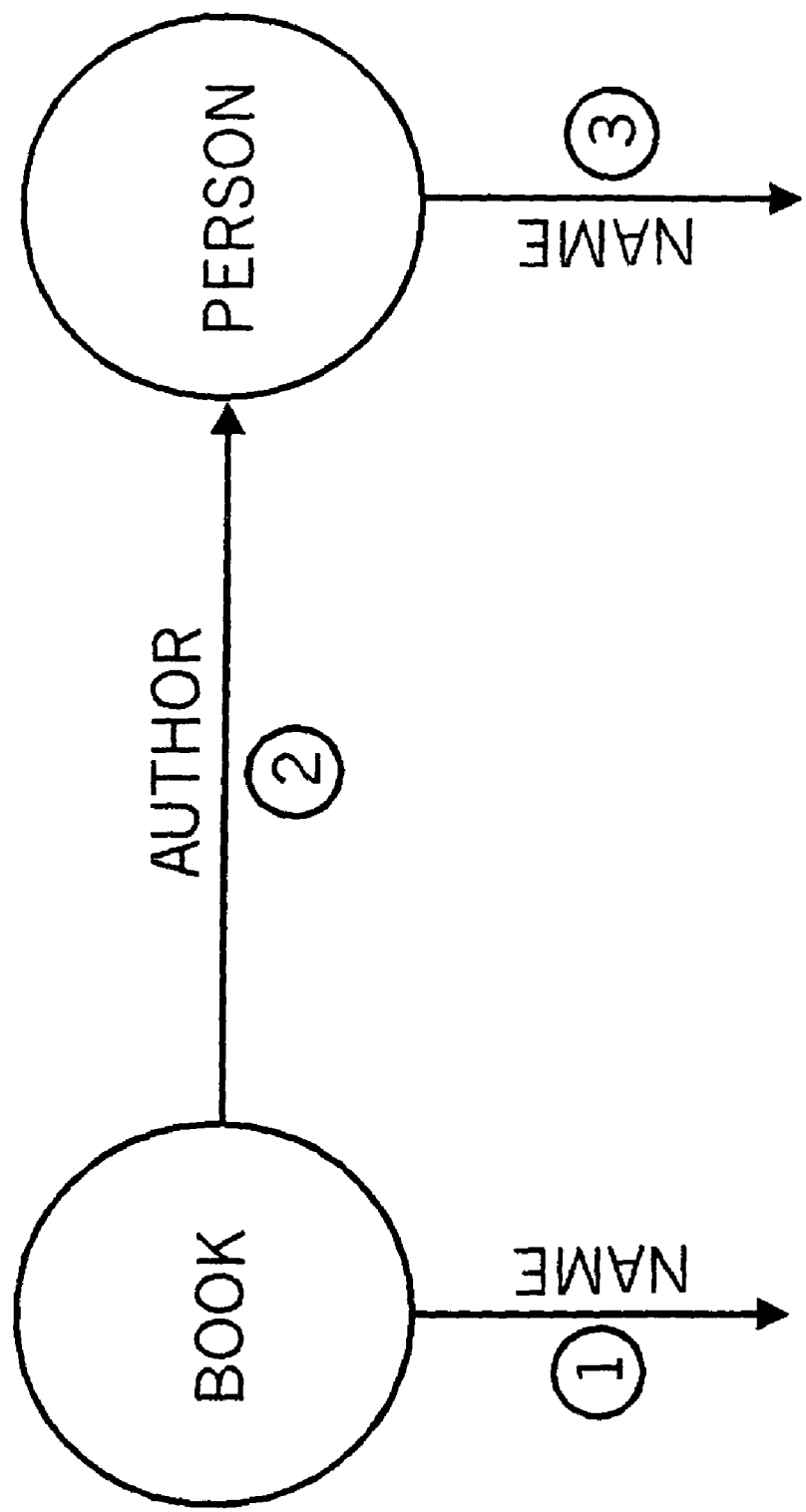
FIG. 22 is an illustration of ontology model corresponding to a twelfth and seventeenth example.

A common ontology model for the source and target XML schema is illustrated in FIG. 22. A mapping of the source XML schema into the ontology model is given by:

TABLE CXX

Mapping from Source schema to Ontology for Twelfth and Thirteenth Examples

| schema | Ontology | Property Index |
|---|---|---|
| complexType: book | Class: Book | |
| element: book/name/text( ) | Property: name(Book) | 1 |
| element: book/author | Property: author(Book) | 2 |

TABLE CXX-continued

Mapping from Source schema to Ontology for
Twelfth and Thirteenth Examples

| schema | Ontology | Property Index |
|---|---|---|
| complexType: author | Class: Person | |
| element: author/@name | Property: name(Person) | 3 |

A mapping of the target XML schema into the ontology model is given by:

TABLE CXXI

Mapping from Target schema to Ontology for Twelfth Example

| schema | Ontology | Property Index |
|---|---|---|
| complexType: document | Class: Book | |
| element: document/writer/text( ) | Property: name(author(Book)) | 3o2 |
| attribute: document/@title | Property: name(Book) | 1 |

Tables CXX and CXXI use XPath notation to designate XSL elements and attributes.

Based on Tables CXX and CXXI, an XSLT transformation that maps XML documents that conform to the source schema to corresponding documents that conform to the target schema should accomplish the following tasks:
1. document/@title←(book/name/text( )
2. document/writer/text( )←book/author/@name
Such a transformation is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
  <document>
    <xsl:for-each select=".//book[position( ) = 1]">
      <xsl:attribute name="title">
        <xsl:value-of select="name( )"/>
      </xsl:attribute>
      <xsl:element name="writer">
        <xsl:value-of select="author/@name" />
      <xsl:element>
    </xsl:for-each>
  </document>
</xsl:template>
<xsl:stylesheet>
```

A Thirteenth Example

Books→Documents

A source XML schema for books is given by:

```
<?xml version="1.0" encoding="UTF-8"?>
<xs:schema xmlns:xs="http://www.w3.org/2001/XMLschema">
<xs:element name="book" type="Book"/>
<xs:complexType name="Book">
  <xs:sequence>
    <xs:element name="name" type="xs:string"/>
    <xs:element name="author" type="Author" minOccurs="0" maxOccurs="unbounded"/>
  </xs:sequence>
```

```
</xs:complexType>
<xs:complexType name="Author">
  <xs:attribute name="name"/>
</xs:complexType>
</xs:schema>
```

A target XML schema for documents is given by:

```
<?xml version="1.0" encoding="UTF-8"?>
<xs:schema xmlns:xs="http://www.w3.org/2001/XMLschema">
<xs:element name="document" type="Document"/>
<xs:complexType name="Document">
  <xs:choice>
    <xs:element name="writer" type="xs:string" minOccurs="1" maxOccurs="unbounded"/>
    <xs:element name="title" type="xs:string"/>
    <xs:element name="ISBN" type="xs:string" />
  </xs:choice>
</xs:complexType>
</xs:schema>
```

Figure 23:
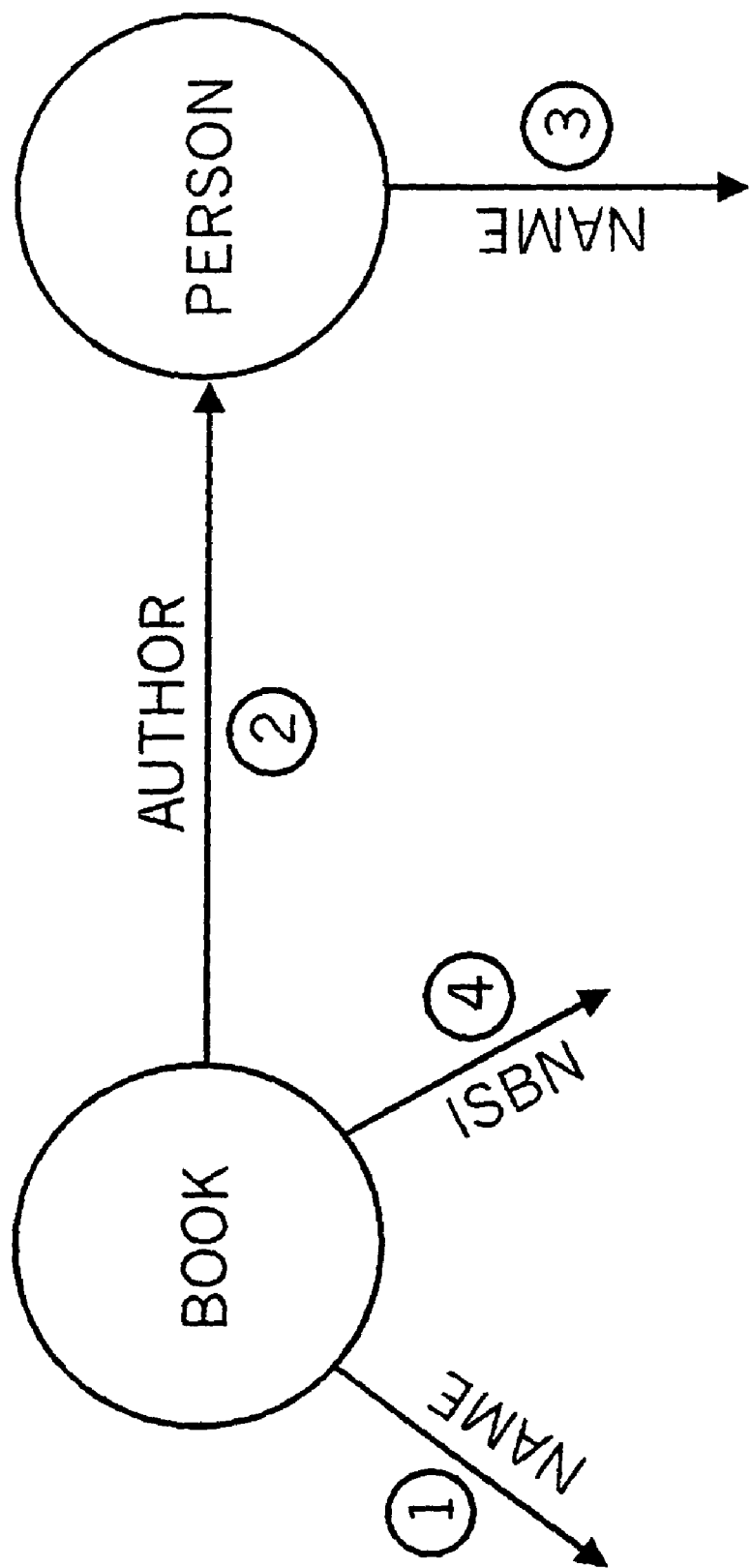
FIG. 23 is an illustration of ontology model corresponding to a thirteenth example

A common ontology model for the source and target XML schema is illustrated in FIG. 23. A mapping of the source XML schema into the ontology model is given by Table CXVIII above. A mapping of the target XML schema into the ontology model is given by:

TABLE CXXII

Mapping from Target schema to Ontology for Thirteenth Example

| schema | Ontology | Property Index |
|---|---|---|
| complexType: document | Class: Book | |
| element: document/writer/text( ) | Property: name(author(Book)) | 3o2 |
| element: document/title/text( ) | Property: name(Book) | 1 |
| element: document/ISBN/text( ) | Property: ISBN(Book) | 4 |

Based on Tables CXX and CXXI, an XSLT transformation that maps XML documents that conform to the source schema to corresponding documents that conform to the target schema should accomplish the following tasks:

1. document/title/text( )←book/name/text( )

2. document/writer/text( )←book/author/@name

Such a transformation is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
  <document>
    <xsl:apply-templates select="book" />
  </document>
</xsl:template>
<xsl:template match="book">
  <xsl:choose>
    <xsl:when test="author">
      <xsl:for-each select="author">
        <xsl:element name="writer">
          <xsl:value-of select="@name"/>
        </xsl:element>
      </xsl:for-each>
    </xsl:when>
```

A Fourteenth Example

Document Storage

A source XML schema for books is given by:

```
<?xml version="1.0" encoding="UTF-8"?>
<xs:schema xmlns:xs="http://www.w3.org/2001/XMLschema">
<xs:element name="library" type="Library"/>
<xs:complexType name="Library">
    <xs:sequence>
        <xs:element name="source" type="Source" minOccurs="0"
            maxOccurs="unbounded"/>
    </xs:sequence>
</xs:complexType>
<xs:complexType name="Source">
    <xs:sequence>
        <xs:element name="review" type="Review" minOccurs="0"
            maxOccurs="unbounded"/>
        <xs:element name="article" type="Article" minOccurs="0"
            maxOccurs="unbounded"/>
        <xs:element name="letter" type="Letter" minOccurs="0"
            maxOccurs="unbounded"/>
    </xs:sequence>
</xs:complexType>
<xs:complexType name="Review">
    <xs:sequence>
        <xs:element name="author" type="xs:string" minOccurs="0"
            maxOccurs="unbounded"/>
    </xs:sequence>
    <xs:attribute name="title"/>
</xs:complexType>
<xs:complexType name="Article">
    <xs:sequence>
        <xs:element name="writer" type="xs:string" minOccurs="0"
            maxOccurs="unbounded"/>
    </xs:sequence>
    <xs:attribute name="name"/>
</xs:complexType>
<xs:complexType name="Letter">
    <xs:sequence>
        <xs:element name="sender" type="xs:string" minOccurs="0"
            maxOccurs="unbounded"/>
    </xs:sequence>
    <xs:attribute name="name"/>
    <xs:attribute name="subject"/>
    <xs:attribute name="receiver"/>
</xs:complexType>
</xs:schema>
```

A first target XML schema for documents is given by:

```
<?xml version="1.0" encoding="UTF-8"?>
<xs:schema xmlns:xs="http://www.w3.org/2001/XMLschema">
<xs:element name="storage" type="Storage"/>
<xs:complexType name="Storage"/>
    <xs:sequence>
        <xs:element name="articles" type="Documents"/>
        <xs:element name="reviews" type="Documents"/>
        <xs:element name="letters" type="Letters"/>
    </xs:sequence>
</xs:complexType>
<xs:complexType name="Documents">
    <xs:sequence>
        <xs:element name="document" type="Document"
            minOccurs="0"          maxOccurs="unbounded"/>
    </xs:sequence>
</xs:complexType>
<xs:complexType name="Letters">
    <xs:sequence>
        <xs:element name="letter" type="Letter" minOccurs="0"
            maxOccurs="unbounded"/>
    </xs:sequence>
</xs:complexType>
<xs:complexType name="Document">
    <xs:sequence>
        <xs:element name="author" type="xs:string" minOccurs="0"
            maxOccurs="unbounded"/>
    </xs:sequence>
    <xs:attribute name="title"/>
</xs:complexType>
<xs:complexType name="Letter">
    <xs:sequence>
        <xs:element name="author" type="xs:string" minOccurs="0"
            maxOccurs="unbounded"/>
    </xs:sequence>
    <xs:attribute name="name"/>
    <xs:attribute name="subject"/>
    <xs:attribute name="receiver"/>
</xs:complexType>
</xs:schema>
```

Figure 24:
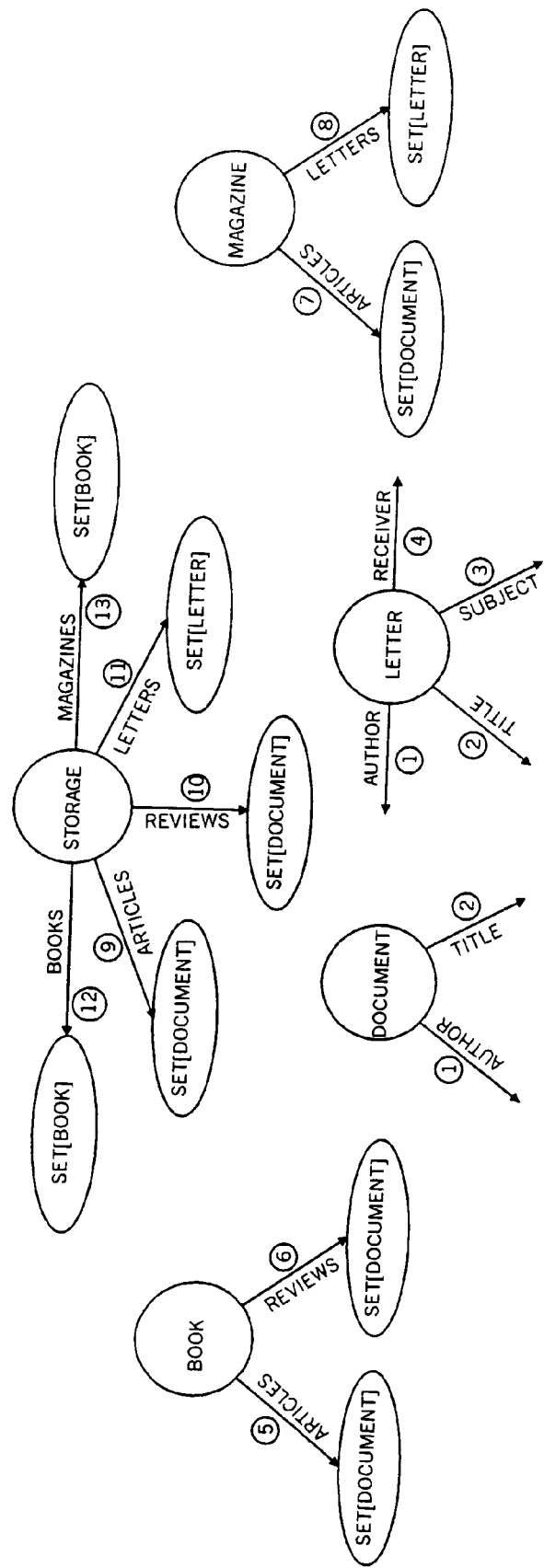
FIG. 24 is an illustration of ontology model corresponding to a fourteenth example

A common ontology model for the source and first target XML schema is illustrated in FIG. 24. A mapping of the source XML schema into the ontology model is given by:

TABLE CXXIII

Mapping from Source schema to Ontology for Fourteenth Example

| schema | Ontology | Property Index |
|---|---|---|
| complexType: review | Class: Document | |
| element: review/author/text( ) | Property: author(Document) | 1 |
| attribute: review/@title | Property: title(Document) | 2 |
| complexType: article | Class: Document | |
| element: article/writer/text( ) | Property: author(Document) | 1 |
| attribute: article/@name | Property: title(Document) | 2 |
| complexType: letter | Class: Letter(inherits from Document) | |
| element: letter/sender/text( ) | Property: author(Letter) | 1 |
| attribute: letter/@name | Property: title(Letter) | 2 |
| attribute: letter/@subject | Property: subject(Letter) | 3 |
| attribute: letter/@receiver | Property: receiver(Letter) | 4 |
| complexType: source | Class: Storage | |
| ComplexType: library | Container Class: set[Storage] | |

A mapping of the first target XML schema into the ontology model is given by:

TABLE CXXIV

Mapping from First Target schema to Ontology for Fourteenth Example

| schema | Ontology | Property Index |
|---|---|---|
| complexType: document | Class: Document | |
| element: document/author/text( ) | Property: author(Document) | 1 |
| attribute: document/@title | Property: title(Document) | 2 |
| complexType: letter | Class: Letter(inherits from Document) | |
| element: letter/author/text( ) | Property: author(Letter) | 1 |
| attribute: letter/@name | Property: title(Letter) | 2 |
| attribute: letter/@subject | Property: subject(Letter) | 3 |

TABLE CXXIV-continued

Mapping from First Target schema to Ontology for Fourteenth Example

| schema | Ontology | Property Index |
|---|---|---|
| attribute: letter/@receiver | Property: receiver(Letter) | 4 |
| complexType: storage | Class: Storage | |
| element: storage/articles | Property: articles(Storage) | 9 |
| element: storage/reviews | Property: reviews(Storage) | 10 |
| element: storage/letters | Property: letters(Storage) | 11 |

Based on Tables CXXIII and CXXIV, an XSLT transformation that maps XML documents that conform to the source schema to corresponding documents that conform to the target schema should accomplish the following tasks:

1. storage←library
2. letter/author/text( )←letter/sender/text( )

Such a transformation is given by:

```
<?xml version="1.0" encoding="UTF-8"?>
<xsl:stylesheet version="1.0" xmlns:xsl="http://www.w3.org/1999/XSL/Transform">
<xsl:template match="/">
<xsl:apply-templates select="/library"/>
</xsl:template>
<xsl:template match="/library">
  <storage>
    <articles>
      <xsl:apply-templates select="source[not(letter)]/article|source[not(review)]/article"/>
    </articles>
    <reviews>
      <xsl:apply-templates select="source[not(letter)]/review"/>
    </reviews>
    <letters>
      <xsl:apply-templates select="source[not(review)]/letter"/>
    </letters>
  </storage>
</xsl:template>
<xsl:template match="article">
  <article>
    <xsl:attribute name="title"><xsl:value-of select="@name"/>
    </xsl:attribute>
    <xsl:apply-templates select="writer"/>
  </article>
</xsl:template>
<xsl:template match="review">
  <review>
    <xsl:attribute name="title"><xsl:value-of select="@title"/>
    </xsl:attribute>
    <xsl:apply-templates select="author"/>
  </review>
</xsl:template>
<xsl:template match="letter">
  <review>
    <xsl:attribute name="name"><xsl:value-of select="@name"/>
    </xsl:attribute>
    <xsl:attribute name="subject"><xsl:value-of select="@subject"/>
    </xsl:attribute>
    <xsl:attribute name="receiver"><xsl:value-of select="@receiver"/>
    </xsl:attribute>
    <xsl:apply-templates select="sender"/>
  </review>
</xsl:template>
<xsl:template match="article/writer|review/author|letter/sender">
  <author>
    <xsl:value-of select="text( )"/>
  </author>
</xsl:template>
</xsl:stylesheet>
```

A second target XML schema for documents is given by:

```
<?xml version="1.0" encoding="UTF-8"?>
<xs:schema xmlns:xs="http://www.w3.org/2001/XMLschema">
<xs:element name="storage" type="Storage"/>
<xs:complexType name="Storage">
    <xs:sequence>
        <xs:element name="books" type="Books"/>
        <xs:element name="magazines" type="Magazines"/>
    </xs:sequence>
</xs:complexType>
<xs:complexType name="Books">
    <xs:sequence>
        <xs:element name="articles" type="Documents"/>
        <xs:element name="reviews" type="Documents"/>
    </xs:sequence>
</xs:complexType>
<xs:complexType name="Magazines">
    <xs:sequence>
        <xs:element name="articles" type="Documents"/>
        <xs:element name="letters" type="Letters"/>
    </xs:sequence>
</xs:complexType>
<xs:complexType name="Documents">
    <xs:sequence>
        <xs:element name="document" type="Document" minOccurs="0" maxOccurs="unbounded"/>
    </xs:sequence>
</xs:complexType>
<xs:complexType name="Letters">
    <xs:sequence>
        <xs:element name="letter" type="Letter" minOccurs="0" maxOccurs="unbounded"/>
    </xs:sequence>
</xs:complexType>
<xs:complexType name="Document">
    <xs:sequence>
        <xs:element name="author" type="xs:string" minOccurs="0" maxOccurs="unbounded"/>
    </xs:sequence>
    <xs:attribute name="title"/>
</xs:complexType>
<xs:complexType name="Letter">
<xs:sequence>
    <xs:element name="author" type="xs:string" minOccurs="0" maxOccurs="unbounded"/>
    </xs:sequence>
    <xs:attribute name="name"/>
    <xs:attribute name="subject"/>
    <xs:attribute name="receiver"/>
</xs:complexType>
</xs:schema>
```

A mapping of the second target XML schema into the ontology model is given by:

TABLE CXXV

Mapping from Second Target schema to Ontology for Fourteenth Example

| schema | Ontology | Property Index |
|---|---|---|
| complexType: document | Class: Document | |
| element: document/author/text( ) | Property: author(Document) | 1 |
| attribute: document/@title | Property: title(Document) | 2 |
| complexType: letter | Class: Letter(inherits from Document) | |
| element: letter/author/text( ) | Property: author(Letter) | 1 |
| attribute: letter/@name | Property: title(Letter) | 2 |
| attribute: letter/@subject | Property: subject(Letter) | 3 |
| attribute: letter/@receiver | Property: receiver(Letter) | 4 |
| complexType: storage | Class: Storage | |
| element: storage/books | Property: books(Storage) | 12 |
| element: storage/magazines | Property: magazines(Storage) | 13 |

TABLE CXXV-continued

Mapping from Second Target schema to Ontology for Fourteenth Example

| schema | Ontology | Property Index |
|---|---|---|
| complexType: book | Class: Book | |
| element: book/articles | Property: articles(Book) | 5 |
| element: book/reviews | Property: reviews(Book) | 6 |
| complexType: magazine | Class: Magazine | |
| element: magazine/articles | Property: articles(Magazine) | 7 |
| element: magazine/letters | Property: letters(Magazine) | 8 |

Based on Tables CXXIII and CXXV, an XSLT transformation that maps XML documents that conform to the source schema to corresponding documents that conform to the target schema should accomplish the following tasks:

1. storage←library 2. letter/author/text( )←letter/sender/text( )

Such a transformation is given by:

```
<?xml version="1.0" encoding="UTF-8"?>
<xsl:stylesheet version="1.0" xmlns:xsl="http://www.w3.org/1999/XSL/Transform">
<xsl:template match="/">
<xsl:apply-templates select="/library"/>
</xsl:template>
<xsl:template match="/library">
<storage>
    <books>
        <articles>
            <xsl:apply-templates select="source[not(letter)]/article"/>
        </articles>
        <reviews>
            <xsl:apply-templates select="source[not(letter)]/review"/>
        </reviews>
    </books>
    <magazines>
        <articles>
            <xsl:apply-templates select="source[not(review)]/article"/>
        </articles>
        <letters>
            <xsl:apply-templates select="source[not(review)]/letter"/>
        </letters>
    </magazines>
</storage>
</xsl:template>
<xsl:template match="article">
<article>
    <xsl:attribute name="title"><xsl:value-of select="@name"/></xsl:attribute>
    <xsl:apply-templates select="writer"/>
</article>
</xsl:template>
<xsl:template match="review">
<review>
    <xsl:attribute name="title"><xsl:value-of select="@title"/></xsl:attribute>
    <xsl:apply-templates select="author"/>
</review>
</xsl:template>
<xsl:template match="letter">
<review>
    <xsl:attribute name="name"><xsl:value-of select="@name"/></xsl:attribute>
    <xsl:attribute name="subject"><xsl:value-of select="@subject"/></xsl:attribute>
    <xsl:attribute name="receiver"><xsl:value-of select="@receiver"/></xsl:attribute>
    <xsl:apply-templates select="sender"/>
</review>
</xsl:template>
<xsl:template match="article/writer | review/author | letter/sender">
<author>
    <xsl:value-of select="text( )"/>
</author>
</xsl:template>
</xsl:stylesheet>
```

A third target XML schema for documents is given by:

```
<?xml version="1.0" encoding="UTF-8"?>
<xs:schema xmlns:xs="http://www.w3.org/2001/XMLschema">
<xs:element name="storage" type="Storage"/>
<xs:complexType name="Storage">
  <xs:sequence>
    <xs:element name="article_from_books" type="AB"
            minOccurs="0"
            maxOccurs="unbounded"/>
    <xs:element name="article_from_magazines" type="AM"
            minOccurs="0"
            maxOccurs="unbounded"/>
  </xs:sequence>
</xs:complexType>
<xs:complexType name="AB">
  <xs:sequence>
    <xs:element name="authors" type="xs:string" minOccurs="0"
            maxOccurs="unbounded"/>
  </xs:sequence>
  <xs:attribute name="title"/>
</xs:complexType>
<xs:complexType name="AM">
  <xs:sequence>
    <xs:element name="writers" type="xs:string" minOccurs="0"
            maxOccurs="unbounded"/>
  </xs:sequence>
  <xs:attribute name="name"/>
</xs:complexType>
</xs:schema>
```

A mapping of the third target XML schema into the ontology model is given by:

TABLE CXXVI

Mapping from Third Target schema to Ontology for Fourteenth Example

| schema | Ontology | Property Index |
|---|---|---|
| complexType: AB | Class: Document | |
| element: AB/author/text( ) | Property: author(Document) | 1 |
| attribute: AB/@title | Property: title(Document) | 2 |
| complexType: AM | Class: Document | |
| element: AM/writer/text( ) | Property: author(Document) | 1 |
| attribute: AM/@title | Property: title(Document) | 2 |
| complexType: storage | Complex Class: set[Document] × set[Document] | |

Based on Tables CXXIII and CXXVI, an XSLT transformation that maps XML documents that conform to the source schema to corresponding documents that conform to the target schema should accomplish the following tasks:

1. storage←library 2. letter/author/text( )←(letter/sender/text( )

Such a transformation is given by:

```
<?xml version="1.0" encoding="UTF-8"?>
<xsl:stylesheet version="1.0" xmlns:xsl="http://www.w3.org/1999/XSL/Transform">
<xsl:template match="/">
  <xsl:apply-templates select="/library"/>
</xsl:template>
<xsl:template match="/library">
<storage>
  <xsl:apply-templates select="source[not(letter)]/article" mode="AB"/>
  <xsl:apply-templates select="source[not(review)]/article" mode="AM"/>
</storage>
</xsl:template>
<xsl:template match="article" mode="AB">
<article_from_books>
  <xsl:attribute name="title"><xsl:value-of select="@name"/></xsl:attribute>
  <xsl:apply-templates select="writer" mode="AB"/>
</article_from_books>
</xsl:template>
<xsl:template match="article" mode="AM">
<article_from_magazines>
  <xsl:attribute name="name"><xsl:value-of select="@name"/></xsl:attribute>
  <xsl:apply-templates select="writer" mode="AM"/>
</article_from_magazines>
</xsl:template>
<xsl:template match="article/writer" mode="AB">
<author>
  <xsl:value-of select="text( )"/>
</author>
</xsl:template>
```

```
<xsl:template match="article/writer" mode="AM">
<writer>
   <xsl:value-of select="text( )"/>
</writer>
</xsl:template>
</xsl:stylesheet>
```

A Fifteenth Example

String Conversion

A source XML schema for people is given by:

```
<?xml version="1.0" encoding="UTF-8"?>
<xs:schema xmlns:xs="http://www.w3.org/2001/XMLschema"
elementFormDefault="qualified"
           attributeFormDefault="unqualified">
<xs:element name="Person" type="Person"/>
<xs:complexType name="Person">
   <xs:sequence>
      <xs:element name="name" type="xs:string"/>
         <!-- name expected input in format firstName#LastName -->
      <xs:element name="ID" type="xs:string"/>
         <!-- ID expected input in format XXXXXXXXX-X -->
      <xs:element name="age" type="xs:string"/>
         <!-- age expected input in exponential form XXXeX -->
   </xs:sequence>
</xs:complexType>
</xs:schema>
```

A target XML schema for people is given by:

```
<?xml version="1.0" encoding="UTF-8"?>
<xs:schema xmlns:xs="http://www.w3.org/2001/XMLschema"
           elementFormDefault="qualified"
           attributeFormDefault="unqualified">
   <xs:element name="Person" type="Person"/>
<xs:complexType name="Person">
   <xs:sequence>
      <xs:element name="name" type="xs:string"/>
         <!-- name expected input in format LastName, FirstName -->
      <xs:element name="ID" type="xs:string"/>
         <!-- ID expected input in format 12XX-XXXXXXXX3E -->
   </xs:sequence>
</xs:complexType>
</xs:schema>
```

An XSLT transformation that maps the source schema into the target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
   <Person>
      <xsl:for-each select="Person">
         <xsl:element name="name">
            <xsl:value-of select=
               "concat(substring-after(name,'#'),',', substring-before(name,'#'))"/>
         </xsl:element>
         <xsl:element name="ID">
            <xsl:variable name="plainID" select=
               "concat(substring-before(ID/text( ),'-'),substring-after(ID/text( ),'-'))"/>
            <xsl:value-of select=
               "concat('12',substring($plainID,1,2),'-',substring($plainID,3),'3E')"/>
         </xsl:element>
         <xsl:element name="age">
            <xsl:call-template name="exponentiate">
               <xsl:with-param name="power" select="substring-after(age,'e')"/>
               <xsl:with-param name="digit" select="substring-before(age,'e')"/>
               <xsl:with-param name="ten" select="1"/>
            </xsl:call-template>
         </xsl:element>
      </xsl:for-each>
   </Person>
</xsl:template>
<xsl:template name="exponentiate">
   <xsl:param name="power"/>
   <xsl:param name="digit"/>
   <xsl:param name="ten"/>
   <xsl:choose>
      <xsl:when test="$power > 0">
         <xsl:call-template name="exponentiate">
            <xsl:with-param name="power" select="$power – 1"/>
            <xsl:with-param name="digit" select="$digit"/>
            <xsl:with-param name="ten" select="$ten * 10"/>
         </xsl:call-template>
      </xsl:when>
      <xsl:when test="$power < 0">
         <xsl:call-template name="exponentiate">
            <xsl:with-param name="power" select="$power + 1"/>
```

```
            <xsl:with-param name="digit" select="$digit"/>
            <xsl:with-param name="ten" select="$ten div 10"/>
        </xsl:call-template>
    </xsl:when>
    <xsl:otherwise>
        <xsl:value-of select="format-number($digit * $ten, ',###.###') "/>
    </xsl:otherwise>
    </xsl:choose>
</xsl:template>
</xsl:stylesheet>
```

A Sixteenth Example

String Conversion

A source XML schema for people is given by:

```
<?xml version="1.0" encoding="UTF-8"?>
<xs:schema xmlns:xs=http://www.w3.org/2001/XMLschema
        elementFormDefault="qualified"
        attributeFormDefault="unqualified">
<xs:element name="Person" type="Person"/>
<xs:complexType name="Person">
    <xs:sequence>
        <xs:element name="name" type="xs:string"/>
        <xs:element name="homeTown" type="xs:string"/>
    </xs:sequence>
    <xs:attribute name="dog_name"/>
</xs:complexType>
</xs:schema>
```

A target XML schema for people is given by:

```
<?xml version="1.0" encoding="UTF-8"?>
<xs:schema xmlns:xs="http://www.w3.org/2001/XMLschema"
        elementFormDefault="qualified"
        attributeFormDefault="unqualified">
<xs:element name="Person" type="Person"/>
<xs:complexType name="Person">
    <xs:sequence>
        <xs:element name="name" type="xs:string"/>
        <xs:element name="homeTown" type="xs:string"/>
    </xs:sequence>
    <xs:attribute name="dog_name"/>
</xs:complexType>
</xs:schema>
```

An XSLT transformation that maps the source schema into the target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <Person>
        <xsl:for-each select="Person">
            <xsl:attribute name="dog">
                <xsl:value-of select="@dog_name"/>
            </xsl:attribute>
            <xsl:element name="name">
                <xsl:value-of select="name/text( )"/>
            </xsl:element>
            <xsl:element name="indexOfcarString_CaseInSensitive">
                <xsl:variable name="case_neutral" select="translate(name,
                    'ABCDEFGHIJKLMNOPQRSTUVWXYZ', 'abcdefghijklmnopqrstuvwxyz')"/>
                <xsl:value-of select= "string-length(substring-before($case_neutral, 'car')) – 1"/>
            </xsl:element>
            <xsl:element name="indexOfcarString_CaseSensitive">
                <xsl:value-of select="string-length(substring-before(name, 'car')) – 1"/>
            </xsl:element>
            <xsl:element name="homeTown">
                <xsl:value-of select="homeTown" />
            </xsl:element>
        </xsl:for-each>
    </Person>
</xsl:template>
</xsl:stylesheet>
```

A Seventeenth Example

Library→Storage

A source XML schema for libraries is given by:

```
<?xml version="1.0" encoding="UTF-8"?>
<xs:schema xmlns:xs="http://www.w3.org/2001/XMLschema">
<xs:element name="library" type="Library"/>
<xs:complexType name="Library">
    <xs:sequence>
        <xs:element name="book" type="Book" minOccurs="0" maxOccurs="unbounded"/>
    </xs:sequence>
</xs:complexType>
<xs:complexType name="Book">
    <xs:sequence>
        <xs:element name="name" type="xs:string"/>
        <xs:element name="author" type="Author" maxOccurs="unbounded"/>
    </xs:sequence>
</xs:complexType>
<xs:complexType name="Author">
    <xs:attribute name="name"/>
</xs:complexType>
</xs:schema>
```

A target XML schema for storage is given by:

```
<?xml version="1.0" encoding="UTF-8"?>
<xs:schema xmlns:xs="http://www.w3.org/2001/XMLschema">
<xs:element name="storage" type="Storage"/>
<xs:complexType name="Storage">
        <xs:sequence>
            <xs:element name="document"
              type="Document" minOccurs="0"
                  maxOccurs="unbounded"/>
        </xs:sequence>
</xs:complexType>
<xs:complexType name="Document">
        <xs:sequence>
            <xs:element name="writer" type="xs:string"
              maxOccurs="unbounded"/>
        </xs:sequence>
        <xs:attribute name="title"/>
</xs:complexType>
</xs:schema>
```

A common ontology model for the source and target XML schema is illustrated in FIG. 22. A mapping of the source XML schema into the ontology model is given by Table CXX, with an additional correspondence between the complexType and the container class set[Book]. A mapping of the target XML schema into the ontology model is given by Table CXXI, with an additional correspondence between the complexType storage and the container class set{Book}.

Based on Tables CXX and CXXI, an XSLT transformation that maps XML documents that conform to the source schema to corresponding documents that conform to the target schema should accomplish the following tasks:
1. document/@title←book/name/text( )
2. document/writer/text( )←book/author/@name
Such a transformation is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
```

```
<xsl:template match="/">
    <storage>
        <xsl:for-each select=".//library">
            <xsl:for-each select="book">
                <document>
                    <xsl:attribute name="title">
                        <xsl:value-of select="name"/>
                    </xsl:attribute>
                    <writer>
                        <xsl:for-each select="author/@name">
                            <xsl:value-of select="."/>
                        </xsl:for-each>
                    </writer>
                </document>
            </xsl:for-each>
        </xsl:for-each>
    </storage>
</xsl:template>
</xsl:stylesheet>
```

An Eighteenth Example

Change Case

A source XML schema for plain text is given by:

```
<?xml version="1.0" encoding="UTF-8"?>
<xs:schema xmlns:xs=http://www.w3.org/2001/XMLschema
elementFormDefault="qualified"
              attributeFormDefault="unqualified">
<xs:element name="Person" type="Person"/>
<xs:complexType name="Person">
    <xs:sequence>
        <xs:element name="name" type="xs:string"/>
        <xs:element name="homeTown" type="xs:string"/>
    </xs:sequence>
</xs:complexType>
</xs:schema>
```

A target XML schema for case sensitive text is given by:

```
<?xml version="1.0" encoding="UTF-8"?>
<xs:schema xmlns:xs="http://www.w3.org/2001/XMLschema"
elementFormDefault="qualified"
                    attributeFormDefault="unqualified">
<xs:element name="Person" type="Person"/>
<xs:complexType name="Person">
    <xs:sequence>
        <xs:element name="name" type="xs:string"/>
        <xs:element name="homeTown" type="xs:string"/>
    </xs:sequence>
</xs:complexType>
</xs:schema>
```

An XSLT transformation that maps the source schema into the target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
  <Person>
    <xsl:for-each select="Person">
      <xsl:element name="low_name">
        <xsl:value-of select="translate(name,
 'ABCDEFGHIJKLMNOPQRSTUVWXYZ',
 'abcdefghijklmnopqrstuvwxyz')"/>
      </xsl:element>
      <xsl:element name="upper_homeTown">
        <xsl:value-of select="translate(homeTown,
 'abcdefghijklmnopqrstuvwxyz',
 'ABCDEFGHIJKLMNOPQRSTUVWXYZ')"/>
      </xsl:element>
    </xsl:for-each>
  </Person>
</xsl:template>
</xsl:stylesheet>
```

An Nineteenth Example

Number Manipulation

A source XML schema for list of numbers is given by:

```
<?xml version="1.0" encoding="UTF-8"?>
<xs:schema xmlns:xs="http://www.w3.org/2001/XMLschema"
elementFormDefault="qualified"
                    attributeFormDefault="unqualified">
<xs:element name="List_o_Numbers" type="NumList"/>
<xs:complexType name="NumList">
    <xs:sequence>
        <xs:element name="first" type="xs:string"/>
        <xs:element name="second" type="xs:float"/>
        <xs:element name="third" type="xs:float"/>
        <xs:element name="fourth" type="xs:float"/>
        <xs:element name="fifth" type="xs:float"/>
        <xs:element name="sixth" type="xs:float"/>
        <xs:element name="seventh" type="xs:float" />
    </xs:sequence>
</xs:complexType>
</xs:schema>
```

A target XML schema for a list of numbers is given by:

```
<?xml version="1.0" encoding="UTF-8"?>
<xs:schema xmlns:xs="http://www.w3.org/2001/XMLschema" elementFormDefault="qualified"
attributeFormDefault="unqualified">
<xs:element name="List_o_Numbers" type="NumList"/>
<xs:complexType name="NumList">
  <xs:sequence>
    <xs:element name="first_as_num" type="xs:decimal"/>    <!-- first_as_num - take a
      string and return a numerical value. Exemplifies use of the operator value(string) -->
    <xs:element name="second_floor" type="xs:decimal"/>    <!-- second_floor return
      nearest integer less than number. Exemplifies use of the operator floor(number) -->
    <xs:element name="second_firstDecimal_floor" type="xs:decimal"/>
    <!-- second_firstDecimal_floor - return nearest first decimal place less than number.
          Exemplifies use of the operator floor(number, significance) -->
    <xs:element name="third_ceil" type="xs:decimal"/>    <!-- third_ceil - return nearest
          integer greater than number. Exemplifies use of the operator ceil(number) -->
    <xs:element name="third_secondDecimal_ceil" type="xs:decimal"/>
    <!-- third_secondDecimal_ceil - return nearest second decimal place greater than number.
          Exemplifies use of the operator ceil(number, significance) -->
    <xs:element name="fourth_round" type="xs:decimal"/>    <!--fourth_round - round
      the number in integers. Exemplifies use of the operator round(number) -->
    <xs:element name="fourth_thirdDecimal_round" type="xs:decimal"/>
    <!-- fourth_thirdDecimal_round - round the number up to third decimal.
          Exemplifies use of the operator round(number, significance) -->
    <xs:element name="fifth_roundToThousand" type="xs:decimal"/>
    <!-- fifth_roundToThousand - round the number up to nearest ten to the third.
          Exemplifies use of the operator roundToPower(number, power) -->
    <xs:element name="abs_sixth" type="xs:decimal"/>    <!-- abs_sixth -- return
      absolute value of number. Exemplifies use of operator abs(number) -->
    <xs:element name="seventh" type="xs:string" />    <!-- seventh - return number as
      string. Exemplifies use of operator string(number) -->
  </xs:sequence>
</xs:complexType>
</xs:schema>
```

An XSLT transformation that maps the source schema into the target schema is given by:

```xml
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <List_o_Numbers>
        <xsl:for-each select="List_o_Numbers">
            <xsl:element name="first_as_num">
                <xsl:value-of select="number(first)"/>
            </xsl:element>         <!-- first_as_num - take a string and return a numerical value.
                                        Exemplifies use of the operator value(string) -->
            <xsl:element name="second_floor">
                <xsl:value-of select="floor(second)"/>
            </xsl:element>         <!-- second_floor return nearest integer less than number.
                                        Exemplifies use of the operator floor(number) -->
            <xsl:element name="second_firstDecimal_floor">
                <xsl:value-of select="floor(second*10) div 10"/>
            </xsl:element>         <!-- second_firstDecimal_floor - return nearest first decimal
    place less than number. Exemplifies use of the operator floor(number, significance) -->
            <xsl:element name="third_ceil">
                <xsl:value-of select="ceiling(third)"/>
            </xsl:element>
            <xsl:element name="third_secondDecimal_ceil">
                <xsl:value-of select="ceiling(third*100) div 100"/>
            </xsl:element>         <!-- third_ceil - return nearest integer greater than number.
                                        Exemplifies use of the operator ceil(number) -->
            <xsl:element name="fourth_round">
                <xsl:value-of select="round(fourth)"/>
            </xsl:element>         <!-- fourth_round - round the number in integers.
                                        Exemplifies use of the operator round(number) -->
            <xsl:element name="fourth_thirdDecimal_round">
                <xsl:value-of select="round(fourth*1000) div 1000" />
            </xsl:element>         <!-- fourth_thirdDecimal_round - round the number up to
                third decimal. Exemplifies use of the operator round(number, significance) -->
            <xsl:element name="fifth_roundToThousand">
                <xsl:value-of select="round(fifth div 1000) * 1000" />
            </xsl:element>         <!-- fifth_roundToThousand - round the number up to nearest
                ten to the third. Exemplifies use of the operator roundToPower(number, power) -->
            <xsl:element name="abs_sixth">
                <xsl:choose>
                    <xsl:when test="sixth < 0">
                        <xsl:value-of select="sixth * −1"/>
                    </xsl:when>
                    <xsl:otherwise>
                        <xsl:value-of select="sixth"/>
                    </xsl:otherwise>
                </xsl:choose>
            </xsl:element>         <!-- abs_sixth - return absolute value of number.
                                        Exemplifies use of operator abs(number) -->
            <xsl:element name="seventh">
                <xsl:value-of select="concat(' ',string(seventh),' ')"/>
            </xsl:element>         <!-- seventh - return number as string.
                                        Exemplifies use of operator string(number) -->
        </xsl:for-each>
    </List_o_Numbers>
</xsl:template>
</xsl:stylesheet>
```

A Twentieth Example

String Manipulation

A source XML schema for a person is given by:

```
<?xml version="1.0" encoding="UTF-8"?>
<xs:schema xmlns:xs="http://www.w3.org/2001/XMLschema"
elementFormDefault="qualified"
           attributeFormDefault="unqualified">
    <xs:element name="Person" type="Person"/>
    <xs:complexType name="Person">
        <xs:sequence>
            <xs:element name="name" type="xs:string"/>
            <xs:element name="homeTown" type="xs:string"/>
        </xs:sequence>
        <xs:attribute name="dog_name" />
    </xs:complexType>
</xs:schema>
```

A target XML schema for a person is given by:

```
<?xml version="1.0" encoding="UTF-8"?>
<xs:schema xmlns:xs="http://www.w3.org/2001/XMLschema"
elementFormDefault="qualified"
           attributeFormDefault="unqualified">
<xs:element name="Person" type="Person"/>
<xs:complexType name="Person">
    <xs:sequence>
        <xs:element name="four_name" type="xs:string"/>
        <xs:element name="capital_homeTown" type="xs:string"/>
            <!-- four-Name is only four characters long, please.
            This exemplifies use of the substring(string, start, length) operator-->
            <!-- capital_homeTown - we must insist you capitalize the first letter of a town,
            out of respect. This exemplifies use of the capital operator-->
    </xs:sequence>
    <xs:attribute name="dog_trim"/>
    <xs:attribute name="dog_length"/>
            <!-- dog_trim - keep your dog trim - no blank spaces in front or after the name.
            This exemplifies use of the trim operator -->
            <!--dog_length - gives the number of characters (in integers, not dog years) in your
            dog's name. This exemplifies use of the length(string) operator -->
</xs:complexType>
</xs:schema>
```

An XSLT transformation that maps the source schema into the target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <Person>
        <xsl:for-each select="Person">
            <xsl:attribute name="dog_trim">
                <xsl:value-of select="normalize-space(@dog_name)"/>
            </xsl:attribute>
            <xsl:attribute name="dog_length">
                <xsl:value-of select="string-length(normalize-space(@dog_name))"/>
            </xsl:attribute>
            <!-- dog_trim - This exemplifies use of the trim operator -->
            <!--dog_length - This exemplifies use of the length(string) operator -->
            <xsl:element name="four_name">
                <xsl:value-of select="substring(name,1, 4)"/>
            </xsl:element>
            <xsl:element name="capital_homeTown">
                <xsl:value-of select="concat(translate(substring(normalize-space(homeTown),1,1),
                    'abcdefghijklmnopqrstuvwxyz','ABCDEFGHIJKLMNOPQRSTUVWXYZ'),
                    substring(normalize-space(homeTown),2))" />
            </xsl:element>
            <!-- four-Name. This exemplifies use of the substring(string, start, length) operator-->
            <!-- capital_hometown. This exemplifies use of the capital operator-->
        </xsl:for-each>
    </Person>
</xsl:template>
</xsl:stylesheet>
```

A Twenty-First Example

Temperature Conversion

A source XML schema for temperature in Fahrenheit is given by:

```
<?xml version="1.0" encoding="UTF-8"?>
<xs:schema xmlns:xs="http://www.w3.org/2001/XMLschema" elementFormDefault="qualified"
                                                       attributeFormDefault="unqualified">
<xs:element name="city" type="city"/>
<xs:complexType name="city">
   <xs:sequence>
     <xs:element name="temperatureF" type="xs:string"/>
   </xs:sequence>
   <xs:attribute name="name" />
</xs:complexType>
</xs:schema>
```

A target XML schema for temperature in Centigrade is given by:

```
<?xml version="1.0" encoding="UTF-8"?>
<xs:schema xmlns:xs="http://www.w3.org/2001/XMLschema" elementFormDefault="qualified"
                                                       attributeFormDefault="unqualified">
<xs:element name="town" type="town" />
<xs:complexType name="town">
   <xs:sequence>
     <xs:element name="temperatureC" type="xs:string" />
   </xs:sequence>
</xs:complexType>
<xs:attribute name="name" />
</xs:schema>
```

An XSLT transformation that maps the source schema into the target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
   <town>
     <xsl:for-each select="city">
       <xsl:attribute name="name">
         <xsl:value-of select="@name"/>
       </xsl:attribute>
       <xsl:element name="temperatureC">
         <xsl:value-of select="floor( (temperatureF - 32) * (5 div 9) )" />
       </xsl:element>
     </xsl:for-each>
   </town>
</xsl:template>
</xsl:stylesheet>
```

A Twenty-Second Example

Town with Books

A source XML schema for a town with books is given by:

```
<?xml version="1.0" encoding="UTF-8"?>
<xs:schema xmlns:xs="http://www.w3.org/2001/XMLschema" elementFormDefault="qualified"
                                                       attributeFormDefault="unqualified">
<xs:element name="town" type="Town" />
<xs:complexType name="Town">
   <xs:sequence>
      <xs:element name="library" type="Library" minOccurs="0" maxOccurs="unbounded" />
   </xs:sequence>
   <xs:attribute name="name" type="xs:string" />
</xs:complexType>
<xs:complexType name="Library">
   <xs:sequence>
      <xs:element name="book" type="Book" minOccurs="0" maxOccurs="unbounded" />
   </xs:sequence>
   <xs:attribute name="name" type="xs:string" />
</xs:complexType>
<xs:complexType name="Book">
   <xs:sequence>
      <xs:element name="title" type="xs:string" />
      <xs:element name="author_name" type="xs:string" minOccurs="1"
                                                      maxOccurs="unbounded" />
   </xs:sequence>
</xs:complexType>
</xs:schema>
```

A target XML schema for a list of books is given by:

```
<?xml version="1.0" encoding="UTF-8"?>
<xs:schema xmlns:xs="http://www.w3.org/2001/XMLschema" elementFormDefault="qualified"
                                                       attributeFormDefault="unqualified">
<xs:element name="list_of_books" type="books"/>
<xs:complexType name="books">
   <xs:sequence>
      <xs:element name="book" type="book" minOccurs="0" maxOccurs="unbounded" />
   </xs:sequence>
</xs:complexType>
<xs:complexType name="book">
   <xs:sequence>
      <xs:element name="title" type="xs:string" />
      <xs:element name="author_name" type="xs:string" minOccurs="1"
                                                      maxOccurs="unbounded" />
   </xs:sequence>
</xs:complexType>
</xs:schema>
```

Figure 25:
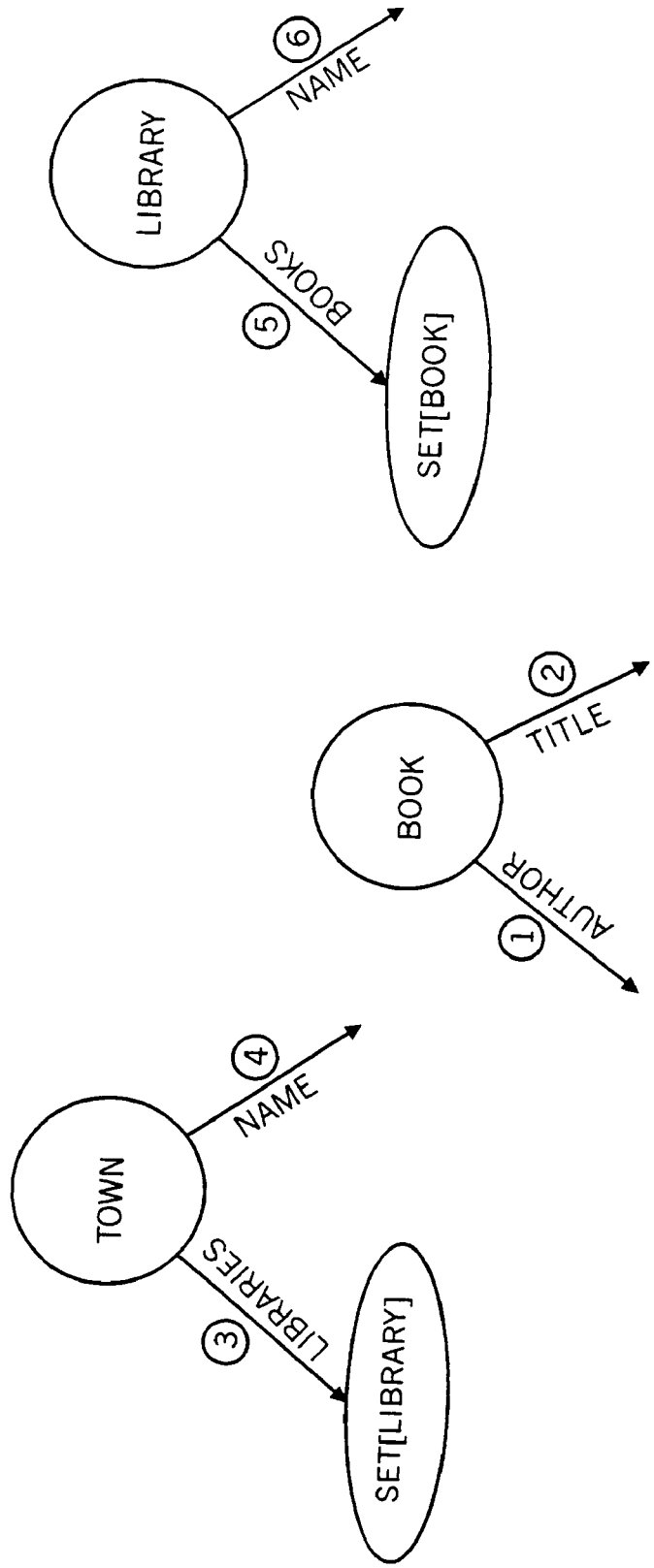
FIG. 25 is an illustration of ontology model corresponding to a twenty-second example.

A common ontology model for the source and target XML schema is illustrated in FIG. 25. A mapping of the source XML schema into the ontology model is given by:

TABLE CXXVII

Mapping from Source schema to Ontology for Twenty-Second Example

| schema | Ontology | Property Index |
|---|---|---|
| complexType: book | Class: Book | |
| element: book/title/text( ) | Property: name(Book) | 1 |
| element: book/author_name/text( ) | Property: author(Book) | 2 |

TABLE CXXVII-continued

Mapping from Source schema to Ontology for Twenty-Second Example

| schema | Ontology | Property Index |
|---|---|---|
| complexType: library | Class: Library | |
| element: library/books | Container Class: set[Book] | 5 |
| element: library/name/text( ) | Property: name(Library) | 6 |
| complexType: town | Class: Town | |
| element: town/libraries | Container Class: set[Library] | 1 |
| element: town/name/text( ) | Property: name(Town) | 2 |

A mapping of the target XML schema into the ontology model is given by:

TABLE CXXVIII

Mapping from Target schema to Ontology for Twenty-Second Example

| schema | Ontology | Property Index |
|---|---|---|
| complexType: book | Class: Book | |
| element: book/title/text( ) | Property: name(Book) | 1 |
| element: book/author_name/text( ) | Property: author(Book) | 2 |
| element: list_of_books | Set[Book] | |

Based on Tables CXXVII and CXXVIII, an XSLT transformation that maps XML documents that conform to the source schema to corresponding documents that conform to the target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <books>
        <xsl:for-each select=".//book">
            <book>
                <xsl:element name="title">
                    <xsl:value-of select="title/text()"/>
                </xsl:element>
                <xsl:for-each select="author_name">
                    <xsl:element name="author_name">
                        <xsl:value-of select="."/>
                    </xsl:element>
                </xsl:for-each>
            </book>
        </xsl:for-each>
    </books>
</xsl:template>
</xsl:stylesheet>
```

A Twenty-Third Example

Town with Books

A source XML schema for a town is given by:

```
<?xml version="1.0" encoding="UTF-8"?>
<xs:schema xmlns:xs="http://www.w3.org/2001/XMLschema" elementFormDefault="qualified"
                                                        attributeFormDefault="unqualified">
<xs:element name="town" type="Town"/>
<xs:complexType name="Town">
    <xs:sequence>
        <xs:element name="library" type="Library" minOccurs="0" maxOccurs="unbounded"/>
        <xs:element name="police_station" type="PoliceStation" minOccurs="0"
                                                        maxOccurs="unbounded"/>
    </xs:sequence>
    <xs:attribute name="name" type="xs:string"/>
</xs:complexType>
<xs:complexType name="Library">
    <xs:sequence>
        <xs:element name="book" type="Book" minOccurs="0" maxOccurs="unbounded"/>
    </xs:sequence>
    <xs:attribute name="name" type="xs:string"/>
</xs:complexType>
<xs:complexType name="Book">
    <xs:sequence>
        <xs:element name="title" type="xs:string"/>
        <xs:element name="author_name" type="xs:string" maxOccurs="unbounded"/>
    </xs:sequence>
</xs:complexType>
<xs:complexType name="PoliceStation">
    <xs:sequence>
```

```
    <xs:element name="Officers" type="Officers"/>
  </xs:sequence>
  <xs:attribute name="identifier" type="xs:string"/>
</xs:complexType>
<xs:complexType name="Officers">
  <xs:sequence>
    <xs:element name="name" type="xs:string" minOccurs="1" maxOccurs="unbounded"/>
  </xs:sequence>
</xs:complexType>
</xs:schema>
```

A first target XML schema for police stations is given by:

```
<?xml version="1.0" encoding="UTF-8"?>
<xs:schema xmlns:xs="http://www.w3.org/2001/XMLschema" elementFormDefault="qualified"
                                                       attributeFormDefault="unqualified">
<xs:element name="PoliceStations" type="PoliceStations"/>
<xs:complexType name="PoliceStations">
  <xs:sequence>
    <xs:element name="Station" type="Station" minOccurs="0" maxOccurs="unbounded"/>
  </xs:sequence>
</xs:complexType>
<xs:complexType name="Station">
  <xs:sequence>
    <xs:element name="Officers" type="Officers"/>
  </xs:sequence>
  <xs:attribute name="identifier" type="xs:string"/>
</xs:complexType>
<xs:complexType name="Officers">
  <xs:sequence>
    <xs:element name="name" type="xs:string" minOccurs="1" maxOccurs="10"/>
  </xs:sequence>
</xs:complexType>
</xs:schema>
```

Figure 26:
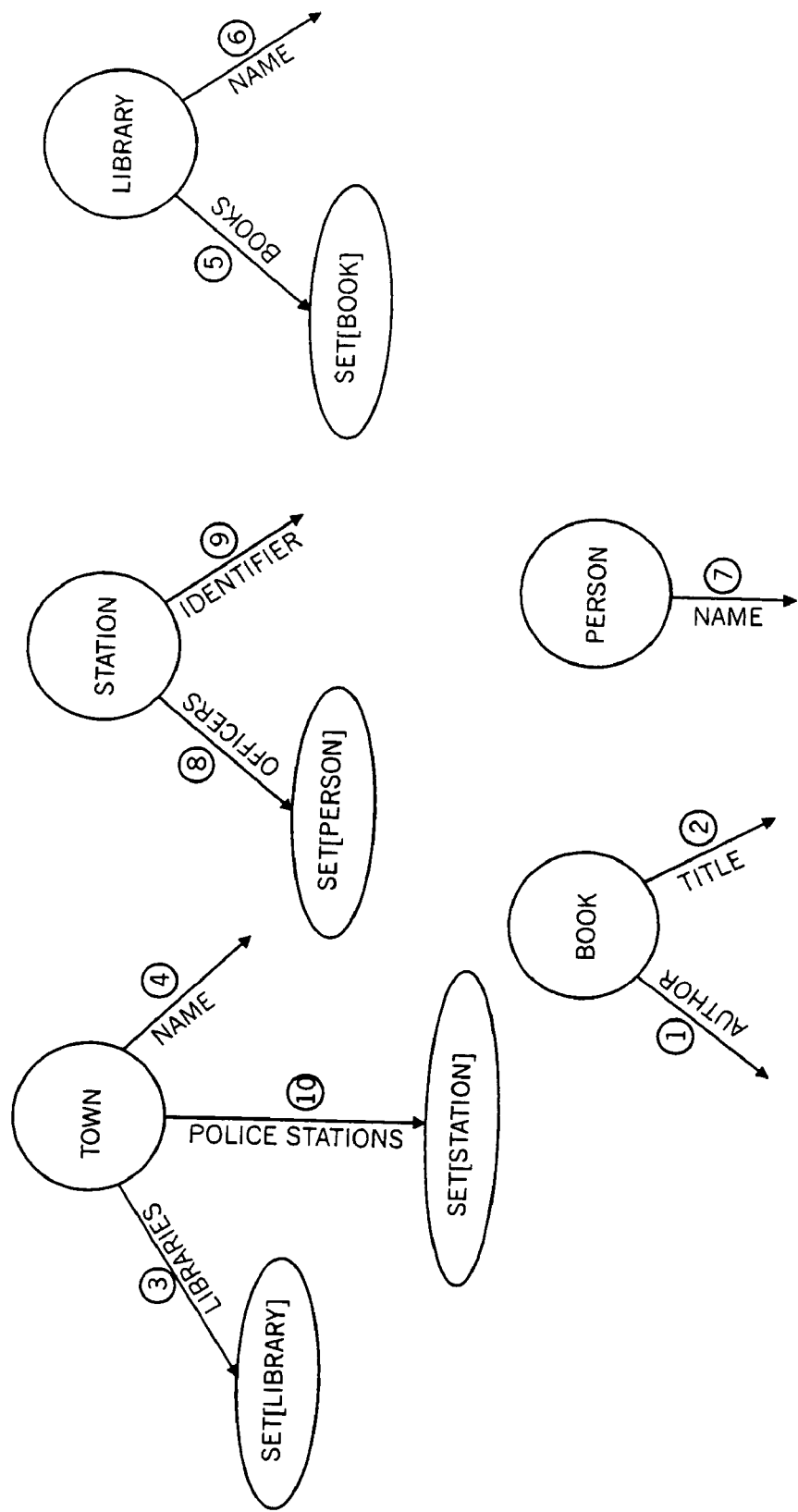
FIG. 26 is an illustration of ontology model corresponding to a twenty-third example.

A common ontology model for the source and target XML schema is illustrated in FIG. 26. A mapping of the source XML schema into the ontology model is given by:

TABLE CXXIX

Mapping from Source schema to Ontology for Twenty-Third Example

| schema | Ontology | Property Index |
|---|---|---|
| complexType: book | Class: Book | |
| element: book/title/text( ) | Property: title(Book) | 2 |
| element: book/author__name/text( ) | Property: author(Book) | 1 |
| complexType: library | Class: Library | |
| element: library/books | Container Class: set[Book] | 5 |
| element: library/@name | Property: name(Library) | 6 |
| complexType: officer | Class: Person | |
| element: officer/name/text( ) | Property: name(Person) | 7 |
| complexType: police__station | Class: Station | |
| element: police__station/officers | Container Class: set[Person] | 8 |

TABLE CXXIX-continued

Mapping from Source schema to Ontology for Twenty-Third Example

| schema | Ontology | Property Index |
|---|---|---|
| element: police__station/@identifier | Property: identifier(Station) | 9 |
| complexType: town | Class: Town | |
| element: town/libraries | Container Class: set[Library] | 3 |
| element: town/police__stations | Container Class: set[Station] | 10 |
| element: town/@name | Property: name(Town) | 4 |

A mapping of the first target XML schema into the ontology model is given by:

TABLE CXXX

Mapping from Target schema to Ontology for Twenty-Third Example

| schema | Ontology | Property Index |
|---|---|---|
| complexType: officer | Class: Person | |
| element: officer/name/text( ) | Property: name(Person) | 7 |
| complexType: station | Class: Station | |
| element: station/officers | Container Class: set[Person] | 8 |
| element: station/@identifier | Property: identifier(Station) | 9 |
| complexType: police__stations | Class: set[Station] | |

Based on Tables CXXIX and CXXX, an XSLT transformation that maps XML documents that conform to the source schema to corresponding documents that conform to the first target schema is given by:

```
<?xml version="1.0" encoding="UTF-8"?>
<xsl:stylesheet version="1.0" xmlns:xsl="http://www.w3.org/1999/XSL/Transform">
<xsl:output method="xml" version="1.0" encoding="UTF-8" indent="yes"/>
<xsl:template match="/">
    <PoliceStations>
        <xsl:for-each select=".//PoliceStation">
            <Station>
                <xsl:attribute name="identifier">
                    <xsl:value-of select="@identifier"/>
                </xsl:attribute>
                <xsl:for-each select="Officers">
                    <Officers>
                        <xsl:for-each select="name[position() < 11]">
                            <xsl:element name="name">
                                <xsl:value-of select="."/>
                            </xsl:element>
                        </xsl:for-each>
                    </Officers>
                </xsl:for-each>
            </Station>
        </xsl:for-each>
    </PoliceStations>
</xsl:template>
</xsl:stylesheet>
```

A second target XML schema for temperature in Centigrade is given by:

```
<?xml version="1.0" encoding="UTF-8"?>
<xs:schema xmlns:xs="http://www.w3.org/2001/XMLschema"
            ementFormDefault="qualified"
            attributeFormDefault="unqualified">
<xs:element name="PoliceStations" type="PoliceStations"/>
<xs:complexType name="PoliceStations">
    <xs:sequence>
        <xs:element name="Station" type="Station" minOccurs="0"
            maxOccurs="unbounded"/>
    </xs:sequence>
</xs:complexType>
<xs:complexType name="Station">
    <xs:sequence>
        <xs:element name="Officers" type="Officers"/>
    </xs:sequence>
    <xs:attribute name="identifier" type="xs:string"/>
</xs:complexType>
<xs:complexType name="Officers">
    <xs:sequence>
        <xs:element name="name" type="xs:string" minOccurs="10"
            maxOccurs="unbounded"/>
    </xs:sequence>
</xs:complexType>
</xs:schema>
```

Based on Tables CXXIX and CXXX, an XSLT transformation that maps XML documents that conform to the source schema to corresponding documents that conform to the second target schema is given by:

```
<?xml version="1.0" encoding="UTF-8"?>
<xsl:stylesheet version="1.0" xmlns:xsl=
"http://www.w3.org/1999/XSL/Transform">
<xsl:output method="xml" version="1.0" encoding="UTF-8"
indent="yes"/>
<xsl:template match="/">
    <PoliceStations>
        <xsl:for-each select=".//PoliceStation">
            <Station>
                <xsl:attribute name="identifier">
                    <xsl:value-of select="@identifier"/>
                </xsl:attribute>
                <xsl:for-each select="Officers">
```

-continued

```
                    <Officers>
                        <xsl:for-each select="name">
                            <xsl:element name="name">
                                <xsl:value-of select="."/>
                            </xsl:element>
                        </xsl:for-each>
                    </Officers>
                </xsl:for-each>
                <xsl:call-template name="generate_officer">
                    <xsl:with-param name="so_far" select="count(name)"/>
                </xsl:call-template>
            </Station>
        </xsl:for-each>
    </PoliceStations>
</xsl:template>
<xsl:template name="generate_officer">
    <xsl:param name="so_far"/>
    <xsl:if test="$so_far &lt; 10">
        <bar>
        </bar>
        <xsl:call-template name="generate_officer">
            <xsl:with-param name="so_far" select="$so_far + 1"/>
        </xsl:call-template>
    </xsl:if>
</xsl:template>
</xsl:stylesheet>
```

A third target XML schema for temperature in Centigrade is given by:

```
<?xml version="1.0" encoding="UTF-8"?>
<xs:schema xmlns:xs="http://www.w3.org/2001/XMLschema"
elementFormDefault="qualified"
attributeFormDefault="unqualified">
<xs:element name="PoliceStations" type="PoliceStations"/>
<xs:complexType name="PoliceStations">
    <xs:sequence>
        <xs:element name="Station" type="Station" minOccurs="0"
            maxOccurs="unbounded"/>
    </xs:sequence>
</xs:complexType>
<xs:complexType name="Station">
    <xs:sequence>
        <xs:element name="Officers" type="Officers"/>
    </xs:sequence>
    <xs:attribute name="identifier" type="xs:string"/>
</xs:complexType>
```

-continued

```
<xs:complexType name="Officers">
    <xs:sequence>
        <xs:element name="name" type="xs:string" minOccurs="10"
            maxOccurs="20"/>
    </xs:sequence>
</xs:complexType>
</xs:schema>
```

Based on Tables CXXIX and CXXX, an XSLT transformation that maps XML documents that conform to the source schema to corresponding documents that conform to the first target schema is given by:

```
<?xml version="1.0" encoding="UTF-8"?>
<xsl:stylesheet version="1.0" xmlns:xsl=
"http://www.w3.org/1999/XSL/Transform">
<xsl:output method="xml" version="1.0" encoding="UTF-8"
indent="yes"/>
<xsl:template match="/">
    <PoliceStations>
        <xsl:for-each select=".//PoliceStation">
            <Station>
                <xsl:attribute name="identifier">
                    <xsl:value-of select="@identifier"/>
                <xsl:attribute>
                <xsl:for-each select="Officers">
                    <Officers>
                        <xsl:for-each select="name[position( ) < 11]">
                            <xsl:element name="name">
                                <xsl:value-of select="."/>
                            </xsl:element>
                        </xsl:for-each>
                    </Officers>
                </xsl:for-each>
                <xsl:call-template name="generate_officer">
                    <xsl:with-param name="so_far" select="count(name)"/>
                </xsl:call-template>
            <Station>
        </xsl:for-each>
    </PoliceStations>
</xsl:template>
<xsl:template name="generate_officer">
    <xsl:param name="so_far"/>
    <xsl:if test="$so_far < 20">
        <bar>
        </bar>
        <xsl:call-template name="generate_officer">
            <xsl:with-param name="so_far" select="$so_far + 1"/>
        </xsl:call-template>
    </xsl:if>
</xsl:template>
</xsl:stylesheet>
```

Implementation Details—SQL Generation

As mentioned hereinabove, and described through the above series of examples, in accordance with a preferred embodiment of the present invention a desired transformation from a source RDBS to a target RDBS is generated by:

(i) mapping the source and target RDBS into a common ontology model;
(ii) representing fields of the source and target RDBS in terms of properties of the ontology model, using symbols for properties;
(iii) deriving expressions for target symbols in terms of source symbols; and
(iv) converting the expressions into one or more SQL queries.

Preferably the common ontology model is built by adding classes and properties to an initial ontology model, as required to encompass tables and fields from the source and target RDBS. The addition of classes and properties can be performed manually by a user, automatically by a computer, or partially automatically by a user and a computer in conjunction.

Preferably, while the common ontology model is being built, mappings from the source and target RDBS into the ontology model are also built by identifying tables and fields of the source and target RDBS with corresponding classes and properties of the ontology model. Fields are preferably identified as being either simple properties or compositions of properties.

In a preferred embodiment of the present invention, automatic user guidance is provided when building the common ontology model, in order to accommodate the source and target RDBS mappings. Specifically, while mapping source and target RDBS into the common ontology model, the present invention preferably automatically presents a user with the ability to create classes that corresponds to tables, if such classes are not already defined within the ontology. Similarly, the present invention preferably automatically present a user with the ability to create properties that correspond to fields, if such properties are not already defined within the ontology.

This automatic guidance feature of the present invention enables users to build a common ontology on the fly, while mapping the source and target RDBS.

In a preferred embodiment of the present invention, automatic guidance is used to provide a user with a choice of properties to which a given table column may be mapped. Preferably, the choice of properties only includes properties with target types that are compatible with a data type of the given table column, or compositions of properties wherein the final property in the composition has a target type that is compatible with the data type of the given table column. For example, if the given table column has data type VARCHAR2 then the choice of properties may only include properties with target type string, or compositions of properties whereby the final property in the composition has target type string. Similarly, if the given table column is a foreign key to a foreign table, then the choice of properties may only include properties whose target is the class corresponding to the foreign table, or compositions of properties wherein the final property in the composition has a target that is the class corresponding to the foreign table.

More specifically, in a preferred embodiment of the present invention a property whose target is a "fundamental" data type is referred to as a "representation." Fundamental data types preferably include data types that can be processed by a digital computer, such as 16-bit integers, 32-bit integers, floating point numbers, double precision floating point numbers and character strings. Representations are preferably color-coded within a GUI. For example, representations may be displayed using green fonts. When mapping a given table column to a property of composition of properties, the GUI preferably automatically guides the user so that the mapped property or the final property in the mapped composition of properties is green; i.e., a representation, and has an appropriate target data type.

Representations are significant with respect to generation of test instances, as described hereinabove. When a test instance of a class is generated, values of the class representations are preferably entered as strings or numbers. When other properties are entered, however, their values have to be set to instances of their target class. For example, when a test instance of a class Person is generated, his name and D) number, which are representations, can be entered as a string and a number, respectively. However, his address, which is a property from class Person to a class Address, is preferably entered as an instance of class Address.

In a preferred embodiment of the present invention, automatic guidance is provided in determining inheritance among classes of the common ontology. Conditions are identified under which the present invention infers that two tables should be mapped to classes that inherit one from another. Such a condition arises when a table, $T_1$, contains a primary key that is a foreign key to a table, $T_2$. In such a situation, the present invention preferably infers that the class corresponding to $T_1$ inherits from the class corresponding to $T_2$.

For example, $T_1$ may be a table for employees with primary key Social_Security_No, which is a foreign key for a table $T_2$ for citizens. The fact that Social_Security_No serves both as a primary key for $T_1$ and as a foreign key for $T_2$ implies that the class Employees inherits from the class Citizens.

Preferably, when the present invention infers an inheritance relation, the user is given an opportunity to confirm or decline. Alternatively, the user may not be given such an opportunity.

In a preferred embodiment of the present invention, a given column table may be mapped to a property of a subclass or superclass of the class to which the table corresponds.

Preferably, representing fields of the source and target RDBS in terms of properties of the ontology model is performed by identifying a key field among the fields of a table and expressing the other fields in terms of the identified key field using an inverse property symbol for the key field. For example, if a key field corresponds to a property denoted by 1, and a second field corresponds to a property denoted by 2, then the relation of the second field to the first field is denoted by $2o1^{-1}$. If a table has more than one key field, then preferably symbols are listed for each of the key fields, indicating how the other fields relate thereto. For example, if the second field above also is a key field, then the relation of the first field to the second field is denoted by $1o2^{-1}$, and both of the symbols $2o1^{-1}$ and $1o2^{-1}$ are listed.

Preferably, deriving expressions for target symbols in terms of source symbols is implemented by a search over the source symbols for paths that result in the target symbols. For example, if a target symbol is given by $3o1^{-1}$, then chains of composites are formed starting with source symbols of the form $ao1^{-1}$, with each successive symbol added to the composite chain inverting the leftmost property in the chain. Thus, a symbol ending with $a^{-1}$ is added to the left of the symbol $ao1^{-1}$, and this continues until property 3 appears at the left end of the chain.

Preferably, converting symbol expressions into SQL queries is accomplished by use of Rules 1-7 described hereinabove with reference to the examples.

Preferably, when mapping a table to a class, a flag is set that indicates whether it is believed that the table contains all instances of the class.

Implementation Details—XSLT Generation Algorithm

1. Begin with the target schema. Preferably, the first step is to identify a candidate root element. Assume in what follows that one such element has been identified—if there are more than one such candidate, then preferably a user decides which is to be the root of the XSLT transformation. Assume that a <root> element has thus been identified. Create the following XSLT script, to establish that any document produced by the transformation will at minimum conform to the requirement that its opening and closing tags are identified by root:

```
<xsl:template match="/">
    <root>
    </root>
</xsl:template>
```

2. Preferably, the next step is to identify the elements in the target schema that have been mapped to ontological classes. The easiest case, and probably the one encountered most often in practice, is one in which the root itself is mapped to a class, be it a simple class, a container class or a cross-product. If not, then preferably the code-generator goes down a few levels until it comes across elements mapped to classes. The elements that are not mapped to classes should then preferably be placed in the XSLT between the <root> tags mentioned above, in the correct order, up to the places where mappings to classes begin.

```
<xsl:template match="/">
<root>
    <sequence1>
        [ <element1> mapped to class ]
        <element2>
    </sequence1>
    <sequence2>
    </sequence2>
</root>
</xsl:template>
```

3. Henceforth, for purposes of clarity and exposition, the XSLT script generation algorithm is described in terms of an element <fu> that is expected to appear in the target XML document and is mapped to an ontological class, whether that means the root element or a parallel set of elements inside a tree emanating from the root. The treatment is the same in any event from that point onwards.

4. Preferably the XSLT generation algorithm divides into different cases depending on a number of conditions, as detailed hereinbelow:

TABLE CXXXI

Conditions for <xsl:for-each> Segments

| Condition | XSLT Segment |
|---|---|
| <fu> is mapped to a simple class Foo with cardinality parameters minOccurs="1" maxOccurs="1" in the XML schema and there is a | A |

TABLE CXXXI-continued

Conditions for <xsl:for-each> Segments

| Condition | XSLT Segment |
|---|---|
| corresponding element <foo> in the source document that is associated to the same class Foo. | |
| <fu> is mapped to a simple class Foo with cardinality parameters minOccurs="0" maxOccurs="1" in the XML schema and there is a corresponding element <foo> in the source document that is associated to the same class Foo. | B |
| <fus> is mapped to a container class set[Foo] with cardinality parameters minOccurs="0" maxOccurs="unbounded" in the XML schema, and there are corresponding elements <foos1>, <foos2>, ..., <foosn> in the source document each of which is associated to the same container-class set[Foo]. | C |
| fus> is mapped to a container class set[Foo] with cardinality parameters minOccurs="0" maxOccurs="unbounded" in the XML schema, but there is no corresponding element <foos> in the source document that is associated with the same container-class set[Foo]. There are, however, perhaps elements <foo1>, <foo2>...<foom> which are each individually mapped to the class Foo. | D |
| <fus> is mapped to a container class set[Foo] with cardinality parameters minOccurs="0" maxOccurs="n" in the XML schema, and there are corresponding elements <foos1>, <foos2>, ..., <foosk> in the source document each of which is associated to the same container-class set[Foo]. | E |
| <fus> is mapped to a container class set[Foo] with cardinality parameters minOccurs="0" maxOccurs="n" in the XML schema, but there is no corresponding element <foos> in the source document that is associated with the same container-class set[Foo]. There are, however, perhaps elements <foo1>, <foo2>...<fook> which are each individually mapped to the class Foo. | F |
| fus> is mapped to a container class set[Foo] with cardinality parameters minOccurs="m" maxOccurs="n" in the XML schema, and there are corresponding elements <foos1>, <foos2>, ..., <foosk> in the source document each of which is associated to the same container-class set[Foo]. | G |
| fus> is mapped to a container class set[Foo] with cardinality parameters minOccurs="m" maxOccurs="n" in the XML schema, but there is no corresponding element <foos> in the source document that is associated with the same container-class set[Foo]. There are, however, perhaps elements <foo1>, <foo2>...<fook> which are each individually mapped to the class Foo. | H |

For cases C and D, the XML schema code preferably looks like:

```
<xsd:complexType name="fus">
    <xsd:sequence>
        <xsd:element name="fu" type="fu_view" minOccurs="0"
            maxOccurs="unbounded"/>
    </xsd:sequence>
</xsd:complexType>
```

For cases E and F, the XML schema code preferably looks like:

```
<xsd:complexType name="fus">
    <xsd:sequence>
        <xsd:element name="fu" type="fu_view" minOccurs="0"
            maxOccurs="n">
    </xsd:sequence>
</xsd:complexType>
```

For cases G and H, the XML schema code preferably looks like:

```
<xsd:complexType name="fus">
    <xsd:sequence>
        <xsd:element name="fu" type="fu_view" minOccurs="0"
            maxOccurs="n">
    </xsd:sequence>
</xsd:complexType>
```

For the rules as to what should appear in between the <for-each> tags, see step 5 hereinbelow.

Case A:

```
<fu>
    <xsl:for-each select=".//foo[position( ) = 1">
    </xsl:for-each>
</fu>
```

Case B:

```
<xsl:for-each select=".//foo[position( ) = 1]">
    <fu>
    </fu>
</xsl:for-each>
```

Case C:

```
<fus>
    <xsl:for-each select=".//foos1">
        <xsl:for-each select="foo">
            <fu>
            </fu>
        </xsl:for-each>
    </xsl:for-each>
    <xsl:for-each select=".//foos2">
        <xsl:for-each select="foo">
            <fu>
            </fu>
        </xsl:for-each>
    </xsl:for-each>
    <xsl:for-each select=".//foosn">
        <xsl:for-each select="foo">
            <fu>
            </fu>
        </xsl:for-each>
    </xsl:for-each>
</fus>
```

Case D:

```
<fus>
    <xsl:for-each select=".//foo1">
        <fu>
        </fu>
    </xsl:for-each>
    <xsl:for-each select=".//foo2">
        <fu>
        </fu>
    </xsl:for-each>
    <xsl:for-each select=".//foom">
        <fu>
        </fu>
    </xsl:for-each>
</fus>
```

Case E:

```
<xsl:template match="/">
    <fus>
        <xsl:call-template name="find_foos1">
            <xsl:with-param name="so_far" select="0"/>
        </xsl:call-template>
    </fus>
</xsl:template>
<xsl:template name="find_foos1">
    <xsl:param name="so_far"/>
    <xsl:if test="$so_far < n+1">
        <xsl:for-each select=".//foos1/foo">
            <xsl:if test="$so_far+position( ) < n+1">
                <fu>
                </fu>
            </xsl:if>
        </xsl:for-each>
    </xsl:if>
```

-continued

```
    <xsl:call-template name="find_foos2">
        <xsl:with-param name="so_far"
            select="$so_far+count(.//foos1/foo)"/>
    </xsl:call-template>
</xsl:template>
<xsl:template name="find_foos2">
    <xsl:param name="so_far"/>
    <xsl:if test="$so_far < n+1">
        <xsl:for-each select=".//foos2/foo">
            <xsl:if test="$so_far+position( ) < n+1">
                <fu>
                </fu>
            </xsl:if>
        </xsl:for-each>
    </xsl:if>
    <xsl:call-template name="find_foos3">
        <xsl:with-param name="so_far"
            select="$so_far+count(.//foos2/foo)"/>
    </xsl:call-template>
</xsl:template>
<xsl:template name="find_foosk">
    <xsl:param name="so_far"/>
    <xsl:if test="$so_far < n+1">
        <xsl:for-each select=".//foosn/foo">
            <xsl:if test="$so_far+position( ) < n+1">
                <fu>
                </fu>
            </xsl:if>
        </xsl:for-each>
    </xsl:if>
</xsl:template>
```

Case F:

```
<xsl:template match="/">
    <fus>
        <xsl:call-template name="find_foo1">
            <xsl:with-param name="so_far" select="0"/>
        </xsl:call-template>
    </fus>
</xsl:template>
<xsl:template name="find_foo1">
    <xsl:param name="so_far"/>
    <xsl:if test="$so_far < n+1">
        <xsl:for-each select=".//foo1">
            <xsl:if test="$so_far+position( ) < n+1">
                <fu>
                </fu>
            </xsl:if>
        </xsl:for-each>
    </xsl:if>
    <xsl:call-template name="find_foo2">
        <xsl:with-param name="so_far"
            select="$so_far+count(.//foo1)"/>
    </xsl:call-template>
</xsl:template>
<xsl:template name="find_foo2">
    <xsl:param name="so_far"/>
    <xsl:if test="$so_far < n+1">
        <xsl:for-each select=".//foo2">
            <xsl:if test="$so_far+position( ) < n+1">
                <fu>
                </fu>
            </xsl:if>
        </xsl:for-each>
    </xsl:if>
    <xsl:call-template name="find_foo3">
        <xsl:with-param name="so_far"
            select="$so_far+count(.//foo2)"/>
    </xsl:call-template>
</xsl:template>
```

```
<xsl:template name="find_fook">
    <xsl:param name="so_far"/>
    <xsl:if test="$so_far < n+1">
        <xsl:for-each select=".//fook">
            <xsl:if test="$so_far+position( ) < n+1">
                <fu>
                </fu>
            </xsl:if>
        </xsl:for-each>
    </xsl:if>
</xsl:template>
```

Case G:

```
<xsl:template match="/">
    <fus>
        <xsl:call-template name="find_foos1">
            <xsl:with-param name="so_far" select="0"/>
        </xsl:call-template>
    </fus>
</xsl:template>
<xsl:template name="find_foos1">
    <xsl:param name="so_far"/>
    <xsl:if test="$so_far < n+1">
        <xsl:for-each select=".//foos1/foo">
            <xsl:if test="$so_far+position( ) < n+1">
                <fu>
                </fu>
            </xsl:if>
        </xsl:for-each>
    </xsl:if>
    <xsl:call-template name="find_foos2">
        <xsl:with-param name="so_far"
            select="$so_far+count(.//foos1/foo)"/>
    </xsl:call-template>
</xsl:template>
<xsl:template name="find_foos2">
    <xsl:param name="so_far"/>
    <xsl:if test="$so_far < n+1">
        <xsl:for-each select=".//foos2/foo">
            <xsl:if test="$so_far+position( ) < n+1">
                <fu>
                </fu>
            </xsl:if>
        </xsl:for-each>
    </xsl:if>
    <xsl:call-template name="find_foos3">
        <xsl:with-param name="so_far"
            select="$so_far+count(.//foos2/foo)"/>
    </xsl:call-template>
</xsl:template>
<xsl:template name="find_foosn">
    <xsl:param name="so_far"/>
    <xsl:if test="$so_far < k+1">
        <xsl:for-each select=".//foosn/foo">
            <xsl:if test="$so_far+position( ) < n+1">
                <fu>
                </fu>
            </xsl:if>
        </xsl:for-each>
    </xsl:if>
    <xsl:call-template name="generate_fus">
        <xsl:with-param name="so_far"
            select="$so_far+count(.//foosk/foo)"/>
    </xsl:call-template>
</xsl:template>
<xsl:template name="generate_fus">
    <xsl:param name="so_far"/>
    <xsl:if test="$so_far < m">
        <fu>
        </fu>
        <xsl:call-template name="generate_fus">
            <xsl:with-param name="so_far"
                select="$so_far + 1"/>
        </xsl:call-template>
    </xsl:if>
</xsl:template>
```

Case H:

```
<xsl:template match="/">
    <fus>
        <xsl:call-template name="find_foo1">
            <xsl:with-param name="so_far" select="0"/>
        </xsl:call-template>
    </fus>
</xsl:template>
<xsl:template name="find_foo1">
    <xsl:param name="so_far"/>
    <xsl:if test="$so_far < n+1">
        <xsl:for-each select=".//foo1">
            <xsl:if test="$so_far+position( ) < n+1">
                <fu>
                </fu>
            </xsl:if>
        </xsl:for-each>
    </xsl:if>
    <xsl:call-template name="find_foo2">
        <xsl:with-param name="so_far"
            select="$so_far+count(.//foo1)"/>
    </xsl:call-template>
</xsl:template>
<xsl:template name="find_foo2">
    <xsl:param name="so_far"/>
    <xsl:if test="$so_far < n+1">
        <xsl:for-each select=".//foo2">
            <xsl:if test="$so_far+position( ) < n+1">
                <fu>
                </fu>
            </xsl:if>
        </xsl:for-each>
    </xsl:if>
    <xsl:call-template name="find_foo3">
        <xsl:with-param name="so_far"
            select="$so_far+count(.//foo2)"/>
    </xsl:call-template>
</xsl:template>
<xsl:template name="find_foon">
    <xsl:param name="so_far"/>
    <xsl:if test="$so_far < k+1">
        <xsl:for-each select=".//foon">
            <xsl:if test="$so_far+position( ) < n+1">
                <fu>
                </fu>
            </xsl:if>
        </xsl:for-each>
    </xsl:if>
    <xsl:call-template name="generate_fus">
        <xsl:with-param name="so_far"
            select="$so_far+count(.//fook)"/>
    </xsl:call-template>
</xsl:template>
<xsl:template name="generate_fus">
    <xsl:param name="so_far"/>
    <xsl:if test="$so_far < m">
        <fu>
        </fu>
        <xsl:call-template name="generate_fus">
            <xsl:with-param name="so_far"
                select="$so_far + 1"/>
        </xsl:call-template>
    </xsl:if>
</xsl:template>
```

5. Next assume that the classes have been taken care of as detailed hereinabove in step 4. Preferably, from this point onwards the algorithm proceeds by working with properties rather than classes. Again, the algorithm is divided up into cases. Assume that the <fu> </fu> tags have been treated, and that the main issue now is dealing with the elements <bar> that are properties of <fu>.

Sequence Lists

Suppose that the properties of <fu> are listed in a sequence complex-type in the target schema. Assume, for the sake of definitiveness, that a complexType fu is mapped to an ontological class Foo, with elements $bar_i$ mapped to respective property, $Foo.bar_i$. Assume further that the source XML schema has an XPath pattern fu1 that maps to the ontological class Foo, with further children patterns fu1/barr1, fu1/barr2, etc., mapping to the relevant property paths.

In a preferred embodiment of the present invention, specific pieces of code are generated to deal with different maximum and minimum occurrences. Such pieces of code are generated inside the <fu></fu> tags that were generated as described hereinabove. Preferably, the general rule for producing such pieces of code is as follows:

TABLE CXXXI

Conditions for Filling in <xsl:for-each> Segments

| Condition | XSLT Segment |
|---|---|
| The target XML code says <xs:element name="bar" minOccurs="1" maxOccurs="1"/> or equivalently <xs: element name="bar" />, and the source has an associated tag <barr>. | I |
| The target XML code says <xs:element name="bar" minOccurs="0" maxOccurs="unbounded"/> and the source has an associated tag <barr>. | J |
| The XML code says <xs:element name="bar" minOccurs="0" maxOccurs="n"/> and the source has an associated tag <barr>. | L |
| The XML code says <xs:element name="bar" minOccurs="m" maxOccurs="unbounded"/> where m > 0, and the source has an associated tag <barr>. | M |
| The XML code says <xs:element name="bar" minOccurs="m" maxOccurs="n"/> where m > 0, and n is a finite integer, and the source has an associated tag <barr>. | N |
| The target sequence includes a line <xs:element name="bar" minOccurs="m" maxOccurs="n"/> where m > 0, but the source has no associated tag. | O |

Case I:

```
<bar>
    <xsl:value-of select="barr"/>
</bar>
```

Case J:

```
<xsl:for-each select="barr">
    <bar>
        <xsl:value-of select="."/>
    </bar>
</xsl:for-each>
```

Case K:

```
<xsl:for-each select="barr[position( ) < n+1]">
    <bar>
        <xsl:value-of select="."/>
    </bar>
</xsl:for-each>
```

Case L:

```
<xsl:for-each select="barr">
    <bar>
        <xsl:value-of select="."/>
    </bar>
</xsl:for-each>
<xsl:call-template name="generate_bar">
    <xsl:with-param name="so_far" select="count(barr)"/>
</xsl:call-template>
<xsl:template name="generate_bar">
<xsl:param name="so_far"/>
<xsl:if test="$so_far < m">
    <bar>
    </bar>
    <xsl:call-template name="generate_bar">
        <xsl:with-param name="so_far" select="$so_far + 1"/>
    </xsl:call-template>
</xsl:if>
</xsl:template>
```

Case M:

```
<xsl:for-each select="barr[position( ) < n+1]">
    <bar>
        <xsl:value-of select="."/>
    </bar>
</xsl:for-each>
<xsl:call-template name="generate_bar">
    <xsl:with-param name="so_far" select="count(barr)"/>
</xsl:call-template>
<xsl:template name="generate_bar">
<xsl:param name="so_far"/>
<xsl:if test="$so_far < m">
    <bar>
    </bar>
    <xsl:call-template name="generate_bar">
        <xsl:with-param name="so_far" select="$so_far + 1"/>
    </xsl:call-template>
</xsl:if>
</xsl:template>
```

Case N:

```
<bar>
</bar>
```

As an exemplary illustration, suppose the complexType appears in the target schema as follows:

```
<xs:complexType name="fu">
<xs:sequence>
    <xs:element name="bar1" type="xs:string" />
    <xs:element name="bar2" type="xs:string" minOccurs="0" maxOccurs="7"/>
    <xs:element name="bar3" type="xs:string" minOccurs="1" maxOccurs="8"/>
    <xs:element name="bar4" type="xs:string" minOccurs="3" maxOccurs="unbounded"/>
    <xs:element name="bar5" type="xs:string" minOccurs="0" maxOccurs="unbounded"/>
    <xs:element name="barn" type="xs:string" />
</xs:sequence>
</xs:complexType>
```

Then, based on the above cases, the following XSLT script is generated.

```
<fu>
    <barr1>
        <xsl:value-of select="bar1"/>
    </barr1>
    <xsl:for-each select="bar2[position( ) < 5]">
        <barr2>
            <xsl:value-of select="."/>
        </barr2>
    </xsl:for-each>
    <xsl:for-each select="bar3[position( ) < 9]">
        <barr3>
            <xsl:value-of select="."/>
        </barr3>
    </xsl:for-each>
    <xsl:call-template name="generate_barr3">
        <xsl:with-param name="so_far" select="count(bar3)"/>
    </xsl:call-template>
    <xsl:for-each select="bar4">
        <barr4>
            <xsl:value-of select="."/>
        </barr4>
    </xsl:for-each>
    <xsl:call-template name="generate_barr4">
        <xsl:with-param name="so_far" select="count(bar4)"/>
    </xsl:call-template>
    <xsl:for-each select="bar5">
        <barr5>
            <xsl:value-of select="."/>
        </barr5>
    </xsl:for-each>
    </xsl:if>
</fu>
</xsl:template>
<xsl:template match="text( )|@*"/>
<xsl:template name="generate_barr3">
    <xsl:param name="so_far"/>
    <xsl:if test="$so_far < 1">
        <barr3>
        </barr3>
        <xsl:call-template name="generate_barr3">
            <xsl:with-param name="so_far" select="$so_far + 1"/>
        </xsl:call-template>
    </xsl:if>
</xsl:template>
<xsl:template name="generate_barr4">
    <xsl:param name="so_far"/>
    <xsl:if test="$so_far < 3">
        <barr4>
        </barr4>
        <xsl:call-template name="generate_barr4">
            <xsl:with-param name="so_far" select="$so_far + 1"/>
        </xsl:call-template>
    </xsl:if>
</xsl:template>
```

Choice Lists

Suppose that the properties of <fu> are listed in a choice complex-type in the target schema. Assume again, as above, that fu is mapped to an ontological class Foo, with each of $bar_i$ mapped to a property, $Foo.bar_i$. Assume further, as above, that the source XML schema has an XPath pattern foo that maps to the ontological class Foo, with further children patterns foo/barr1, foo/barr2, etc., mapping to the relevant property paths.

Preferably, the general rule for producing XSLT script associated with a target choice bloc is as follows. Start with the tags <xsl:choose> </xsl:choose>. For each element in the choice sequence, insert into the choose bloc <xsl:when test="barr"> </xsl:when> and within that bloc insert code appropriate to the cardinality restrictions of that element, exactly as above for sequence blocs, including the creation of new templates if needed. Finally, if there are no elements with minOccurs="0" in the choice bloc, select any tag <barr> at random in the choice bloc, and insert into the XSLT, right before the closing </xsl:choose>, <xsl:otherwise><barr></barr></xsl:otherwise>.

As an exemplary illustration, suppose the complexType appears I the target schema as follows:

```
<xs:choice>
    <xs:element name="bar1" type="xs:string" />
    <xs:element name="bar2" type="xs:string" minOccurs="0" maxOccurs="7"/>
    <xs:element name="bar3" type="xs:string" minOccurs="1" maxOccurs="8"/>
    <xs:element name="bar4" type="xs:string" minOccurs="3" maxOccurs="unbounded"/>
    <xs:element name="bar5" type="xs:string" minOccurs="0" maxOccurs="unbounded"/>
    <xs:element name="barn" type="xs:string" />
</xs:choice>
```

Then, based on the above cases, the following XSLT script is generated.

```
<fu>
    <xsl:choose>
        <xsl:when test="bar1">
            <barr1>
                <xsl:value-of select="bar1"/>
            </barr1>
        </xsl:when>
        <xsl:when test="bar2">
            <xsl:for-each select="bar2[position( ) < 8]">
                <barr2>
                    <xsl:value-of select="."/>
                </barr2>
            </xsl:for-each>
        </xsl:when>
        <xsl:when test="bar3">
            <xsl:for-each select="bar3[position( ) < 9]">
                <barr3>
                    <xsl:value-of select="."/>
                </barr3>
            </xsl:for-each>
            <xsl:call-template name="generate_barr3">
                <xsl:with-param name="so_far" select="count(bar3)"/>
            </xsl:call-template>
        </xsl:when>
        <xsl:when test="bar4">
            <xsl:for-each select="bar4">
                <barr4>
                    <xsl:value-of select="."/>
                </barr4>
            </xsl:for-each>
            <xsl:call-template name="generate_barr4">
                <xsl:with-param name="so_far" select="count(bar4)"/>
            </xsl:call-template>
        </xsl:when>
        <xsl:when test="bar5">
            <xsl:for-each select="bar5">
                <barr5>
                    <xsl:value-of select="."/>
                </barr5>
            </xsl:for-each>
        </xsl:when>
        <xsl:otherwise>
        </xsl:otherwise>
    </xsl:choose>
</fu>
```

```
</xsl:template>
<xsl:template match="text( )|@*"/>
<xsl:template name="generate_barr3">
    <xsl:param name="so_far"/>
    <xsl:if test="$so_far < 1">
        <barr3>
        </barr3>
        <xsl:call-template name="generate_barr3">
            <xsl:with-param name="so_far" select="$so_far + 1"/>
        </xsl:call-template>
    </xsl:if>
</xsl:template>
<xsl:template name="generate_barr4">
    <xsl:param name="so_far"/>
    <xsl:if test="$so_far < 3">
        <barr4>
        </barr4>
        <xsl:call-template name="generate_barr4">
            <xsl:with-param name="so_far" select="$so_far + 1"/>
        </xsl:call-template>
    </xsl:if>
</xsl:template>
```

All Lists

Suppose that the properties of <fu> are listed in an all complex-type in the target schema. Assume again, as above, that foo is mapped to an ontological class Foo, with each of bar, mapped to a property, $Foo.bar_i$. Assume further that the source XML schema has an XPath pattern foo that maps to the ontological class Foo, with further children patterns foo/barr1, foo/barr2, etc., mapping to the relevant property paths.

In a preferred embodiment of the present invention, a general rule is to test for the presence of each of the source tags associated with the target tags, by way of

```
<xsl:if test="foo">
    <fu>
        <xsl:value-of select="foo"/>
    </fu>
</xsl:if>
```

Preferably, if any of the elements has minOccurs="1" then the negative test takes place as well:

```
<xsl:if test="not (foo)">
    <fu>
    </fu>
</xsl:if>
```

As an exemplary illustration, suppose the complexType appears I the target schema as follows:

```
<xs:complexType name="bar">
    <xs:all>
        <xs:element name="bar2" type="xs:string" minOccurs="0" maxOccurs="1"/>
        <xs:element name="bar3" type="xs:string" minOccurs="1" maxOccurs="1"/>
    </xs:all>
</xs:complexType>
```

Then the following XSLT script is generated.

```
<fu>
    <xsl:template match="foo">
        <xsl:if test="position( ) = 1">
            <xsl:if test="bar1">
                <barr1>
                    <xsl:value-of select="bar1"/>
                </barr1>
            </xsl:if>
            <xsl:if test="bar2">
                <barr2>
                    <xsl:value-of select="bar2"/>
                </barr2>
            </xsl:if>
```

-continued

```
<xsl:if test="not (bar2)">
    <barr2>
    </barr2>
</xsl:if>
</xsl:if>
</xsl:template>
```

6. In a preferred embodiment of the present invention, when the elements of foo/bar1, foo/bar2, etc. have been processed as above in step 5, everything repeats in a recursive manner for properties that are related to each of the bar$_i$ elements. That is, if the target XML schema has further tags that are children of bar1, bar2, etc., then preferably each of those is treated as properties of the respective target classes of bar1, bar2, and so on, and the above rules apply recursively.

It may be appreciated by those skilled in the art that enterprise applications may include multiple XML schema and multiple relational database schema. As each schema for an XML complexType and each relational database schema map into a class, a collection of XML schema or relational database schema corresponds to a "class of classes." The present invention is capable of representing an entire hierarchy with one model, by supporting classes of classes.

A class of classes is a class in itself, and its instances are also classes. For example, a class Species may have instances that are classes Monkeys, Elephants and Giraffes. The properties of a class of classes can be considered metadata for the instance classes. For example, the class of classes Species can have properties such as "average life span," "average weight," "average height" and "period of gestation."

A class of classes is most useful in modeling enterprise data, since it is a high-level object that can include all of the various XML schema or all of the various RDBS that an enterprise employs. Examples of applications of a class of classes include:

- Class meta-data: Grouping together classes that relate to certain subject areas, as well as modeling class properties such as authorship.
- Privilege management: Giving attributes to classes based on who has privileges to access instance data of that class. For example, a QuarterlyFinancialStatements class may be an instance of a PubliclyAvaialbleClass class.
- Modeling an IT environment as well as actual data: For example, modeling invoices with a class Invoice, and then modeling the fact the class Invoice is an instance of all the classes that are stored in a certain database. In this scenario, mappings of data schema to a central ontology become part of a model, not something separate.

Figure 27:
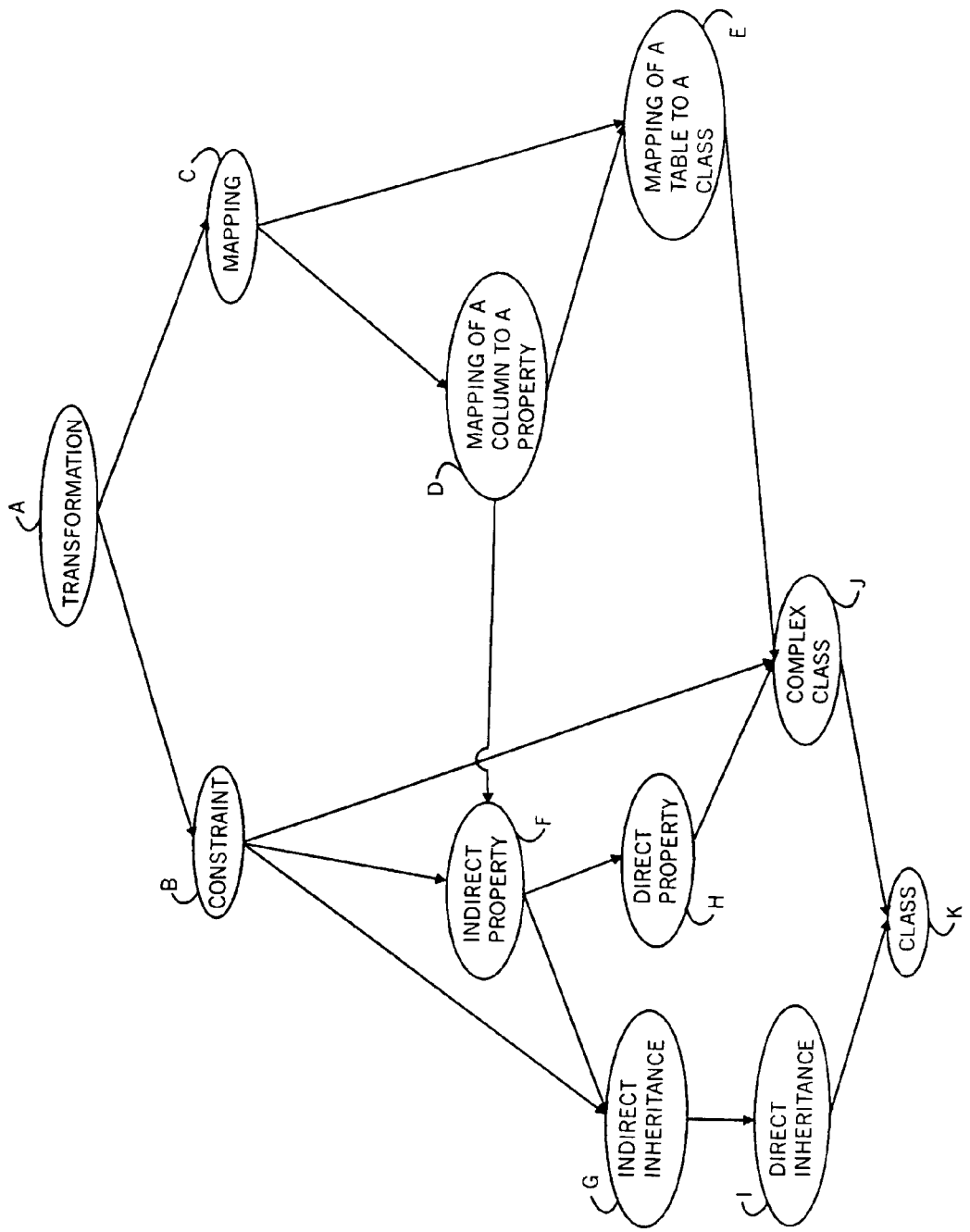
FIG. 27 is a simplified dependency graph used for impact analysis, in accordance with a preferred embodiment of the present invention.

More generally, the present invention supports a multi-level hierarchy having successive levels of classes of classes.
Implementation Details—Impact Analysis Reference is now made to FIG. 27, which is a simplified dependency graph used for impact analysis, in accordance with a preferred embodiment of the present invention. Shown in FIG. 27 are eleven components within an ontology, mapping and transformation system, labeled A-K. For reference, the components are:

A. Transformation
B. Constraint
C. Mapping
D. Mapping of a column to a property
E. Mapping of a table to a class
F. Indirect property
G. Indirect inheritance
H. Direct property
I. Direct inheritance
J. Complex class
K. Class A direct property is a single property, whereas an indirect property is a composition or properties. Preferably, an indirect property includes a direct property as a special case. Similarly, a direct inheritance is a class-subclass pair. An indirect inheritance is a pair of classes (C, D), where D inherits from C through chain of inheritances. Preferably, an indirect inheritance includes a direct inheritance as a special case.

Preferably, components are implemented as objects that can send and receive messages to and from other objects. Thus, for example, an indirect property $P_2oP_1$ and an indirect inheritance (C, D) are implemented as their own objects. Direct dependencies among the objects are indicated by in FIG. 27 by directed edges within the dependency graph. If a first object depends on a second object either through a direct (single edge) or indirect (multiple edge) dependency, then modification or deletion of the second object potentially impacts the first object. For example, referring to FIG. 27, a constraint depends directly on an indirect property, and a mapping depends indirectly on an indirect property.

In a preferred embodiment of the present invention, impact analysis is performed recursively. When a first object, Y, is about to be changed, it notifies objects X that depend directly on Y of the intended change. The objects X in turn can recursively notify objects that depend directly on them. Each object so notified can send a reply to the notifying object with one or more instructions. For example, an object X inter alia can send a reply to Y over-ruling the intended change, or a reply asking that a warning be issued.

After the first object Y is changed, it notifies objects X that depend directly on Y of the actual change. As above, the objects X can recursively notify objects that depend directly on them. Each object so notified can perform one or more instructions. For example, if Y is deleted, an object X depending on Y can inter alia modify itself appropriately, delete itself or do nothing.

The dependency graph in FIG. 27 includes sixteen edges; namely, AB, AC, BF, BG, BJ, CD, CE, DE, DF, EJ, FG, FH, GI, HJ, IK and JK. Each edge corresponds to a direct dependency. Table CXXXII lists each of these direct dependencies X→Y, and the behavior of X before and after Y is changed.

TABLE CXXXII

| | Modifications and their Impacts | | |
|---|---|---|---|
| X → Y | Change to Y | Behavior of X before change to Y | Behavior of X after change to Y |
| A → B | Change or delete B | Issue warning | Mark A for re-calculation is necessary |
| A → C | Change or delete C | Issue warning | Mark A for re-calculation is necessary |

TABLE CXXXII-continued

Modifications and their Impacts

| X → Y | Change to Y | Behavior of X before change to Y | Behavior of X after change to Y |
|---|---|---|---|
| B → F<br>G is used within B | Change target of F | If change results in type mis-match, then inform dependents of B | If change results in a type mis-match, then delete B |
| B → F<br>G is used within B | Delete F | No action | Delete B |
| B → G<br>H is used within B | Delete G | If deletion of G results in type mis-match, then issue warning | If deletion of G results in type mis-match, then delete B |
| B → J<br>J is constrained by B | Delete J | No action | Delete B |
| C → D | Change or delete D | No action | Change C and inform dependents of C |
| C → E | Change or delete E | No action | Change C and inform dependents of C |
| D → E | Change or delete E | No action | Delete D |
| D → E<br>The column is a foreign key | Change or delete E | No action | |
| D → F<br>A column maps to F | Delete F | No action | Mark mapping as being corrupted |
| D → F<br>A foreign key maps to G | Change target of F | If the new target does not inherit from F, then inform dependents of D | If the new target does not inherit from F, then delete D |
| D → F<br>A column that is not a foreign key maps to F | Change target of F | No action | If the new target does not match the type of the column, mark mapping as being corrupted |
| E → J<br>A table maps to J | Delete J | No action | Mark mapping as being corrupted |
| F → G<br>G is used within F | Delete G | Inform dependents of F | Delete F |
| F → H<br>H is a property within F | Change source or target of H | If modification of H makes F indeterminate, then inform dependents of F | If modification of H makes F indeterminate, then delete F |
| F → H<br>H is the last property within F | Change target of H | Inform dependents of F | Change target of F |
| G → I | Delete I | If deletion of I destroys G, then inform dependents of G | If deletion of I destroys G, then delete G |
| H → J<br>J is the source of H | Delete J | No action | Delete H |
| H → J<br>J is the target of H | Delete J | Issue warning | Delete H |
| I → K<br>K is a subclass or superclass | Delete K | Inform dependents of I | Delete I |
| J → K<br>L is a component class of K | Delete K | Inform dependents of J | Delete J |

For example, referring to edge J→K, suppose a component class, L, of a complex class, K, is about to be deleted. According to Table CXXXII, K issues a notice to J and, in turn, J issues a notice to all of its dependents that J is about to be deleted. In particular, suppose J is the target of a direct property, H. According to Table CXXXII, J notifies H that it is about to be deleted. In turn, H sends back a warning to J indicating that if J is deleted, then H will be deleted. In turn, J sends a warning back to K indicating that if K is deleted, then direct property H will be deleted. K informs the user of this. Similarly, if an RDBS mapping C includes a map E that maps a specific relational database table to J, then according to Table CXXXII, J notifies E that it is about to be deleted. E takes no action.

If the user decides to proceed and delete K, despite the warning regarding H, then K sends a message to J indicating that K is deleted. J sends a message to H and to E that J is deleted. H is deleted, and the mapping E is marked as corrupted. E sends a message to a mapping D of a column of the specific database table to a property of the ontology model. D and E each send a message to the RDBS mapping C that they are deleted. The RDBS mapping C is changed, and C issues a notice to a transformation A that depends on C. Transformation A is marked for re-calculation, if necessary.

It may be appreciated by those skilled in the art that the dependency graph in FIG. 27 and Table CXXXII can be adapted to have different components. For example, the dependency graph can be expanded inter alia to include:
mappings of XML complexTypes to classes;
mappings of XML elements and XML attributes to properties;
ontology relations; and
mapping of tables to relations.

From a more general perspective, in a preferred embodiment of the present invention, models, mappings, schema, transformations, business rules and other objects are comprised are units referred to as "concepts." A concept is a basic building block for a model. For example, an ontology class and an ontology property are concepts. Preferably, a concept may include information of a structure characteristic to a concept type. Concepts may contain pointers to other concepts. In a preferred embodiment of the present invention, concepts have unique identifiers, and lifetimes independent of changes to the information contained therewithin.

Dependencies between concepts can be classified as referential dependencies or content dependencies. A first concept has "referential dependence" on a second concept if the first concept depends on the existence but not on the content of the second concept. Typically, a first concept referentially depends on a second concept if the first concept makes a statement about the second concept, a statement that is not relevant if the second concept is deleted. An example of referential dependence is a business rule (first concept) that makes statements about properties (second concept). Another example is a property (first concept) that states that its source class (second concept) has a certain characteristic property with type of the target property; or, alternatively, a property (first concept) refers to a class (second concept) by building on the class.

A first concept has "content dependence" on a second concept if the first concept depends on information within the second concept. Typically this means that the first concept makes a statement, the correctness of which depends on information within the second concept. An example of content dependence is a transformation (first concept) that depends on a business rule (second concept).

In a preferred embodiment of the present invention, internal proxy concepts are established for external concepts that exist outside of a model, such as an external relational database schema.

In a preferred embodiment of the present invention, concepts are implemented independently, so that program code for a type of concept does not require knowledge about other concepts that depend thereon. Preferably, concepts are programmed with generic mechanisms for other concepts to register their referential or content dependence, including callbacks. Preferably, a concept that changes or is deleted uses such callbacks to notify its dependents.

In a preferred embodiment of the present invention, when a first concept notifies a second concept, dependent on the first concept, about an impending change or deletion, the second concept sends a response. For example, the second concept my respond inter alia by:

Issuing a veto to the change or deletion and, preferably, providing a reason therefor;
Providing a warning to the user regarding the impact of the change or deletion; or
Offering the user one or more alternative actions.

In a preferred embodiment of the present invention, a concept notifies its dependents at least twice. First, when an action, such as a change or deletion, is pending, and again when the action is approved by a user who has seen warnings in response to the first notification. Upon receiving the second notification, the dependent concepts must take appropriate actions, such as changing or deleting themselves.

In a preferred embodiment of the present invention, concepts that have broken referential dependencies are set to depend on a special "undefined" concept, until a user replaces the undefined concept with a reference to a proper concept A similar approach is preferably used for content dependency as well. For example, a business rule including a formula involving a specific property maintains the formula when the specific property is deleted by replacing the deleted property with "undefined."

In addition to its used with impact analysis, the notion of a concept as described hereinabove can also be used as:
the basic unit that has metadata associated therewith;
the basic unit that may be persisted; and
the basic unit responsible for maintaining its own consistency.

Additional Considerations

In reading the above description, persons skilled in the art will realize that there are many apparent variations that can be applied to the methods and systems described. A first variation to which the present invention applies is a setup where source relational database tables reside in more than one database. The present invention preferably operates by using Oracle's cross-database join, if the source databases are Oracle databases. In an alternative embodiment, the present invention can be applied to generate a first SQL query for a first source database, and use the result to generate a second SQL query for a second source database. The two queries taken together can feed a target database.

A second variation to which the present invention applies is processing queries on relational database tables and queries on instance data of an ontology model. In such scenarios a target schema can be artificially constructed so as to correspond to the desired query. For example, suppose two relational database tables, $S_1$ and $S_2$, are queries for columns A and B such that $S_1.A$ has a different value than a given function $f(S_2.B)$. Such queries can arise when database tables are cleansed for inconsistencies. An artificial target relational database schema can be constructed with a target table, T, having a column C equal to $S_1.A-f(S_2.B)$. Using the present invention, a transformation can be generated to populate table T from data in tables $S_1$ and $S_2$, and identifying non-zero entries in T.C.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. An ontology modeler implemented in a data processing system, the ontology modeler comprising:
a class builder for generating and editing classes within an ontology model, wherein the class builder generates classes within the ontology model by executing computer usable program code: to identify, by a processor, a first table within a source relational database schema, the first table comprising at least one first column and at least one first row; to identify, by a processor, a second table within a target relational database schema, the second table comprising at least one second column and at least one second row; and to map, by a processor, the first table and the second table onto a common ontology model, wherein the first table is a first ontological class within the common ontology model, and wherein the second table is a second ontological class within the common ontology model;
a property builder for generating and editing properties of classes within the ontology model, wherein the property builder generates properties of the classes within the ontology model by executing computer usable program code: to identify, by a processor, each of the at least one first column as a set properties of the first class, and to identify, by a processor, each of the at least one second column as a set properties of the second class;
a business rules builder for generating and editing business rules involving properties of classes within the ontology model, wherein the business rules builder generates business rules within the ontology model by executing computer usable program code: to express, by a processor, dependencies among the set of properties of the first class, dependencies among the set of properties of the second class, and dependencies between the set of properties of the first class and the set of properties of the second class, wherein the business rules are selected from the group consisting of arithmetic dependencies among numeric data, string dependencies among character string data, and look-up tables; and a test instance builder for generating and editing test instances of classes in the ontology model, wherein said test instance builder includes a test instance builder user interface for indicating values for properties of a test instance, and a test instance validator for validating test instances, wherein said test instance validator checks for inconsistencies with regard to property values of test instances.

2. The ontology modeler of claim 1 wherein said property builder generates one-to-one properties.

3. The ontology modeler of claim 1 wherein said property builder generates one-to-many properties.

4. The ontology modeler of claim 1 wherein said class builder includes a class builder user interface for designating that a given class is one of a subclass or a superclass of another class, and wherein the subclass of a particular class inherits properties of the particular class.

5. The ontology modeler of claim 4 further comprising a dependency analyzer for analyzing an impact of removal or modification of an inheritance relationship among classes of the ontology model.

6. The ontology modeler of claim 1 further comprising a dependency analyzer for analyzing an impact of removal of a given class or a given property on the ontology model.

7. The ontology modeler of claim 1 further comprising a dependency analyzer for analyzing an impact, on the ontology model, of modification of the target or the source of a given property.

8. The ontology modeler of claim 1 wherein the business rules include a constraint among class properties whose targets are fundamental data types.

9. The ontology modeler of claim 8 wherein the constraint involves a composition of properties.

10. The ontology modeler of claim 8 wherein the constraint uses a regular expression.

11. The ontology modeler of claim 10 wherein the regular expression is an arithmetic expression.

12. The ontology modeler of claim 10 wherein the regular expression is a logical expression.

13. The ontology modeler of claim 8 wherein the constraint uses a text string operation.

14. The ontology modeler of claim 8 wherein the constraint uses a date function.

15. The ontology modeler of claim 8 wherein the constraint uses a time function.

16. The ontology modeler of claim 8 wherein the constraint uses a look-up table.

17. The ontology modeler of claim 8 wherein the constraint uses a branching condition.

18. The ontology modeler of claim 1 wherein the business rules include an equivalence between properties.

19. The ontology modeler of claim 1 wherein the business rules include an equivalence between properties and compositions of properties.

20. The ontology modeler of claim 1 wherein the business rules include a declaration declaring that a designated property of a class is unique, wherein distinct instances of the class have different values of the designated property.

21. The ontology modeler of claim 1 wherein the business rules include a declaration that a designated property of a class is required, wherein an instance of the class is not valid unless a value is specified for the designated property.

22. The ontology modeler of claim 1 further comprising a display tool for displaying a test instance of classes in the ontology model.

23. The ontology modeler of claim 22 wherein said display tool displays values of test instance properties that are fundamental data types.

24. The ontology modeler of claim 1 further comprising a test instance importer for importing test instances of classes in the ontology model from an external data source.

25. The ontology modeler of claim 1 further comprising a reporting tool for reporting inconsistencies with regard to property values of text instances.

26. The ontology modeler of claim 1 wherein said test instance validator checks for inconsistencies with respect to the business rules.

27. The ontology modeler of claim 26 further comprising a reporting tool for reporting inconsistencies with respect to the business rules.

28. The ontology modeler of claim 12 wherein said class builder generates a class of classes, the class of classes being a class, the instances of which are classes.

29. The ontology modeler of claim 28 wherein properties of a class of classes serve as metadata for the instances.

30. The ontology modeler of claim 28 wherein properties of a class of classes are used for privilege management of the instances.

31. A method, implemented in a data processing system, for building ontology models, the method comprising:

generating classes within an ontology model, wherein the generating classes comprises: identifying, by a processor, a first table within a source relational database schema, the first table comprising at least one first column and at least one first row; identifying, by the processor, a second table within a target relational database schema, the second table comprising at least one second column and at least one second row; and mapping, by the processor, the first table and the second table onto a common ontology model, wherein the first table is a first ontological class within the common ontology model, and the second wherein the second table is a second ontological class within the common ontology model;

generating properties of classes within the ontology model, wherein the generating properties comprises: identifying, by the processor, each of the at least one first column as a set properties of the first class, and identifying, by the processor, each of the at least one second column as a set properties of the second class;

generating business rules involving properties of classes, wherein the generating of business rules comprises: expressing, by the processor, dependencies among the set of properties of the first class, dependencies among the set of properties of the second class, and dependencies between the set of properties of the first class and the set of properties of the second class, wherein the business rules are selected from the group consisting of arithmetic dependencies among numeric data, string dependencies among character string data, and look-up tables; and generating a test instance for generating and editing test instances of classes in the ontology model, wherein said test instance builder includes a test instance builder user interface for indicating values for properties of a test instance, and generating a test instance validator for validating test instances, wherein said test instance validator checks for inconsistencies with regard to property values of test instances.

32. The method of claim 31 further comprising:
editing classes within an ontology model;
editing properties of classes within the ontology model; and
editing business rules involving properties of classes within the ontology model.

33. The method of claim 31 wherein said generating properties generates one-to-one properties.

34. The method of claim 31 wherein said generating properties generates one-to-many properties.

35. The method of claim 31 further comprising designating that a given class is one of a subclass or a superclass of another class, and wherein the subclass of a particular class inherits properties of the particular class.

36. The method of claim 35 further comprising analyzing an impact of removal or modification of an inheritance relationship among classes of the ontology model.

37. The method of claim 31 further comprising analyzing an impact, on the ontology model, of removal of a given class or a given property.

38. The method of claim 31 further comprising analyzing an impact, on the ontology model, of modification of the source or the target of a given property.

39. The method of claim 31 wherein the business rules include a constraint among class properties whose targets are fundamental data types.

40. The method of claim 39 wherein the constraint involves a composition of properties.

41. The method of claim 39 wherein the constraint uses a regular expression.

42. The method of claim 41 wherein the regular expression is an arithmetic expression.

43. The method of claim 41 wherein the regular expression is a logical expression.

44. The method of claim 39 wherein the constraint uses a text string operation.

45. The method of claim 39 wherein the constraint uses a date function.

46. The method of claim 39 wherein the constraint uses a time function.

47. The method of claim 39 wherein the constraint uses a look-up table.

48. The method of claim 39 wherein the constraint uses a branching condition.

49. The method of claim 31 wherein the business rules include an equivalence between properties.

50. The method of claim 31 wherein the business rules include an equivalence between properties and compositions of properties.

51. The method of claim 31 wherein the business rules include a declaration declaring that a designated property of a class is unique, wherein distinct instances of the class have different values of the designated property.

52. The method of claim 31 wherein the business rules include a declaration that a designated property of a class is required, wherein an instance of the class is not valid unless a value is specified for the designated property.

53. The method of claim 31 further comprising displaying a test instance of classes in the ontology model.

54. The method of claim 53 wherein said displaying displays values of test instance properties that are fundamental data types.

55. The method of claim 31 further comprising importing test instances of classes in the ontology model from an external data source.

56. The method of claim 31 further comprising generating test instances of classes in the ontology model.

57. The method of claim 31 further comprising reporting inconsistencies with regard to property values of text instances.

58. The method of claim 31 further comprising checking for inconsistencies with respect to the business rules.

59. The method of claim 58 further comprising reporting inconsistencies with respect to the business rules.

60. The method of claim 31 wherein said generating classes comprises generating a class of classes, the class of classes being a class, the instances of which are classes.

61. The method of claim 60 wherein properties of the class of classes serve as metadata for the instances.

62. The method of claim 60 wherein properties of a class of classes are used for privilege management of the instances.

\* \* \* \* \*